United States Patent
Lian et al.

(10) Patent No.: US 12,227,533 B2
(45) Date of Patent: *Feb. 18, 2025

(54) CRYSTALLINE FORMS AND METHODS OF PRODUCING CRYSTALLINE FORMS OF A COMPOUND

(71) Applicant: Viking Therapeutics, Inc., San Diego, CA (US)

(72) Inventors: Brian Lian, Rancho Santa Fe, CA (US); Hiroko Masamune, San Diego, CA (US); Geoffrey Barker, Carlsbad, CA (US)

(73) Assignee: Viking Therapeutics, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,487

(22) Filed: Oct. 13, 2023

(65) Prior Publication Data

US 2024/0043459 A1     Feb. 8, 2024

Related U.S. Application Data

(63) Continuation of application No. 16/982,022, filed as application No. PCT/US2019/022824 on Mar. 18, 2019, now Pat. No. 11,787,828.

(60) Provisional application No. 62/646,540, filed on Mar. 22, 2018.

(51) Int. Cl.
C07F 9/6574     (2006.01)

(52) U.S. Cl.
CPC ...... C07F 9/65742 (2013.01); *C07B 2200/13* (2013.01)

(58) Field of Classification Search
CPC ................. C07F 9/65742; C07B 2200/13
See application file for complete search history.

(56) References Cited

U.S. PATENT DOCUMENTS

| | | |
|---|---|---|
| 3,120,551 A | 2/1964 | Goldschmidt et al. |
| 3,357,887 A | 12/1967 | Kagan et al. |
| 4,069,343 A | 1/1978 | Sellstedt et al. |
| 4,069,347 A | 1/1978 | McCarthy et al. |
| 4,423,227 A | 12/1983 | Batz et al. |
| 4,426,453 A | 1/1984 | Cree et al. |
| 4,554,290 A | 11/1985 | Boger et al. |
| 4,673,691 A | 6/1987 | Bachynsky |
| 4,766,121 A | 8/1988 | Ellis et al. |
| 4,826,876 A | 5/1989 | Ellis et al. |
| 4,910,305 A | 3/1990 | Ellis et al. |
| 5,061,798 A | 10/1991 | Emmett et al. |
| 5,116,828 A | 5/1992 | Miura et al. |
| 5,158,978 A | 10/1992 | Rubin |
| 5,232,946 A | 8/1993 | Hurnaus et al. |
| 5,284,971 A | 2/1994 | Walker et al. |
| 5,324,522 A | 6/1994 | Krenning et al. |
| 5,401,772 A | 3/1995 | Yokoyama et al. |
| 5,519,163 A | 5/1996 | Gibbs et al. |
| 5,569,674 A | 10/1996 | Yokoyama et al. |
| 5,571,840 A | 11/1996 | Mayor et al. |
| 5,627,173 A | 5/1997 | Graeve et al. |
| 5,654,468 A | 8/1997 | Yokoyama et al. |
| 5,663,159 A | 9/1997 | Starrett, Jr. et al. |
| 5,741,803 A | 4/1998 | Pool et al. |
| 5,753,254 A | 5/1998 | Khan et al. |
| 5,854,282 A | 12/1998 | Mellin |
| 5,883,294 A | 3/1999 | Scanlan et al. |
| 5,922,775 A | 7/1999 | Kun et al. |
| 5,951,989 A | 9/1999 | Heymann |
| 6,107,517 A | 8/2000 | Scanlan et al. |
| 6,117,873 A | 9/2000 | Acklin et al. |
| 6,147,061 A | 11/2000 | Reiter |
| 6,194,454 B1 | 2/2001 | Dow |
| 6,221,911 B1 | 4/2001 | Lavin et al. |
| 6,236,946 B1 | 5/2001 | Scanlan et al. |
| 6,266,622 B1 | 7/2001 | Scanlan et al. |
| 6,326,398 B1 | 12/2001 | Chiang et al. |
| 6,344,481 B1 | 2/2002 | Cornelius et al. |
| 6,361,992 B1 | 3/2002 | Szkudlinski et al. |
| 6,380,255 B1 | 4/2002 | Lavin et al. |
| 6,414,002 B1 | 7/2002 | Cheng et al. |
| 6,414,026 B1 | 7/2002 | Billingham |
| 6,441,015 B2 | 8/2002 | Aspnes et al. |
| 6,465,687 B1 | 10/2002 | Li et al. |
| 6,468,755 B1 | 10/2002 | Shoelson |

(Continued)

FOREIGN PATENT DOCUMENTS

| | | |
|---|---|---|
| CN | 107469086 A | 12/2017 |
| CN | 110590898 | 12/2019 |

(Continued)

OTHER PUBLICATIONS

Jiang et al., "Structural basis of tropifexor as a potent and selective agonist of farnesoid X receptor", Biochemical Biophysical Research Communications, vol. 534:1047-1052 (2021).
Tully et al., "Discovery of Tropifexor (LJN452), a highly potent non-bile acid FXR agonist for the treatment of cholestatic liver deseases and nonalcoholic steatohepatitis (NASH)", J. Med. Chem. vol. 60:9960-9973 (2017).
International Search Report and Written Opinion in Application No. PCT/US2019/022824, mailed on Jun. 14, 2019, in 7 pages.
International Preliminary Report on Patentability in Application No. PCT/US2019/022824, Sep. 22, 2020, in 4 pages.
Alexander et al., Drugs and Their Structural Motifs, Chapter 1, pp. 28-29, Metabolism, Pharmacokinetics and Toxicity of Functional Groups—Impact of Chemical Building Blocsk on ADMET, 2010.
Alonso-Merino, et al., "Thyroid hormones inhibit TGF-β signaling and attenuate fibrotic responses," PNAS, 2016, vol. 113(24), pp. E3451-E3460.

(Continued)

*Primary Examiner* — Laura L Stockton
(74) *Attorney, Agent, or Firm* — Knobbe Martens Olson & Bear LLP

(57) ABSTRACT

Disclosed herein are methods of crystallizing the compound of Formula I, as well as crystalline forms thereof. Crystalline forms of Formula I disclosed include the TBME solvate crystalline form, toluene solvate crystalline form, ethanol solvate crystalline form, THF solvate crystalline form, EtOAc solvate crystalline form, acetone solvate crystalline form and crystalline Form C.

22 Claims, 38 Drawing Sheets

(56) References Cited

U.S. PATENT DOCUMENTS

| | | |
|---|---|---|
| 6,492,424 B1 | 12/2002 | Apelqvist et al. |
| 6,495,533 B1 | 12/2002 | Matsui et al. |
| 6,534,676 B2 | 3/2003 | Markin et al. |
| 6,545,015 B2 | 4/2003 | Cheng et al. |
| 6,545,018 B2 | 4/2003 | Chiang et al. |
| 6,555,582 B1 | 4/2003 | Schwartz et al. |
| 6,566,372 B1 | 5/2003 | Zhi et al. |
| 6,576,636 B2 | 6/2003 | Webb et al. |
| 6,608,049 B2 | 8/2003 | Waltering et al. |
| 6,620,830 B2 | 9/2003 | Chiang |
| 6,625,201 B1 | 9/2003 | Wang et al. |
| 6,664,291 B2 | 12/2003 | Chiang et al. |
| 6,673,815 B2 | 1/2004 | Devasthale et al. |
| 6,680,340 B2 | 1/2004 | Cheng et al. |
| 6,689,896 B2 | 2/2004 | Kukkola |
| 6,716,877 B2 | 4/2004 | Markin |
| 6,723,744 B2 | 4/2004 | Aspnes et al. |
| 6,727,271 B2 | 4/2004 | Cheng et al. |
| 6,747,048 B2 | 6/2004 | Zhang et al. |
| 6,763,607 B2 | 7/2004 | Beyernck et al. |
| 6,787,652 B1 | 9/2004 | Dow et al. |
| 6,794,406 B2 | 9/2004 | Haning et al. |
| 6,806,381 B2 | 10/2004 | Chidambaram et al. |
| 6,825,201 B2 | 11/2004 | Wang et al. |
| 6,831,102 B2 | 12/2004 | Rangeland |
| 6,852,706 B1 | 2/2005 | Heber-Katz |
| 6,875,782 B2 | 4/2005 | Cheng et al. |
| 6,982,348 B2 | 1/2006 | Kori et al. |
| 7,015,246 B2 | 3/2006 | Schmeck et al. |
| 7,402,602 B2 | 7/2008 | Bigg et al. |
| 7,514,419 B2 | 4/2009 | Erion et al. |
| 7,799,782 B2 | 9/2010 | Munson et al. |
| 7,829,552 B2 | 11/2010 | Erion et al. |
| 10,130,643 B2 | 11/2018 | Cable et al. |
| 10,925,885 B2 | 2/2021 | Cable et al. |
| 11,202,789 B2 | 12/2021 | Lian |
| 11,351,183 B2 | 6/2022 | Lian et al. |
| 11,707,472 B2 | 7/2023 | Lian et al. |
| 11,707,475 B2 | 7/2023 | Tunac |
| 11,787,828 B2 | 10/2023 | Lian et al. |
| 2001/0051645 A1 | 12/2001 | Chiang |
| 2001/0051657 A1 | 12/2001 | Chiang et al. |
| 2002/0006946 A1 | 1/2002 | Aspnes et al. |
| 2002/0045751 A1 | 4/2002 | Kukkola |
| 2002/0049226 A1 | 4/2002 | Chiang et al. |
| 2002/0107390 A1 | 8/2002 | Kukkola |
| 2002/0123521 A1 | 9/2002 | Lavin |
| 2003/0027862 A1 | 2/2003 | Haning et al. |
| 2003/0040535 A1 | 2/2003 | Aspnes et al. |
| 2003/0078288 A1 | 4/2003 | Haning et al. |
| 2003/0078289 A1 | 4/2003 | Aspnes et al. |
| 2003/0114521 A1 | 6/2003 | Chiang et al. |
| 2003/0153513 A1 | 8/2003 | Shiomi et al. |
| 2003/0166724 A1 | 9/2003 | Rangeland |
| 2004/0029187 A1 | 2/2004 | Palmer |
| 2004/0039028 A1 | 2/2004 | Zhang et al. |
| 2004/0077694 A1 | 4/2004 | Chiang et al. |
| 2004/0097589 A1 | 5/2004 | Yi-Lin et al. |
| 2004/0110951 A1 | 6/2004 | Chiang |
| 2004/0116387 A1 | 6/2004 | Malm et al. |
| 2004/0116391 A1 | 6/2004 | Piccariello et al. |
| 2004/0142868 A1 | 7/2004 | Sleeman |
| 2004/0152783 A1 | 8/2004 | Olon et al. |
| 2004/0157844 A1 | 8/2004 | Dow et al. |
| 2004/0219218 A1 | 11/2004 | Martino et al. |
| 2004/0220147 A1 | 11/2004 | Malm et al. |
| 2005/0004184 A1 | 1/2005 | Ryono et al. |
| 2005/0038122 A1 | 2/2005 | Rangeland |
| 2005/0054727 A1 | 3/2005 | Rangeland |
| 2005/0085541 A1 | 4/2005 | Shiohara et al. |
| 2006/0046980 A1 | 3/2006 | Erion et al. |
| 2008/0261913 A1 | 10/2008 | Sommadossi et al. |
| 2009/0232879 A1 | 9/2009 | Cable et al. |
| 2010/0081634 A1 | 4/2010 | Erion et al. |
| 2013/0059781 A1 | 3/2013 | Kofoed et al. |
| 2015/0045389 A1 | 2/2015 | Madden et al. |
| 2016/0319548 A1 | 11/2016 | Shevlin |
| 2017/0105956 A1 | 4/2017 | Kaminski et al. |
| 2017/0348293 A1 | 12/2017 | Miao et al. |
| 2018/0243263 A1 | 8/2018 | Jain et al. |
| 2018/0360846 A1 | 12/2018 | Lefebvre |
| 2019/0255080 A1 | 8/2019 | Lian et al. |
| 2020/0179412 A1 | 6/2020 | Lian et al. |
| 2022/0016136 A1 | 1/2022 | Lian et al. |
| 2023/0226038 A1 | 7/2023 | Lian et al. |
| 2024/0189332 A1 | 6/2024 | Lian et al. |

FOREIGN PATENT DOCUMENTS

| | | |
|---|---|---|
| CN | 112812114 | 5/2021 |
| CN | 113024552 | 6/2021 |
| EP | 080550 | 1/1994 |
| EP | 1297833 | 4/2003 |
| EP | 1471049 | 10/2004 |
| EP | 1666035 | 6/2006 |
| EP | 1653928 | 3/2012 |
| JP | 2008-542301 | 11/2008 |
| JP | 7168660 B2 | 11/2022 |
| KR | 10-2007-0029196 | 3/2007 |
| WO | WO 1989/08458 | 9/1989 |
| WO | WO 1990/08155 | 7/1990 |
| WO | WO 1990/10636 | 9/1990 |
| WO | WO 1991/06569 | 5/1991 |
| WO | WO 1991/11181 | 8/1991 |
| WO | WO 1995/00135 | 1/1995 |
| WO | WO 1995/24919 | 9/1995 |
| WO | WO 1996/05190 | 2/1996 |
| WO | WO 1996/40048 | 12/1996 |
| WO | WO 1997/21993 | 6/1997 |
| WO | WO 1998/07435 | 2/1998 |
| WO | WO 1998/41216 | 9/1998 |
| WO | WO 1998/57919 | 12/1998 |
| WO | WO 1999/00353 | 1/1999 |
| WO | WO 1999/26966 | 6/1999 |
| WO | WO 1999/29321 | 6/1999 |
| WO | WO 1999/38376 | 8/1999 |
| WO | WO 1999/45016 | 9/1999 |
| WO | WO 1999/62507 | 12/1999 |
| WO | WO 2000/00468 | 1/2000 |
| WO | WO 2000/07972 | 2/2000 |
| WO | WO 2000/39077 | 7/2000 |
| WO | WO 2000/51971 | 9/2000 |
| WO | WO 2000/52015 | 9/2000 |
| WO | WO 2000/58279 | 10/2000 |
| WO | WO 2001/13936 | 3/2001 |
| WO | WO 2001/18013 | 3/2001 |
| WO | WO 2001/36365 | 5/2001 |
| WO | WO 2001/60784 | 8/2001 |
| WO | WO 2001/72692 | 10/2001 |
| WO | WO 2001/79287 | 10/2001 |
| WO | WO 2001/94293 | 12/2001 |
| WO | WO 2001/98256 | 12/2001 |
| WO | WO 2002/03914 | 1/2002 |
| WO | WO 2002/04515 | 1/2002 |
| WO | WO 2002/05834 | 1/2002 |
| WO | WO 2002/11666 | 2/2002 |
| WO | WO 2002/26752 | 4/2002 |
| WO | WO 2002/32408 | 4/2002 |
| WO | WO 2002/060374 | 8/2002 |
| WO | WO 2002/062780 | 8/2002 |
| WO | WO 2002/066017 | 8/2002 |
| WO | WO 2002/072528 | 9/2002 |
| WO | WO 2002/079181 | 10/2002 |
| WO | WO 2002/092550 | 11/2002 |
| WO | WO 2003/003013 | 1/2003 |
| WO | WO 2003/015771 | 2/2003 |
| WO | WO 2003/018515 | 3/2003 |
| WO | WO 2003/039456 | 5/2003 |
| WO | WO 2003/061557 | 7/2003 |
| WO | WO 2003/061567 | 7/2003 |
| WO | WO 2003/070169 | 8/2003 |
| WO | WO 2003/075835 | 9/2003 |
| WO | WO 2003/084915 | 10/2003 |
| WO | WO 2003/094845 | 11/2003 |

(56) References Cited

FOREIGN PATENT DOCUMENTS

| WO | WO 2003/099864 | 12/2003 |
|---|---|---|
| WO | WO 2003/105760 | 12/2003 |
| WO | WO 2004/005342 | 1/2004 |
| WO | WO 2004/007430 | 1/2004 |
| WO | WO 2004/014318 | 2/2004 |
| WO | WO 2004/018421 | 3/2004 |
| WO | WO 2004/026097 | 4/2004 |
| WO | WO 2004/041208 | 5/2004 |
| WO | WO 2004/065620 | 8/2004 |
| WO | WO 2004/066929 | 8/2004 |
| WO | WO 2004/067482 | 8/2004 |
| WO | WO 2004/078947 | 9/2004 |
| WO | WO 2004/091636 | 10/2004 |
| WO | WO 2004/093799 | 11/2004 |
| WO | WO 2004/103289 | 12/2004 |
| WO | WO 2005/009433 | 2/2005 |
| WO | WO 2005/016862 | 2/2005 |
| WO | WO 2005/021895 | 3/2005 |
| WO | WO 2005/028488 | 3/2005 |
| WO | WO 2005/042556 | 5/2005 |
| WO | WO 2005/123729 | 12/2005 |
| WO | WO 2006/128055 | 11/2006 |
| WO | WO 2006/128056 | 11/2006 |
| WO | WO 2006/128058 | 11/2006 |
| WO | WO 2007/009913 | 1/2007 |
| WO | WO 2007/109605 | 9/2007 |
| WO | WO 2009/089093 | 7/2009 |
| WO | WO 2010/074992 | 7/2010 |
| WO | WO 2010/125565 | 11/2010 |
| WO | WO 2011/038207 | 3/2011 |
| WO | WO 2012/087519 | 6/2012 |
| WO | WO 2013/163675 | 11/2013 |
| WO | WO 2015/134365 | 9/2015 |
| WO | WO 2016/097933 | 6/2016 |
| WO | WO 2016/111971 | 7/2016 |
| WO | WO 2016/123086 | 8/2016 |
| WO | WO 2017/148787 | 9/2017 |
| WO | WO 2017/184811 | 10/2017 |
| WO | WO 2017/210526 | 12/2017 |
| WO | WO 2018/053036 | 3/2018 |
| WO | WO 2018/094265 | 5/2018 |
| WO | WO 2018/193006 | 10/2018 |
| WO | WO 2018/226604 | 12/2018 |
| WO | WO 2019/005816 | 1/2019 |
| WO | WO 2020/023382 | 1/2020 |
| WO | WO 2020/033382 | 2/2020 |
| WO | WO 2020/117962 | 6/2020 |
| WO | WO 2020/117987 | 6/2020 |
| WO | WO 2021/190624 | 9/2021 |
| WO | WO 2021/252392 | 12/2021 |
| WO | WO 2022/159395 | 7/2022 |
| WO | WO 2023/158607 | 8/2023 |
| WO | WO 2023/158616 | 8/2023 |

OTHER PUBLICATIONS

Amma, L.L., et al., "Distinct Tissue-Specific Roles for Thyroid Hormone Receptors p and al in Regulation of Type 1 Deiodinase Expression," Mot. Endocrinol. 15:467-475, the Endocrine Society (2001).
Anderson, S.N., et al., "Activation of Electrophilic Aromatic Substitution by the Substituent—CH2Co(dmgH)2py. Products of Reaction of Benzylcobaloximes with Halogens in Acetic Acid," J. Chem. Soc. Perkin Trans. II 311-318, Royal Society of Chemistry (1972).
Annett, R.G., et al., "Enzymatically catalysed decarboxylation of P-carboxyaspartic acid (Asa)," Can. J. Chem. 68:886-887, NRC Research Press (1990).
Antons, K.A., et al., "Clinical Perspectives of Starin-Induced Rhabdomyolysis," Am. J. Med. 119:400-409, Excerpta Medica (May 2006).
Apriletti, J.W., et al., "Molecular and Structural Biology of Thyroid Hormone Receptors," Clin. Exp. Pharmacol. Physiol. 25:S2-SI 1, Blackwell Science Asia (1998).
Archer, S.J., et al., "Hepatitis C Virus NS3 Protease Requires Its NS4A Cofactor Peptide for Optimal Binding of a Boronic Acid Inhibitor as Shown by NMR," Chem. Biol. 9:79-92, Elsevier Science Ltd (Jan. 2002).
Arnold, S., et al., "3,5-Diiodothyronine binds to subunit Va of cytochrome-c oxidase and abolishes the allosteric inhibition of respiration by ATP," Eur. J. Biochem. 252:325-330, Blackwell Science Ltd (1998).
Arnold, L.A., et al., "Discovery of Small Molecule Inhibitors of the Interaction of the Thyroid Hormone Receptor with Transciptional Coregulators," J. Biol. Chem. 280:43048-43055, American Society for Biochemistry and Molecular Biology (Dec. 2005).
Asahara, Solvent Handbook, with English translation, pp. 47-51 (1985).
Auerbach, B.J., et al., "Comparative Effects of HMG-CoA reductase inhibitors on apo B production in the casein-fed rabbit: Atorvastatin versus Lovastatin," Atherosclerosis 115:173-180, Elsevier Science Ltd (1995).
Auberson, Y.P., et al., "N-Phosphonoalkyl-5-Aminomethylquinoxaline-2,3-Diones: In Vivo Active AMPA and NMDA (Glycine) Antagonists," Bioorg. Med. Chem. Lett. 9:249-254, Elsevier Science Ltd (1999).
Austin, Glycogen Storage Disease, the Paitient-Parent Handbook. May 1, 2016.
Ayajiki, K., et al., "Endothelial and Neuronal Functions in Cerebral and Temporal Arteries from Monkeys Fed a High Cholesterol Diet," J. Cardiovascular Pharmacol. 40:456-466, Lippincott Williams & Wilkins (Sep. 2002).
Ayers, et al., "Thyroid hormone analogues: their role in treatment of hyperlipidemia," J. Endocrinol. Diabetes Obes 2(3): 1042. 2014.
Ayers, "Viking's VK2809: A question of safety, not efficacy", Seeking Alpha, Jan. 8, 2018, XP055945971, https://seekingalpha.com/article/4136028-vikings-vk2809-question-of-safety-not-efficacy.
Ball, S.G., et al., "3,5-Diiodo-L-thyronine (T2) has selective thyromimetic effects in vivo and in vitro," J. Mal. Endocrinol. 19:137-147, Society for Endocrinology (1997).
Baxter, J.D., et al., "Structure-Based Design and Synthesis of a Thyroid Homone Receptor (TR) Antagonist," Endocrinology 143:517-524, Endocrine Society (Feb. 2002).
Baxter, J.D., et al., "Selective activation of thyroid hormone signaling pathways by GC-1: a new approach to controlling cholesterol and body weight," Trends Endocrinol. Metab. 15:154-157, Elsevier Science Ltd (May/Jun. 2004).
Beg, M.A.A. and Clark, H.C., "Chemistry of the Trifluoromethyl Group, Part III. Phenyltrifluoromethylphospine and Related Compounds," Can. J. Chem. 39:564- 570, NRC Research Press (1962).
Beg, M.A.A. and Clark, H.C., "Chemistry of the Trifluoromethyl Group, Part IV. Diphenyltrifluoromethylphophine and Complex Formation by Phenyltrifluoromethylphospines," Can. J. Chem. 40:283-288, NRC Research Press (1962).
Benayoud, F. and Hammond, G.B., "An expedient synthesis of (a,a-difluoroprop-2-ynyl) phosphonate esters," Chem. Commun. 1447-1448, Royal Society of Chemistry (1996).
Bhattacharya, "Investigation and management of the hepatic glycogen storage diseases," Transl Pediatrics, vol. 4, No. 3, Jan. 1, 2015.
Bianco, AC., et al., "Biochemistry, Cellular and Molecular Biology, and Physiolgical Roles of the Iodothyronine Selenodeiodinases," Endocrine Rev. 23:38-89, the Endocrine Society (Feb. 2002).
Bilger, C., et al., "A Convenient One-Pot Synthesis of Aralkyl Bromides and Iodides by Reductive Halogenation of Aromatic Carbonyl Compounds," Synthesis 902-904, Georg Thieme Verlag (1988).
Blennemann, B., et al., "Tissue-Specific Regulation of Fatty Acid Synthesis by Thyroid Hormone," Endocrinology 130:637-643, the Endocrine Society (1992).
Bobyleva, V., et al., "Decrease in mitochondrial energy coupling by thyroid hormones: a physiological effect rather than a pathological hyperthyroidism consequence," FEBS Lett. 430:409-413, Elsevier Science Ltd (1998).
Bocan, T.M.A., et al., "HMG-CoA reductase and ACAT inhibitors act synergistically to lower plasma cholesterol and limit atheroscle-

(56) References Cited

OTHER PUBLICATIONS rotic lesion development in the cholesterol-fed rabbit," Atherosclerosis 139:21-30, Elsevier Science Ltd. (1998).
Bogardus, J.B. and Higuchi, T., "Kinetics and Mechanism of Hydorolysis of Labile Quaternary Ammonium Derivatives of Tertiary Amines," J. Pharm. Sci. 71:729-735, Wiley (1982).
Bohmer, V. and Vogt, W., "7.(o-Hydroxyphenyl)methylphosphonic acids: Synthesis and Potentiometric Determination of their pKa Values," Helvetica Chimica Acta 76:139-149, Verlag Helvetica Chimica Acta (1993).
Boyd, E.A., et al., "Facile Synthesis of Functionalised Phenylphosphinic Acid Derivatives," Tetrahedron Lett. 37:1651-1654, Elsevier Science Ltd (1996).
Boyd, E.A. and Regan, AC., "Synthesis of y-Keto-substituted Phosphinic Acids from Bis(trimethylsilyl)phosponite and a,P-Unsaturated Ketones," Tetrahedron Lett. 332:813-816, Elsevier Science Ltd (1992).
Boyer et al., "Synthesis and Biological Evaluation of a Series of Liver-Selective Phosphonic Acid Thyroid Hormone Receptor Agonists and Their Prodrugs", J. Med. Chem., 51:7075-7093 (2008).
Briel, D., et al., "3-Amino-5-phenoxythiophenes: Syntheses and Structure-Function Studies of a Novel Class of Inhibitors of Cellular L-Triiodothyronine Uptake," J. Med. Chem. 42:1849-1854, American Chemical Society (1999).
Brooks, et al., "Large Animal Models and New Therapies for Glycogen Storage Disease," J Inherit Metab Dis. May 2015; 38(3): 505-509.
Brown, K., et al., "Accelerator Mass Spectrometry for Biomedical Research," Meth. Enzymol. 402:423-443, Academic Press (Nov. 2005).
Byrn et al., "Pharmaceutical solids: A strategic approach to regulatory considerations", Pharmaceutical Research, vol. 12(7):945-954, (1995).
Cabalska, et al., "Treatment with D-thyroxine of patients with glycogen storage diseases type VI and Via," Materia Medica Polona, Wydawnietwa Handlu Zagranicznego, Warsaw, PL, vol. 19, No. 4, Sep. 30, 1987.
Cable, et al., "Reduction of Hepatic Steatosis in Rats and Mice After Treatment with a Liver-Targeted Thyroid Hormone Receptor Agonist," Hepatology, 2009, vol. 49, pp. 407-417.
Caira, "Crystalline polymorphism or organic compounds", Topics in Current Chemistry, vol. 198:163-208 (1998).
Carvalho, et al., "Glycogen Storage Disease type 1a—a secondary cause for hyperlipidemia: report of five cases," Journal of Diabetes & Metabolic Disorders 2013, 12:25.
Christian, M.S. and Trenton, N.A., "Evaluation of thyroid function in neonatal and adult rats: The neglected endocrine mode of action," Pure Appl. Chem. 75:2055-2068, International Union of Pure and Applied Chemistry (Nov. 2003).
Chou, et al., "Glycogen storage disease type 1 and G6Pase-β deficiency: etiology and therapy," Nat Rev Endocrinol. Dec. 2010; 6(12): 676-688.
Cimmino, M., et al., "Demonstration of in vivo metabolic effects of 3,5-di-iodothyronine," J. Endocrinol. 149:319-325, Society for Endocrinology (1996).
Clutterbuck, P.W. and Cohen, J.B., "The Aryl and Alkyl Sulphonamides," J. Chem. Soc. 123:2507-2515, Royal Society of Chemistry (1923).
Collazo, A-M.G., et al., "Thyroid receptor ligands. Part 5: Novel bicyclic agonist ligands selective for the thyroid hormone receptor B," Bioorg. Med. Chem. Lett. 16:1240-1244, Elsevier Science Ltd. (Mar. 2006).
Columbano, A., et al., "The Thyroid Hormone Receptor-Agonist GC-1 Induces Cell Proliferation in Rat Liver and Pancreas," Endocrinology 147:3211-3218, Endocrine Society (Mar. 2006).
Connolly, et al., "Future Pharmacotherapy for Non-alcoholic Steatohepatitis (NASH): Review of Phase 2 and 3 Trials," Journal of Clinical and Translational Hepatology (2018) vol. 6, pp. 264-275. Epub Jun. 28, 2018.

Corrie, J.E.T. and Trentham, D.R., "Synthetic, Mechanistic and Photochemical Studies of Phosphate Esters of Substituted Benzoins," J. Chem. Soc. Perkin Trans. 1: 2409-2417, Chemical Society (1992).
Crimmins, M.T., et al., "Asymmetric Aldol Additions: Use of Titanium Tetrachloride and (-)-Sparteine for the Soft Enolization of N-Acyl Oxazolidinones, Oxazolidinethiones, and Thiazolidinethiones," J. Org. Chem. 66:894-902, American Chemical Society (2001).
Croxall, W.J., et al., "Organic Reactions with Boron Fluoride. XI. The Condensation of Propylene with m-andp-Hydroxybenzoic acids," J. Am. Chem. Soc. 57:1549-1551, American Chemical Society (1935).
Danzi, S., et al., "Triiodothyronine-mediated myosin heavy chain gene transcription in the heart," Am. J. Physiol. Heart Circ. Physiol. 284:H2255-H2262, the American Physiological Society (2003).
Database Beilstein, (Online), Beilstein Registry No. 7222862, 6 pages, Beilstein Institute for Organic Chemistry, Frankfurt-Main, DE , 1995.
Database Beilstein, (Online), Beilstein Registry No. 7505261, 2 pages, Beilstein Institute for Organic Chemistry, Frankfurt-Main, DE , 1996.
Database Beilstein, (Online), Beilstein Registry No. 6636402, 4 pages, Beilstein Institute for Organic Chemistry, Frankfurt-Main, DE , 1993.
Database CAplus, Chemical Abstract Service, Columbus Ohio, Enrion, M.D., et al., "Preparation of phosphonic acid-containing liver-selective thyromimetics effective against metabolic diseases," WO 2005-0512986, 16 pages (created Jun. 2005).
Davis, R. and Untch, K.G., "Direct one-step Conversion of Alcohols into Nitriles," J. Org. Chem. 46:2985-2987, American Chemical Society (1981).
Davis, P.J., et al., "Comparison of the mechanisms of nongenomic actions of thyroid hormone and steroid hormones," J. Endocrinol. Invest. 25: 377-388, Italian Society of Endocrinology (Apr. 2002).
De Brabandere, V.I., et al., "Isotope Dilution-Liquid Chromatography/Electrospray Ionization-Tandem Mass Spectrometry for the Determination of Serum Thyroxine as a Potential Reference Method," Rapid Commun. Mass Spectrometry 12:1099-1103, Wiley (1998).
De Sandro, V., et al., "Comparison of the Effects of Propylthiouracil, Amiodarone, Diphenylhydantoin, Phenobarbital, and 3-Methylcholanthrene on Hepatic and Renal T4 Metabolisn and Thyroid Gland Function in Rats," Toxicol. Appl. Pharmacol. 111:263-278, Academic Press (1991).
Demori, I., et al., "3,-5-diiodothyronine Mimics the Effect of Triiodothyronine on Insulin-like growth Factor Binding Protein-4 Expression in Cultured Rat Hepatocytes," Harm. Metab. Res. 36:679-685, Georg Thieme Verlag (Oct. 2004).
Deprele, S. and Montchamp, J.-L., "A novel and convenient preparation of hypophosphite esters," J. Organometallic Chem. 643-644:154-163, Elsevier Science Ltd (Aug. 2002).
Detoisien et al., "A rapid method for screening crystallization conditions and phases of an active pharmaceutical ingredient", Organic Process Research & Development, vol. 13:1338-1342 (2009).
Dhawan, B. and Redmore, D., "1,2-Alkanediol Bis(Dihydrogen Phosphates)," Synth. Commun. 18:327-331, Georg Thieme Verlag (1988).
Dingwall, J.G., et al., "Diethoxymethylphosphonites and Phospinates. Intermediates for the Synthesis of a,P-and y-Aminoalkylphosphonous Acids," Tetrahedron 45:3787-3808, Pergamon Press (1989).
DiStefano III, J.J. and Feng, D., "Comparative Aspects of the Distrubution, Metabolism, and Excretion of Six Iodothyronines in the Rat," Endocrinology 123:2514-2525, Endocrine Society (1988).
Docter, R., et al., "Inhibition of Uptake of Thyroid Hormone into Rat Hepatocytes by Preincubation with N-Bromoacety1-3,3',5-Triiodothyronine," Endocrinology 123:1520-1525, the Endocrine Society (1988).
Dow, R.L., et al., "Discovery of a Novel Series of 6-Azauracil-Based Thyroid Hormone Receptor Ligands: Potent, TRP Subtype-Selective Thyromimetics," Bioorg. Med. Chem. Lett. 13:379-382, Elsevier Science Ltd (Nov. 2003).
Duntas, "Thyroid Disease and Lipids," Thyroid, vol. 12, No. 4, 2002.

(56) References Cited

OTHER PUBLICATIONS

Drechsler, U. and Hanack, M., "An Easy Route from Catechols to Phthalonitriles," Synlett 1207-1208, Georg Thieme Verlag (1998).
Earle, M.J., et al., "The first high yield green route to a pharmaceutical in a room temperature ionic liquid," Green Chem. 2:261-262, Royal Society of Chemistry (2000).
Ebdrup, S., et al., "Structure-activity relationship for aryl and heteroarly boronic acid inhibitors of homone-sensitive lipase," Bioorg. Med. Chem. 13:2305-2312, Elsevier Science Ltd (Jan. 2005).
Edmundson, R.S., et al., "Cyclic Organophosphorus Compounds. Part 23. Configurational Assignments in the 4-Phenyl-I ,3,2A.5-dioxaphosphorinane Series. X-Ray Molecular Structure of cis-2-Benzylamino-4-phenyl-1,3,2-dioxaphosphorinane 2-Oxide," J. Chem. Res. Synop. 5:122-123, Science Reviews, Ltd. (1989).
Edwards, M.L., et al., "Difluoromethyldiphenylphosphine oxide. A new reagent for conversion of carbonyl compounds to 1,1-difluoroolefins," Tetrahedron Lett. 31:5571-5574, Elsevier Science Ltd (1990).
Eisch, J.J., et al., "Rearrangement and Cleavage of [(Aryloxy)methyl]silanes by Organolithium Reagents: Conversion of Phenols into Benzylic alcohols," J. Org. Chem. 47:5051-5056, American Chemical Society (1982).
Ekins, R., "Validity of Analog Free Thyroxin Immunoassays" Clin. Chem. 33:2137-2152, American Association for Clinical Chemistry (1987).
Endres, et al., "D-Thyroxine Treatment in Glycogen Storage Disease Type Via," Pediatric Research, vol. 18, No. 8, Aug. 1, 1984.
Erion, M.D., et al., "Design, Synthesis, and Characterization of a Series of Cytochrome P450 3A-Activated Prodrugs (HepDirect Prodrugs) Useful for Targeting Phosph(on)ate-Based Drugs to the Liver," J. Am. Chem. Soc. 126:5154-5163, American Chemical Society (Apr. 2004).
Erion, M.D., et al., "Liver-Targeted Drug Delivery Using HepDirect Prodrugs," J. Pharmacol. Exper. Ther. 312:554-560, American Society for Pharmacology and Experimental Therapeutics (Feb. 2005).
Erion, et al., "Targeting thyroid hormone receptor-β agonists to the liver reduces cholesterol and triglycerides and improves the therapeutic index," PNAS, Sep. 25, 2007, vol. 104, No. 39.
Fabiano, E., et al., "A Simple Conversion of Alcohols into Amines," Synthesis 190-192, Georg Thieme Verlag (1987).
Faergemann, J., et al., "Dose-Response Effects of Triiodothyroacetic Acid (Triac) and other Thyroid Hormone Analogues on Glucocorticoid-Induced Skin Atrophy in the Haired Mouse," Acta Derm. Venereal. 82:179-183, Society for the Publication of Acta Dermato-Venereologica (Mar. 2002).
Farquhar, D., et al., "Biologically-Cleavable Phosphate Protective Groups: 4-Acyloxy-1,3,2-Dioxaphosphorinanes as Neutral Latent Precursors of Dianionic Phosphates," Tetrahedron Lett. 36:655-658, Elsevier Science Ltd. (1995).
Feinstein, S., et al., "Submitral Atheromatous Lesions in Monkey and Man", Clin. Cardiol. 6:109-115, John Wiley & Sons, Inc. (1983).
Feng, W., et al., "Hormone-Dependent Coactivator Binding to a Hydrophobic Cleft on Nuclear Receptors," Science 280:1747-1749, American Association for the Advancement of Science (1998).
Field, L.D. and Wilkinson, M.P., "A new Synthesis of 1,2-Bis(Bis(Trifluoromethyl)Phosphino)ethane," Tetrahedron Lett. 33:7601-7604, Elsevier Science Ltd (1992).
Fieser, L.F. and Ardao, M.I., "Investigation of the Chemical Nature of Gonyleptidine," J. Am. Chem. Soc. 78:774-781, American Chemical Society (1956).
Fiorucci et al., "Future trends in the treament of non-alcoholic steatohepatitis", Pharmacological Research, vol. 134(17):289-298 (2018).
Fleischmann, K., et al., "Synthesis of HR 916 B: The First Technically Feasible Route to the 1-(Pivaloyloxy)ethyl Esters of Cephalosporins," Liebigs Ann. 1735-1741, Verlag Chemie (1996).
Fong, T.-L., et al., "Hyperthyroidism and Hepatic Dysfunction," J. Clin. Gastroenterol. 14:240-244, Raven Press (1992).
Freitas, F.R.S., et al., "Spared bone mass in rats treated with thyroid hormone receptor TRf3-selective compound GC-1," Am. J. Physiol. Endocrinol. Metab. 285:EI 135-EI 141, American Physiological Society (Sep. 2003).
Freitas, F.R.S., et al., "The Thyroid Hormone Receptor f3-Specific Agonist GC-1 Selectivity Affects the Bone Development of Hypothyroid Rats," J. Bone Mineral Res. 20:294-304, American Society for Bone and Mineral Research (Nov. 2004).
Froestl, W., et al., "Phosphinic Acid Analogues of GABA. I. New Potent and Selective GABAB Agonists," J. Med. Chem. 38:3297-3312, American Chemical Society (1995).
Froestl, W., et al., "Phosphinic Acid Analogues of GABA. 2. Selective, Orally Active GABAB Antagonists," J. Med. Chem. 38:3313-3331, American Chemical Society (1995).
Fujitaki, et al., "Preclinical Pharmacokinetics of a HepDirect Prodrug of a Novel Phosphonate-Containing Thyroid Hormone Receptor Agonist," The American Society for Pharmacology and Experimental Therapeutics, vol. 36, No. 11, 2008.
Gallagher, M. J. and Honegger, H., "Organophosphorus Intermediates. VI. The Acid-Catalysed Reaction of Trialkyl Orthoformates with Phosphinic Acid," Aust. J. Chem. 33:287-294, Commonwealth Scientific and Industrial Research Organization (1980).
Garibaldi, et al. "Destrothyroxine treatment of phosphorylase-kinase deficiency glycogenosis in four boys," Helvetica Paediatrica Acta, Schwabe, Basel, CH, vol. 33, No. 4-5, Oct. 31, 1978.
Gilman, H. and Calloway, N_O_, "Super-Aromatic Properties of Furan. II. The Friedel-Crafts Reaction," J. Am. Chem. Soc. 55:4197-4205, American Chemical Society (1933).
Goglia, F., et al., "In Vitro binding of 3,5-di-iodo-L-thyronine to rat liver mitochondria," J. Mo!. Endocrinol. 13: 275-282, Society for Endocrinology (1994).
Goglia, F., "Biological Effects of 3,5-Diiodothyronine (T2) ," Biochemistry (Moscow) 70:164-172, Pleiades Publishing, Inc. (Feb. 2005).
Goglia, F., et al., "Interaction of diiodothyronines with isolated cytochrome c oxidase," FEBS Lett. 346:295-298, Elsevier Science Ltd. (1994).
Goodrich, P., et al., "Kinetic Study of the Metal Triflate Catalyzed Benzoylation of Anisole in an Ionic Liquid," Ind. Eng. Chem. Res. 45:6640-6647, American Chemical Society (Sep. 2006).
Goswami, A., et al., "Inhibition by coumadin anticoagulants of enzymatic outer ring monodeiodination of iodothyronines," Biochem. Biophys. Res. Commun. 104:1231-1238, Academic Press (1982).
Goya, R.G., et al., "Effects of Growth Hormone and Thyroxine on Thymulin Secretion in Aging Rats," Neuroendocrinology 58:338-343, S. Karger AG, Basel (1993).
Greco, M.N., et al., "Discovery of Potent, Selective, Orally Active, Nonpeptide Inhibitors of Human Mast Cell Chymase," J. Med. Chem. 50:1727-1730, American Chemical Society (Mar. 2007).
Gregory, R.B. and Berry, M.N., "On the thyroid hormone-induced increase in respiratory capacity of isolated rat hepatocytes," Biochim. Biophys. Acta I 098:6 I-67, Elsevier Science Ltd. (1991).
Gronemeyer, H., et al., "Principles for Modulation of the Nuclear Receptor Superfamily" Nature Reviews, Drug Discovery 3:950-964, Nature Publishing Group (Nov. 2004).
Grover, G.J., et al., "Development of the Thyroid Homone Receptor P-Subtype Agonist KB-141: A Strategy for Body Weight Reduction and Lipid Lowering with Minimal Cardiac Side Effects," Cardiovascular Drug Rev. 23:133-148, Blackwell Publishing (Nov. 2005).
Grover, G.J., et al., "Selective thyroid hormone receptor-P activation: A strategy for reduction of weight, cholesterol, and lipoprotein (a) with reduced cardiovascular liability," PNAS J00:I0067-I0072, National Academy of Sciences (Aug. 2003).
Grundy, et al., "Implications of Recent Clinical Trials for the National cholesterol Education Program Adult Treatment Panel III Guidelines," Circulation. 2004; 110:227-239; downloaded from http://circ.ahajournals.org/.
Guernik, S., et al., "A novel system consisting of Rh-DuPHOS and ionic liquid for asymmetric hydrogenations," Chem. Commun. 2314-2315, Royal Society of Chemistry (2001).
Hadvary, P. and Weller, T., "202. Conformationally Restricted Analogs of Platelet-Activating Factor (PAP)," Helvetica Chimica Acta 69:1862-1871, Verlag Helvetica Chimica Acta (1986).

(56) References Cited

OTHER PUBLICATIONS

Hansen, et al., "Mouse models of nonalcoholic steaohepatitis in preclinical drug development," Drug Discovery Today, vol. 22, No. 11, Nov. 2017.
Hashimoto, A., et al., "Design and synthesis of complementing ligands for mutant thyroid hormone receptor TRP(R320H): a tailor-made approach toward the treatment of resistance to thyroid hormone," Bioorg. Med. Chem. 13:3627-3639, Elsevier Science Ltd (Jun. 2005).
Haugen, et al., "Drugs That Suppress TSH or Cause Central Hypothyroidism," Best Pract Res Clin endocrinol. Metab. Dec. 2009; 23(6): 793-800.
Hayakawa, Y., et al., "A General Approach to Nucleoside 3'- and 5'-Monophosphates," Tetrahedron Lett. 28:2259-2262, Elsevier Science Ltd. (1987).
Hedfors, A., et al., "Thyroid Receptor Ligands. 3. Design and Synthesis of 3,5-Dihalo-4-alkoxyphenylalkanoic Acids as Indirect Antagonistis of the Thyroid Hormone Receptor," J. Med. Chem. 48:3114-3117, American Chemical Society (May 2005).
Heimberg, M., et al., "Plasma Lipoproteins and Regulation of Heptic Metabolism of Fatty Acids in Altered Thyroid States," Endocrine Rev. 6:590-607, Endocrine Society (1985).
Hennemann, G., et al., "Carrier-Mediated Transport of Thyroid Hormone into Rat Hepatocytes is Rate-Limiting in Total Cellular Uptake and Metabolism," Endocrinology 119:1870-1872, Endocrine Society (1986).
Hennemann, G., "Notes on the History of Cellular Uptake and Deiodination of Thyroid Hormone," Thyroid 15:753-756, Mary Ann Liebert Publishers (Aug. 2005).
Hilfiker et al., "Polymorphism in the pharmaceutical industry", XP002528052:1-19 (2006).
Hirayama, Organic Compound Crystal Preparation Handbook—Principles and Know-How, Maruzen Co., Ltd. Jul. 25, 2008, pp. 57-84, with English translation.
Holt, "Thyroxine Therapy in Glycogen-Storage Disease," Nutrition Reviews, vol. 14, No. 7, Jul. 27, 1956.
Holy, A, "Phosphonomethoxyalkyl Analogs of Nucleotides," Curr. Pharm. Des. 9:2567-2592, Bentham Science Publishers (Dec. 2003).
Hopper et al., 1999, CAS: 130:332269.
Horst, C., et al., "3,5-Di-iodo-L-thyronine suppresses TSH in rats in vivo and in rat pituitary fragments in vitro," J. Endocrinol. 145:291-297, Society for Endocrinology (1995).
Horst, C., et al., "Rapid Stimulation of hepatic oxygen consumption by 3,5-di-iodo-L-thyronine," Biochem. J. 261:945-950, Portland Press (1989).
Howarth, J., et al., "Sodium Borohydride Reduction of Aldehydes and Ketones in the Recyclable Ionic Liquid [BMIM]PF 6," Synth. Commun. 31:2935-2938, Taylor & Francis (2001).
Huddleston, J.G., et al., "Characterization and comparison of hydrophilic and hydrophobic room temperature ionic liquids incorporating the imidazolium cation," Green Chem. 3:156-164, Royal Society of Chemistry (2001).
Hum, G., et al., "Synthesis of [Difluoro-(3-alkenylphenyl)-methyl]-phosphonic Acids on Non-crosslinked Polystyrene and Their Evaluation as Inhibitors of PTPIB," Bioorg. Med. Chem. Lett. 12:3471-3474, Elsevier Science Ltd (Aug. 2002).
Hume, J.R., et al., "Anion Transport in Heart," Physiol. Rev. 80:31-81, the American Physiological Society (2000).
Hunter, D.H., et al., "Crown ether catalysis of decarboxylation and decarbalkoxylation of j3-keto acids and malonates: a synthetic application," Can. J. Chem. 58:2271-2277, NRC Research Press (1980).
Ibrahini et al., 2000, CAS: 133:14000.
Ichikawa, K., et al., "Mechanism ofliver-selective thyromimetic activity of SK&F L-94901: evidence for the presence of a cell-type-specific nuclear iodothyronine transport process," J Endocrinol. 165:391-397, Society for Endocrinology (2000).
Ing, H.R., "The Pharmacology of Homologous Series," Fortschritte der Arzneimittelforschung. Progress in drug research. Progres des recherches pharmaceutiques 20:306-309, Birkhauser Verlag (1964).
Iyer, S. and Liebeskind, L.S., "Regiospecific Synthesis of 2-Methoxy-3-methyl-1,4-benzoquinones fromMaleoylcobalt Complexes andAlkynes via Lewis Acid Catalysis. A Highly Convergent Route to Isoquinoline Quinones," J Am. Chem. Soc. 109:2759-2770, American Chemical Society (1987).
Jain, M.R., et al., "Dual PPARα/γ agonist saroglitazar improves liver histopathology and biochemistry in experimental NASH models", Liver International, (2018) vol. 38, pp. 1084-1094. Epub Dec. 14, 2017.
Jakobsson, T., et al., "Potential Role of Thyroid Receptor β Agonists in the Treatment of Hyperlipidemia", Drugs (2017) vol. 77, pp. 1613-1621.
Jepson, E.M., "Thyroxine analogues as hypocholesterolemic agents," Am. Heart J 67:422-424, Mosby (1964).
Johnson, E.O., et al., "Experimentally-induced hyperthyroidism is associated with activation of the rat hypothalamic-pituitay-adrenal axis," Eur. J Endocrinol. 153:177-185, BioScientifica Ltd (Jul. 2005).
Jones, P.B. and Porter, N.A., "2-Aroylbenzoyl Serine Proteases: Photoreversible Inhibtion or Photoaffinity Labeling?," J Am. Chem. Soc. 121:2753-2761, American Chemical Society (1999).
Jorgensen, E.C., "Thyroid Hormones and Analogs. II. Structure-Activity Relationships," in: Hormonal Proteins and Peptides, Li, C.H., eds., Academic Press, New York, NY, pp. 107-204 (1978).
Jorgensen, E.C., "Thyroid Hormones and Analogs. I. Synthesis, Physical Properties and Theoretical Calculations," in: Hormonal Proteins and Peptides, Li, C.H., eds., Academic Press, New York, NY, pp. 56-105 (1978).
Jorgensen, E.C. and Murray, W.J., "Thyroxine Analogs. 22. Thyromimetic Activity of Halogen-Free Derivatives of 3,5-Dimethyl-L-Thyronine," J Med. Chem. 17:434-439 (1974).
Kadenbach, B., et al., "Mitochondrial Energy Metabolsim is Regulated via Nuclear-Coded Subunits of Cytochrome C Oxidase," Free Radical Biol. Med. 29:211-221, Elsevier Science Ltd (2000).
Kazemifard, A.G., et al., "Identification and quantitation of sodium-thyroxine and its degradation products by LC using electrochemical and MS detection," J Pharm. Biomed. Anal. 25:697-71 I, Elsevier Science Ltd. (2001).
Kennedy, J.A., et al., "Influence ofImiprarnine on the Hypothalamic/Pituitary/Thyroid Axis of the Rat," Metabolism 46:1429-1434, W.B. Saunders (1997).
Kennedy, J.F, et al., "Isolation of thyroxine-binding globulin (TBG) by immunoadsorption chromatography: some physical and immunochemical characteristics of TBG," Clinica Chimica Acta 129:251-261, Elsevier Science Ltd (1983).
Kido et al., "Current status of hepatic glycogen storage disease in Japan: clinical manifestations, treatments and long-term outcomes," Joural of Human Genetics (2013) 58, 285-292.
Kishnani, et al., "Diagnosis and management of glycogen storage disease type I: a practice guideline of the American College of Medical Genetics and Genomics," Genetics in Medicine, submitted Aug. 12, 2014.
Knolker, H-J. and Filali, S., "Transition Metal Complexes in Organic Synthesis, Part 69. Total Synthesis of theAmaryllidaceae Alkaloids Anhydrolycorinone and Hippadine Using Iron-and Palladium-Mediated Coupling Reactions," Synlett 1752-1754, Georg Thieme Verlag (Jun. 2003).
Kobayashi, H., et al., "Organization ofNucleosides Supported by Boronic-Acid-Appended Poly(L-lysine): Creation of a Novel RNA Mimic," Bull. Chem. Soc. Jpn. 74:1311-1317, the Chemical Society of Japan (2001).
Koehler, K., et al., "Thyroid Receptor Ligands. 6. A High Affinity "Direct Antagonist" Selective for the Thyroid Hormone Receptor," J. Med. Chem. 49:6635-6637, American Chemical Society (Oct. 2006).
Koerner, D., et al., "Binding of Selected Iodothyronine Analogues to Receptor Sites of Isolated Rat Hepatic Nuclei," J. Biol. Chem. 250:6417-6423, American Society for Biochemistry and Molecular Biology (1975).
Koulischer, "Glycogen-Storage Disease : A Study on the Effect of Sodium/-Thyroxine and Glucagon," AMA Journal of Diseases of Children, vol. 91, No. 2, Feb. 1, 1956.

(56) References Cited

OTHER PUBLICATIONS

Kowalik et al., "Thyroid hormones, thyromimetics and their metabolites in the treatment of liver disease", Frontiers in Endocrinology, vol. 9:1-11, (Jul. 10, 2018).
Krause, B.R., et al., "Opposite effects of beza:fibrate and gemfibrozil in both normal and hypertriglyceridemic rats," Atherosclerosis 127:91-101, Elsevier Science Ltd (1996).
Kvetny, J., "3,5-T2 Stimulates Oxygen Consumption, But Not Glucose Uptake in Human Mononuclear Blood Cells," Horm. Metab. Res. 24:322-325, Georg Thieme Verlag (1992).
Lacoste, AM., et al., "Research Regarding Aminoalkylphosphonic Acids. II.—Iodine Derivatives of the Phosphonic Analog of Tyrosine," Bull. Soc. Chim. Biol. 49:1827-1835, Masson Et Cie (1967).
Lacoste, A.-M., et al., "Biochemistry—Synthesis and biological properties of the phosphonic analog of thyroxine," C.R. Acad. Sci. Paris 267: 1890-1892, Gauthier Villars Editeur (1968).
Lacoste, A.-M., et al., "Endrocrinology. Action of the phosphonic analog of thyroxine on post-embryonic development of the tadpole of Rana dalmatina Bon," Biol. Soc. Bordeaux 1684-1689 (1967).
Lanni, A., et al., "Specific Binding sites for 3,3'-diiodo-L-thyronine (3,3'-T2) in rat liver mitochondria," FEES Lett. 351:237-240, Elsevier Science Ltd (1994).
Lanni, A., et al., "Effect of 3,3'-di-iodothyronine and 3,5-di-iodothyronine on rat liver mitochondria," J. Endocrinol. 136:59-64, Society for Endocrinology (1993).
Lanni, A., et al., "Effect of 3,3'-diiodothyronine and 3,5-diiodothyronine on rat liver oxidative capacity," Mol. Cell. Endocrinol. 86:143-148, Elsevier Scientific Publishers Ireland (1992).
Lanni, A., et al., "Rapid stimulation in vitro ofrat liver cytochrome oxidase activity by 3,5-diiodo-l-thyronine and by 3,3'-diiodo-L-thyronine," Mol. Cell. Endocrinol. 99:89-94, Elsevier Science Ltd (1994).
Lanni, A., et al., "Expression of uncoupling protein-3 and mitochondrial activity in the transition from hypothyroid to hyperthyroid state in rat skeletal muscle," FEBS Lett. 444:250-254, Elsevier Science Ltd. (1999).
Lanni, A., et al., "Calorigenic effect of diiodothyronines in the rat," J. Physiol. 494:831-837, Blackwell Publishing (1996).
Laskorin, B.N., et al., "Preparation and Investigation of the Steric Structure of Sterically Hindered a-oxo Phosphoryl Compounds," Zhurnal Obshchei Khimii 44:1716-1720, RossiiskayaAkademiya Nauk (1974).
Lee, S.-G., et al., "Microwave-assisted Kabachnik-Fields Reaction in Ionic Liquid," Bull. Korean Chem. Soc. 23:667-668, the Korean Chemical Society (Mar. 2002).
Lee, Y.-P., et al., "Effects of Thyroid Hormones on the Guinea Pig," Endocrinology 86:241-250, the Endocrine Society (1970).
Leonard, J.L. and Rosenberg, I.N., "Iodothyronine 5'-Deiodinase from Rat Kidney: Substrate Specificity and the 5'-Deiodination of Reverse Triiodothrvonine," EndocrinolofIV 107:1376-1383, the Endocrine Society (1980).
Leonard, J.L. and Rosenberg, I.N., "Thyroxine 5'-Deiodinase Activity of Rat Kidney: Observations on Activation by Thiols and Inhibition by Propylthiouracil," Endocrinology 103:2137-2144, the Endocrine Society (1978).
Lewis, D.S., "Effects of dietary cholestrol on adipose tissue lipoprotein lipase in the baboon," Biochim. Biophys. Acta 879:44-50, Elsevier Science Ltd (1986).
Li, Y.-L., et al., "Thyroid receptor ligands. Part 4: 4'-amido bioisosteric ligands selective for the thyroid hormone receptor beta," Bioorg. Med. Chem. Lett. 16:884-886, Elsevier Science Ltd (Feb. 2006).
Lian, B., "Evaluation of the Thyroid Receptor Agonist VK2809 on Liver Disease in DIO-NASH Mice,", Hepatology, Oct. 2017, vol. 66, No. Suppl. 1, Sp. Iss. SI, p. 1038A.
Liddle, C., et al., "Separate and Interactive Regulation of Cytochrome P450 3A4 by Triiodothyronine, Dexamethasone, and Growth Hormone in Cultured Hepatocytes," J. Clin. Endocrinol. Metab. 83:2411-2416, the Endocrine Society (1998).

Lin, C.-C., et al., Pharmacokinetics of Pradefovir and PMEA in Healthy Volunteers After Oral Dosing of Pradefovir, 11 J Clin. Pharmacol. 45:1250-1258, Sage Science Press (Nov. 2005).
Linsel-Nitschke, P. and Tall, AR., "HDL as a Target in the Treatment of Atherosclerotic Cardiovascular Disease," Nature Reviews, Drug Discovery 4:193-205, Nature Publishing Group (Mar. 2005).
Liotta, D., et al., "A Simple, Inexpensive Procedure for the Large-Scale Production of Alkyl Quinones," J Org. Chem. 48:2932-2933, American Chemical Society (1983).
Lombardi, A., et al., "Characterization of the binding of 3, 3'-diiodo-L-thyronine to rate liver mitochondria," J Endocrinol. 154:119-124, Society for Endocrinology (1997).
Lombardi, A., et al., "Effect of 3,5-di-iodo-L-thyronine on the mitochondrial energy-transduction apparatus," Biochem. J 330:521-526, Portland Press (1998).
Lonsdale, et al., "Normalization of Hepatic Phosphorylase Kinase Activity and Glycogen Concentration in Glycogen Storage Diseas Type IX During Treatment with Sodium D Thyroxine," American Journal of Human Genetics; Annual Meeting of the American Society of Human Genetics, vol. 29, No. 6, Nov. 1, 1977.
Lukashev, N.V., et al., "Palladium-Catalyzed Cross-Coupling Reactions of Organocopper Derivatives of Methylphosphonic Esters and Amides with Aryl and Hetaryl Iodides," Russian J. Gen. Chem. 71:172-178, Kluwer Academic Publishers (2001).
Mackenzie, P.I., et al., "Regulation of UDP Glucuronosyltransferase Genes," Curr. Drug Metab. 4:249-257, Bentham Science Publishers (Jun. 2003).
Madrigal-Matute, et al., "Regulation of Liver Metabolism by Autophagy," Reviews in Basic and Clinical Gastroenterology and Hepatology, Gastroenterology 2016 150:328-339.
Mains, R.E. and Eipper, B.A., "Tissue Culture of Primary Rat Anterior Pituitary Cells" in Regulatory Peptides: From Molecular Biology to Function, Costa, E., Trabucchi, M., eds., Raven Press, New York City, NY, pp. 1-8 (1982).
Makinen, M.W. and Lee, C.-P., "Biochemical Studies of Skeletal Muscle Mitochondria: I. Microanalysis of Cytochrome Content, Oxidative and Phosphorylative Activities of Mammalian Skeletal Muscle Mitochondria," Arch. Biochem. Biophys. 126:75-82, Academic Press (1968).
Malevannaya, R.A., et al., "(Dialkoxyphosphinyl) Acetic Acids and Some of Their Analogs," Zhurnal Obshchei Khimii 41:1426-1434, Rossiiskaya Akademiya Nauk (1971).
Marcus et al., "Alternate-day dosing with statins", The American Journal of Medicine, vol. 126:99-104 (2013).
Marcune, B.F., et al., "Selective displacement of aryl fluorides with hydroquinone: synthesis of 4-phenoxyphenols" Tetrahedron Lett. 46:7823-7826, Elsevier Science Ltd (Nov. 2005).
Marimuthu, A., et al., "TR Surfaces and Conformations Required to Bind Nuclear Receptor Corepressor" Mal. Endocrinol. 16:271-286, the Endocrine Society (Feb. 2002).
Matsui, T., et al., "Discovery of Novel Phosphonic Acid Derivatives as New Chemical Leads for Inhibitors ofTNF-a Production," Bioorg. Med. Chem. 10:3807-3815, Elsevier Science Ltd (Aug. 2002).
McClain, R.M., "Mechanistic considerations for the relevance of animal data on thyroid neoplasia to human risk assessment," Mutation Res. 333:131-142, Elsevier Science Ltd. (1995).
Mertins, K., et al., "Transition-Metal-Catalyzed Benzylation of Arenes and Heteroarenes," Angew. Chem. Int. Ed. 44:238-242, Wiley-VCR Verlag GmbH & Co. (Dec. 2004).
Middleton, W.J., "New Fluorinating Reagents. Dialkylaminosulfur Fluorides," J. Org. Chem. 40:574-578, American Chemical Society (1975).
Miyahara, E.H., et al., "Thyroid hormone receptor-P-selective agonist GC-24 spares skeletal muscle type I to II fiber shift," Cell Tissue Res. 321:233-241, Springer-Verlag (Aug. 2005).
Mocchegiani, E., et al., "Neuroendocrine-thymus interactions. I. In vitro modulation of thymic factor secretion by thyroid hormones," J. Endocrinol. Invest. 13:139-147, Italian Society of Endocrinology (1990).
Moreno, M., et al., "How the thyroid controls metabolism in the rat: different roles for triiodothyronine and diiodothyronines," J. Physiol. 505:529-538, Cambridge Univ. Press (1997).

(56) References Cited

OTHER PUBLICATIONS

Morkin, E., et al., "Pilot Studies on the Use of 3, 5-Diiodothyropropionic Acid, a Thyroid Hormone Analog, in the Treatment of Congestive Heart Failure," Cardiology 97:218-225, S. Karger AG, Basel (Jul. 2002).
Moscioni, AD. and Gartner, L.M., "Thyroid Hormone and Hepatic UDP-Glucuronosyl Transferase Activity: Contrary Effects in Rat and Mouse," Res. Commun. Chem. Pathol. Pharmacol. 39:445-462, Pjd Publications Ltd (1983).
Murphy-Jolly, M.B., et al., "The synthesis of tris(perfluoroalkyl)phosphines," Chem. Commun. 4479-4480, Royal Society of Chemistry (Aug. 2005).
Nabeshima, T., et al., "Rate-accelerating Metal Ion Effects on Decarboxylation of a-Keto Acids by a Thiazolium Ion bearing a Metal Binding Site," J. Chem. Soc. Chem. Commun. 373-374, Royal Society of Chemistry (1991).
Ness, G.C., et al., "Effects of L-Triiodothyronine and the Thyromimetic L-94901 on Serum Lipoprotein Levels and Hepatic Low-Density Lipoprotein Receptor, 3-Hydroxy-3-methylglutaryl Coenzyme A Reductase, and Apo A-I Gene Expression," Biochem. Pharmacol. 56:121-129, Elsevier Science Ltd (1998).
Nguyen, N.-H., et al., "Hammett Analysis of Selective Thyroid Hormone Receptor Modulators Reveals Structural and Electronic Requirements for Homone Antagonists," J. Am. Chem. Soc. 127:4599-4608, American Chemical Society (Mar. 2005).
Nishinaga, et al., "Model Reactions for the Biosynthesis of Thyroxine. XII. The Nature of a Thyroxine Precursor Formed in the Synthesis of Thyroxine from Diiodotyrosine and Its Keto Acid Analog," Biochemistry 7:388-397, American Chemical Society (1968).
Nurtdinov, S.Kh., et al., "Reactions of Alkylphosphonous Dichlorides with Carboxylic Acid Chlorides," Zhurnal Obshchei Khimii 41:2486-2490, Rossiiskaya Akademiya Nauk (1971).
Ocasio, Cory A, and Scanlan, T.S., "Clinical prospects for new thyroid hormone analogues" Curr. Opin. Endocrinol. Diabetes 12:363-370, Lippincott Williams & Wilkins (Oct. 2005).
Ocasio, Cory A, and Scanlan, T.S., "Design and characterization of a thyroid hermone receptor a (TRa)-Specific Agonist," ACS Chem. Biol. 1:585-593, American Chemical Society (Oct. 2006).
O'Reilly, Ian, and Murphy, M.P., "Studies on the rapid stimulation of mitochondrial respiration by thyroid hormones." Acta Endocrinol. 127:542-546, Romanian Society for Endocrinology (1992).
O'Reilly, Ian, and Murphy, M.P., "Treatment of hypothyroid rats with T2 (3,5-di-iodo-L-thyronine) rapidly stimulates respiration in subsequently isolated mitochondria," Biochem. Soc. Trans. 20:59S, Portland Press (1991).
Osuka, A, et al., "Synthesis of Arenephosphonates by Copper(!) Iodide—Promoted Arylation of Phosphite Anions," Synthesis 69-71, George Thieme Verlag- Stuttart (1983).
Pan, S.-Y., et al., "Bifendate treatment attenuates hepatic steatosis in cholesterol/bile salt- and high-fat diet-induced hypercholesterolemia in mice," Eur. J. Pharmacol. 552:170-175 Elsevier Science Ltd (Dec. 2006).
Panne, P., et al., "Cyanide initiated perfluoroorganylations with perfluoroorgano silicon comoounds" J. Fluorine Chem. 112:283-286 Elsevier Science Ltd (2001).
Petervari, E., et al., "Hyperphagia of hyperthyroidism: Is neuropeptide Y involved?" Regulatory Peptides 131:103-110, Elsevier Science Ltd (Nov. 2005).
Prashad, M., "Phosphonate vs. Phosphinate Elimination during Olefination of Aldehydes," Tetrahedron Lett. 34:1585-1588, Elsevier Science Ltd (1993).
Psarra, A.-M.G., et al., "The mitochondrion as a primary site of action of steroid and thyroid hormones: Presence and action of steroid and thyroid hormone receptors in mitochondria of animal cells." Mo!. Cell. Endocrinol. 246:21-33, Elsevier Science Ltd (Feb. 2006).
PubChem CID 15942005, National Center for Biotechnology Information, PubChem Compound Summary for CID 15942005, Unii3Z11398fnq, https://pubchem.ncbi.nlm.nih.gov/compound/15942005, accessed Aug. 18, 2022, create date Feb. 21, 2007.
Pue, M.A., et al., "The disposition of SK&F L-94901, a selective thyromimetic in rat, dog and cynomolgus monkey," Eur. J. Drug Metab. Pharmacokinetics 14:209-219, Edition Medecine Et Hygiene (1989).
Radominska-Pandya, A., et al., "A Historical Overview of the Heterologous Expression of Mammalian UDP-Glucuronosyltransferase Isoforms Over the Past Twenty Years," Curr. Drug Metab. 6:141-160, Bentham Science Publishers Ltd. (Apr. 2005).
Rai, R., and Katzenellenbogen, J.A., "Effect of Conformational Mobility and Hydrogen-Bonding Interactions on the Selectivity of Some Guanidinoaryl-Substituted Mechanism-Based Inhibitors of Trypsin-like Serine Proteases," J. Med. Chem. 35:4297-4305, American Chemical Society (1992).
Raparti et al., "Selective thyroid hormone receptor modulators," Indian J. Endocrinol. Metab. Mar.-Apr. 2013; 17(2): 211-218.
Rashid, S., et al., "Effect of Atorvastatin on High-Density Lipoprotein Apolipoprotein A-I Production and Clearance in the New Zealand White Rabbit," Circulation 106:2955-2960, Lippincott Williams & Wilkins (Dec. 2002).
Razumov, A.I. and Gazizov, M.B., "Reactivity of Organophosphorus Carbonyl-Containing Compounds IV. Synthesis, Properties, and Structure of Acylphosphinic Esters," Zhurnal Obshchei Khimii 37:2738-2742, Rossiiskaya Akademiya Nauk (1967).
Reiter et al. {Phosphinic acid-based MMP-13 inhibitors that spare MMP-1 and MMP-3, Bioorganic & Medicinal Chemistry Letters (2003), 13(14), 2331-2336.
Ren, S.G., et al., "Dose-Response Relationship Between Thyroid Hormone and Growth Velocity in Cynomolgus Monkeys," J. Clin. Endocrinol. Metab. 66:1010-1013, the Endocrine Society (1988).
Reuters Market News, "Brief-Viking Therapeutics says statistically significant reductions in fibrosis, liver collage, after 8 weeks of VK2809 treatment," [retrieved from Internet on Jul. 28, 2018] <URL: https://www.reuters.com/article/brief-viking-therapeutics-says-statistic/brief-viking-therapeutics-says-statistically-significant-reductions-in-fibrosis-liver-collagen-after-8-weeks-of-vk2809-treatment-idUSFWN1J308Y> Published online Jun. 6, 2017.
Ribeiro, R.C.J., et al., "X-ray Crystallographic and Functional Studies of Thyroid Hormone Receptor," J. Steroid Biochem. Molec. Biol. 65:133-141, Pergamon Press (1998).
Rooda, S.J.E., et al., "Metabolism of Triiodothyronine in Rat Hepatocytes," Endocrinology 125:2187-2197, the Endocrine Society (1989).
Ross, J. and Xiao, J., "Friedel-Crafts acylation reactions using metal triflates in ionic liquid," Green Chem. 4:129-133, Royal Society of Chemistry (Feb. 2002).
Ruhlandt-Senge, K. and Englich, U., "Synthesis and characterization of the first discrete potassium thiolates displaying three different coordination spheres at potassium in one molecule," Chem. Commun. 147-148, Royal Society of Chemistry (1996).
Ryono et al. CAS: 141:395288. , 2004.
Ryono et al., 2004, CAS: 927006.
Saitoh, H. and Aungst, B.J., "Improvement of the Intestinal Absorption of a Peptidomimetic, Boronic Acid Thrombin Inhibitor Possibly Utilizing the Oligopeptide Transporter," Pharm. Res. 16:1786-1789, Plenum Publishing Corporation (1999).
Sakamoto, T., et al., "Cross-Coupling of N-Heteroaryl Halides with Active Methylene Compounds in the Presence of Tetrakis(triphenylphosphine)palladium," Chem. Pharm. Bull. 36:1664-1668, Pharmaceutical Society of Japan (1988).
Sakamoto, T., et al., "Palladium-Catalyzed Condensation of Aryl Halides with Phenylsulfonylacetonitrile and Diethyl Cyanomethylphosphonate," Chem. Pharm. Bull. 38:1513-1517, Pharmaceutical Society of Japan (1990).
Samuels, H.H., et al., "Depletion ofL-3,5,3'-Triiodothyronine and L-Thyroxine in Euthyroid Calf Serum for Use in Cell Culture Studies of the Action of Thyroid Hormone," Endocrinolof!V 105:80-85, the Endocrine Society (1979).
Sano, M. and Yamatera, H., "Potential Energy Surface of [Cu(H2O)6]2+ and [Zn(H20)6] 2+ Derived From Ab Initio MO Calculations," Chem. Lett. 1495-1496, the Chemical Society of Japan (1980).

(56) References Cited

OTHER PUBLICATIONS

Sass, D.A., et al., "Nonalcoholic Fatty Liver Disease: A Clinical Review," Dig. Dis. Sci. 50:171-180, Springer Science Business Media, Inc. (Jan. 2005).
Saulnier, M.G., et al., "Microwave-assisted synthesis of primary amine HX salts from halides and 7M ammonia in methanol," Tetrahedron Lett. 45:397-399, Elsevier Science Ltd. (Jan. 2004).
Schlosser, M. and Geneste, H., "The Organometallic Route to Benzylamine Type Monoamine Oxidase Inhibitors," Tetrahedron 54:10119-10124, Pergamon Press (1998).
Schmitt, L., et al., "Synthesis of Arylalkylmonofluorophosphonates as Myo-Inositol monophosphatase Ligands," Tetrahedron Lett. 39:4009-4012, Elsevier Science Ltd. (1998).
Schroder-van der Elst, J.P., et al., "Effects of 5,5'-diphenylhydantoin on the thyroid status in rats," Eur. J. Endocrinol. 134:221-224, BioScientifica Ltd (1996).
Selenkow, H.A. and Asper, Jr., S.P., "Biological Activity of Compounds Structurally Related to Thyroxine," Physiol. Rev. 35:426-474, American Physiological Society (1955).
Shi, Y., et al., "Mutant-Selective Thyromimetics for the Chemical Rescue of Thyroid Hormone Receptor Mutants Associated with Resistance to Thyroid Hormone," Biochemistry 44:4612-4626, American Chemical Society (Mar. 2005).
Smith, C.L. and O'Malley, B.W., "Coregulator Function: A Key to Understanding Tissue Specificity of Selective Receptor Modulators," Endocrine Rev. 25:45-71, the Endocrine Society (Feb. 2004).
Soldin, S.J., et al., "The measurement of free thyroxine by isotope dilution tandem mass spectrometry," Clinica Chimica Acta 358:113-118, Elsevier Science Ltd (Aug. 2005).
Song, K., et al., "Induction of angiotensin converting enzyme and angiotensin II receptors in the atherosclerotic aorta of high-cholesterol fed Cynomolgus monkeys," Atherosclerosis 138:171-182, Elsevier Science Ltd (1998).
Stanton, J.L., et al., "Synthesis and Biological Activity of Phenoxyphenyl Oxamic Acid Derivatives Related to L-Thyronine," Bioorg. Med. Chem. Lett. 10:1661-1663, Elsevier Science Ltd (2000).
Sterling, K. and Brenner, M.A., "Thyroid Hormone Action: Effect of Triiodothyronine on Mitochondrial Adenine Nucleotide Translocase In Vivo and In Vitro," Metabolism 44:193-199, W.B. Saunders (1995).
Tacke, et al., "An update on the recent advances in antifibrotic therapy," Expert Review of Gastroenterology & Hepatology (2018) vol. 12(11), pp. 1143-1152. Epub Oct. 3, 2018.
Tai, S.S.-C., et al., "Candidate Reference Method for Total Thyroxine in Human Serum: Use of Isotope-Dilution Liquid Chromatography-Mass Spectrometry with Electrospray Ionizaton," Clin. Chem. 48:637-642, American Association for Clinical Chemistry (Jan. 2002).
Takayama, S., et al., "Antithyroid Effects of Propylthiouracil and Sulfamonomethoxine in Rats and Monkeys," Toxicol. Applied Pharmacol. 82:191-199, Academic Press (1986).
Tal, D.M. and Karlish, S.J.D., "Synthesis of a Novel Series of Arylmethylisothiouronium Derivatives," Tetrahedron 51:3823-3830, Pergamon Press (1995).
Taylor, A.H., et al., "Beneficial Effects of a Novel Thyromimetic on Lipoprotein Metabolism," Mo!. Pharmacol. 52:542-547, American Society for Pharmacology and Experimental Therapeutics (1997).
Taylor, S.D., et al., "Synthesis of Aryl(DifluoromethylenePhosphonates) via Electrophilic Fluorination of a-Carbanions of Benzylic Phosphonates with N-Fluorobenzenesulfonimide," Tetrahedron 54:1691-1714, Pergamon Press (1998).
Thienpont, L.M., et al., "Isotope Dilution-Gas Chromatography/Mass Spectrometry and Liquid Chromatography/Electrospray Ionization-Tandem Mass Spectrometry for the Determination of Triiodo-L-Thyronine in Serum," Rapid Commun. Mass Spectrometry 13:1924-1931, John Wiley & Sons, Ltd (1999).
Thornber, C.W., "Isosterism and Molecular Modification in Drug Design," Chem. Soc. Rev. 8:563-580, Chemical Society (1979).
Togashi, M., et al., "Conformational adaptation of nuclear receptor ligand binding domains to agonists: Potential for novel approaches to ligand design," J. Steroid Biochem. Mo!. Biol. 93:127-137, Elsevier Science Ltd (Feb. 2005).
Tomilov, A.P., et al., "Electrochemical synthesis of diethyl fluoromethanephosphonate," J. Fluorine Chem. 82:39-41, Elsevier Science Ltd. (1997).
Toussaint, 0., et al., "The Copper(I)-Catalyzed Decarboxylation of Malonic Acids: A New Mild and Quantitative Method," Synthesis 1029-1031, Georg Thieme Verlag (1986).
Trost, S.U., et al., "The Thyroid Hormone Receptor-13-Selective Agonist GC-1 Differentially Affects Plasma Lipids and Cardiac Activity," Endocrinology 141:3057-3064, the Endocrine Society (2000).
Tsuchimoto, T., et al., "Scandium(III) Triflate Catalyzed Friedel-Crafts Alkylation Reactions," J. Org. Chem. 62:6997-7005, American Chemical Society (1997).
Tyree, E.B., et al., "Effect of L-Triiodothyronine on Radiation-Induced Pulmonary Fibrosis in Dogs", Radiation Research (1966) vol. 28, pp. 30-36.
Underwood, A.H., et al., "A thyromimetic that decreases plasma cholesterol levels without increasing cardiac activity," Nature 324:425-429, Nature Publishing Group (1986).
Van Rompaey, K., et al., "A versatile synthesis of 2-substituted 4-amino-1,2,4,5-tetrahydro-2-benzazepine-3-ones," Tetrahedron 59:4421-4432, Pergamon Press (Apr. 2003).
Vaughan, M.K., et al., "Chronic Exposure to Short Photoperiod Inhibits Free Thyroxine Index and Plasma Levels of TSH, T4, Triiodothyronine (T3) and Cholesterol in Female Syrian Hamsters," Comp. Biochem. Physiol. 7JA:615-618, Pergamon Press Ltd (1982).
Veer, G.V.D.S., et al., "Temperature Effects on Free-Thyroxine Measurements: Analytical and Clinical Consequences," Clin. Chem. 38:1327-1331, American Association for Clinical Chemistry (1992).
Verd, J.C., et al., "Different effect of simvastatin and atorvastatin on key enzymes :involved in VLDL synthesis and catabolismin high fat/cholestrol fed rabbits," Br. J. Pharmacol. 127:1479-1485, Nature Publishing Group (1999).
Villicev, C.M., et al., "Thyroid hormone receptor-specific agonist GC-1 increases energy expenditure and prevents fat-mass accumulation in rats," J. Endocrinol. 193:21-29, Society for Endocrinology (Jan. 2007).
Visser, T.J., et al., "Deiodination of Thyroid Hormone by Human Liver," J. Clin. Endocrinol. Metab. 67:17-24, the Endocrine Society (1988).
Walker, D.M., et al., "Design and Synthesis of y-Oxygenated Phosphinothricins as Inhibitors of Gluamine Synthetase," J. Chem. Soc. Perkin Trans. 1 659-666, Royal Society of Chemistry (1990).
Wang, B., et al., "Effects of triiodo-thyronine on angiotensin-induced cardiomyocyte hypertrophy: reversal of increased-myosin heavy chain gene expression," Can. J. Physiol. Pharmacol. 84:935-941, NRC Research Press (Aug. 2006).
Wang, R., et al., "Salsalate Administration—A Potential Pharmacological Model of the Sick Euthyroid Syndrome," J. Clin. Endocrinol. Metab. 83:3095-3099, Endocrine Society (1998).
Waschbiisch, R., et al., "A high yield:ing synthesis of diethyl-I-fluoromethylphosphonate in pure form," C. R Acad. Sci. Paris, t. I, Serie II c 1:49-52, Elsevier Science Ltd (1998).
Wasserscheid, P. and Keim, W., "Ionic Liquids-New "Solutions" for Transition Metal Catalysis," Angew Chem. Int. Ed. 39:3772-3789, Wiley-VCR Verlag GmbH (2000).
Webb, P., et al., "Design of thyroid hormone receptor antagonists from first principles," J. Steroid Biochem. Mo!. Biol. 83:59-73, Elsevier Science Ltd (Dec. 2002).
Wechter, W.J., et al., "Hypocholesterolemic Agents. Thyroalkanols," J. Med. Chem. 8:474-478, American Chemical Society (1965).
Weiskirchen, "Hepatoprotective and anti-fibrotic agents: It's time to take the next step", Frountiers in Pharmacology, vol. 6(7):1-40 (2016).
Wells, P.G., et al., "Effect of thyrotoxicosis on liver blood flow and propranolol disposition after long-term dosing," Clin. Pharmacol. Ther. 33:603-608, Nature Publishing Group (1983).
Welton, T., "Room-Temperature Ionic Liquids. Solvents for Synthesis and Catalysis," Chem. Rev. 99:2071-2083, American Chemical Society (1999).

(56) References Cited

OTHER PUBLICATIONS

Wibom, R., et al., "A sensitive method for measuring ATP-formation in rat muscle mitochondria," Scand. J Clin. Lab. Invest. 50:143-152, Taylor & Francis Health Sciences (1990).

Wienand, A, et al., "Design, Synthesis and Biological Evaluation of Selective Boron-containing Thrombin Inhibitors," Bioorg. Med. Chem. 7:1295-1307, Elsevier Science Ltd. (1999).

Willnow, T.E. and Herz, J., "Animal models for disorders of hepatic lipoprotein metabolism," J Mal. Med. 73:213-220, Springer-Verlag (1995).

Winder, W.W., et al., "Effects of thyroid hormone administration on skeletal muscle mitochondria," Am. J Physiol. 228:1341-1345, American Physiological Society (1975).

Wondisford, F.E., "Unlikely partners in weight loss?," Cell Metab. 3:81-82, Cell Press (Feb. 2006).

Wu, K.-M. and Farrelly, J.G., "Preclinical Development of New Drugs that Enhance Thyroid Hormone Metabolism and Clearance: Inadequacy of Using Rats as an Animal Model for Predicting Human Risks in an IND and NDA," Am. J Therap. 13:141-144, Lippincott Williams & Wilkins (Mar./Apr. 2006).

Wu, Y., et al., "Removal of Thiazolidinethione Auxiliaries with Benzyl Alcohol Mediated by DMAP," J Org. Chem. 69:6141-6144, American Chemical Society (May 2004).

Xu, L., et al., "Heck Reaction in Ionic Liquids and the in Situ Identification of N-Heterocyclic Carbene Complexes of Palladium," Organometallics 19:1123-1127, American Chemical Society (2000).

Yang, W., et al., "Boronic Acid Compounds as Potential Pharmaceutical Agents," Med. Res. Rev. 23:346-368, Wiley Periodicals, Inc. (May 2003).

Yang, C. and Pittman, Jr., C.U., "Reductions of Organic Functional Groups Using NaBHi or NaBH,JLiCl in Diglyme at 125 to 162° C.," Synth. Commun. 28:2027-2041, Georg Thieme Verlag (1998).

Yao, et al., "Regulation of fatty acid composition and lipid storage by thyroid hormone in mouse liver," Cell & Bioscience, Biomed Central Ltd. Vo. 4, No. 1 Jul. 30, 2014.

Ye, L., et al., "Thyroid Receptor Ligands. I. Agonist Ligands Selective for the Thyroid Receptor pl," J Med. Chem. 46:1580-1588, American Chemical Society (Mar. 2003).

Yen, P.M., "Physiological and Molecular Basis of Thyroid Hormone Action," Physiol. Rev. 81:1097-1142, American Physiological Society (2001).

Yoshihara, H.A.1., et al., "Structural Determinants of Selective Thyromimetics" J. Med. Chem. 46:3152-3161, American Chemical Society (Jul. 2003).

Yoshioka, R., et al., "The Optical Resolution and Asymmetric Transformation of DL-p-Hydroxyphenylglycine with (+)-1-Phenylethanesulfonic Acid," Bull. Chem. Soc. Jpn. 60:649-652, the Chemical Society of Japan (1987).

Yu, K.-L., et al., "Concerning the Phosphorylation of Vicinal Dials," Synth. Commun. 18:465-468, Taylor & Francis, Inc. (1988).

Yu et al., "Thyroid hormone inhibits lung fibrosis in mice by improving epithelial mitochondrial function", Nature Medicine (2018) vol. 24(1), pp. 39-49. Epub Dec. 4, 2017.

Viking Therapeutics, Press releases, "Viking Therapeutics Announces Presentation of Data from In Vivo Proof-of-Concept Study of VK2809 in Glycogen Storage Disease la (GSD la) at the 13th International Congress of Inborn Errors of Metabolism (ICIEM)", [retrieved from internet on Jun. 8, 2018] <URL: http://ir.vikingtherapeutics.com/2017-09-07-Viking-Therapeutics-Announces-Presentation-of-Data-from-In-Vivo-Proof-of-Concept-Study-of-VK2809-in-Glycogen-Storage-Disease-la-GSD-la-at-the-13th-International-Congress-of-Inborn-Errors-of-Metabolism-ICIEM> published on Sep. 7, 2017.

Viking Therapeutics—News & Events, "Viking Therapeutics Presents Results from In Vivo Study of VK2809 in Biopsy-Confirmed Non-Alcoholic Steatohepatitis (NASH) at the Annual Meeting of the American Association for the Study of Liver Diseases (AASLD)", Oct. 24, 2017, San Diego <URL: http://ir.vikingtherapeutics.com/2017-10-24-Viking-Therapeutics-Presents-Results-from-In-Vivo-Study-of-VK2809-in-Biopsy-Confirmed-Non-Alcoholic-Steatohepatitis-NASH-at-the-Annual-Meeting-of-the-American-Association-for-the-Study-of-Liver-Diseases-AASLD> [retrieved from Internet on Feb. 9, 2020].

Viking Therapeutics—News & Events, "Viking Therapeutics Announces Results of Gene Expression Analysis from In Vivo Study of VK2809 in Non-Alcoholic Steatohepatitis (NASH)", Sep. 11, 2017, San Diego <URL: http://ir.vikingtherapeutics.com/2017-09-11-Viking-Therapeutics-Announces-Results-of-Gene-Expression-Analysis-from-In-Vivo-Study-of-VK2809-in-Non-Alcoholic-Steatohepatitis-NASH> [retrieved from Internet on Feb. 9, 2020].

Zalkow, L.H., et al., "Studies in the Synthesis of Camptothecin. An Efficient Synthesis of 2,3-Dihydro-1H-pyrrolo[3,4-b]quinoline," J. Chem. Soc. 3551-3554, Royal Society of Chemistry (1971).

Zenker, N. and Jorgensen, E.C., "Thyroxine Analogs. I. Synthesis of 3,5-Diiodo-4-(2'-alkylphenoxy)-DL-phenylalanines," J. Am. Chem. Soc. 81:4643-4647, American Chemical Society (1959).

Zhang, N. and Casida, J.E., "Novel Irreversible Butyrylcholinesterase Inhibitors: 2-Chloro-1-(substituted-phenyl)ethylphosphonic Acids," Bioorg. Med. Chem. 10:1281-1290, Elsevier Science Ltd (Nov. 2002).

Zhang, J. and Lazar, M.A., "The Mechanism of Action of Thyroid Hormones," Annu. Rev. Physiol. 62:439-466, Annual Reviews (2000).

Zhou et al., "A liver-specific thyromimetic, VK2809, Decreases Hepatosteatosis in Glycogen Storage Disease Type 1a", Thyroid, vol. 29(8):1158-1167 (2019).

Partial Supplemental European Seach Report in European Application No. 21822855, dated Apr. 17, 2024, in 14 pages.

Hepatology, Oct. 2018, vol. 68(1) Supp. 1, p. 1448A, Abstract No. LB-4, Embase (online), dated searched Oct. 24, 2023, retrieved from STN, Accession No. 0053280282.

Office Action with English translation in Japanese application No. 2021-532071, mailed on Jul. 16, 2024, in 4 pages.

X-ray powder diffraction pattern of amorphous form of compound of Formula (I) from Starting Material A.

X-ray powder diffraction pattern of TBME solvate crystalline form of compound of Formula (I) from Test 6.

X-ray powder diffraction pattern of ethanol solvate crystalline form of compound of Formula (I) from Test 8.

X-ray powder diffraction pattern of THF solvate crystalline form of compound of Formula (I) from Test 9.

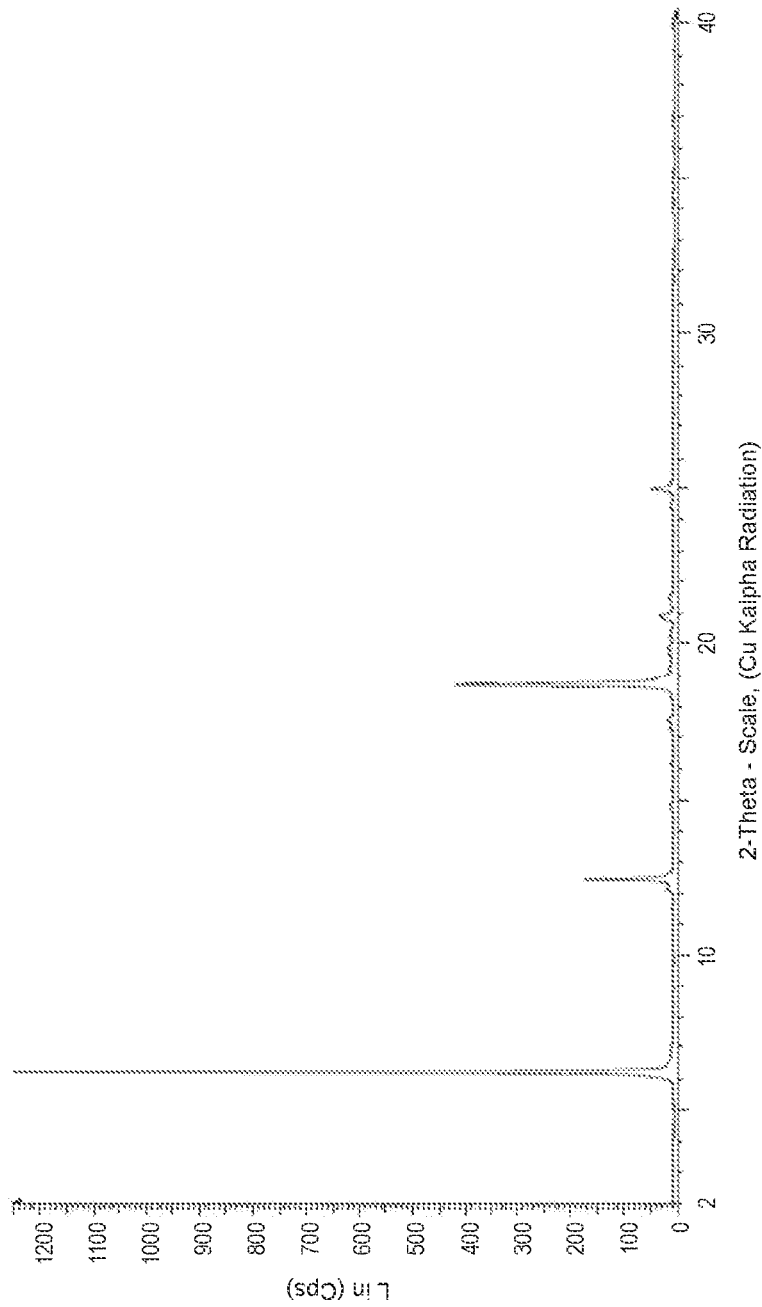

Zoomed x-ray powder diffraction pattern of ethyl acetate solvate crystalline form of compound of Formula (I) from Test 10.

X-ray powder diffraction pattern of acetone solvate solvate crystalline form of compound of Formula (I) from Test 11.

Zoomed x-ray powder diffraction pattern of acetone solvate solvate crystalline form of compound of Formula (I) from Test 11.

X-ray powder diffraction pattern of THF solvate crystalline form of compound of Formula (I) from Test 14.

Zoomed x-ray powder diffraction pattern of THF solvate crystalline form of compound of Formula (I) from Test 14.

X-ray powder diffraction pattern of crystalline form of compound of Formula (I) from Test 15.

X-ray powder diffraction pattern of THF solvate crystalline form of compound of Formula (I) from Test 20.

Zoomed x-ray powder diffraction pattern of THF solvate crystalline form of compound of Formula (I) from Test 20.

X-ray powder diffraction pattern of crystalline Form C of compound of Formula (I) from Test 21.

X-ray powder diffraction pattern of crystalline Form C of compound of Formula (I) from Test 23.

Digital Scanning Calorimetry Results for TBME solvate crystalline form of compound of Formula (I) from Test 6.

Digital Scanning Calorimetry Results for toluene solvate crystalline form of compound of Formula (I) from Test 7.

Digital Scanning Calorimetry Results for ethanol solvate crystalline form of compound of Formula (I) from Test 8.

Digital Scanning Calorimetry Results for acetone solvate crystalline form of compound of Formula (I) from Test 11.

Digital Scanning Calorimetry Results for THF solvate crystalline form of compound of Formula (I) from Test 20.

First heating Digital Scanning Calorimetry Results for crystalline Form C of compound of Formula (I) from Test 21.

Second heating Digital Scanning Calorimetry Results for now amorphous form of compound of Formula (I) from previously crystalline Form C of compound of Formula (I) from Test 21.

X-ray powder diffraction pattern of mixed form of compound of Formula (I) from Test 48.

Zoomed x-ray powder diffraction pattern of mixed form of compound of Formula (I) from Test 48.

X-ray powder diffraction pattern of crystalline Form C of compound of Formula (I) from Test 30.

X-ray powder diffraction pattern of crystalline Form C of compound of Formula (I) from Test 33.

X-ray powder diffraction pattern of crystalline Form C of compound of Formula (I) from Test 51.

X-ray powder diffraction pattern of crystalline Form C of compound of Formula (I) from Test 47.

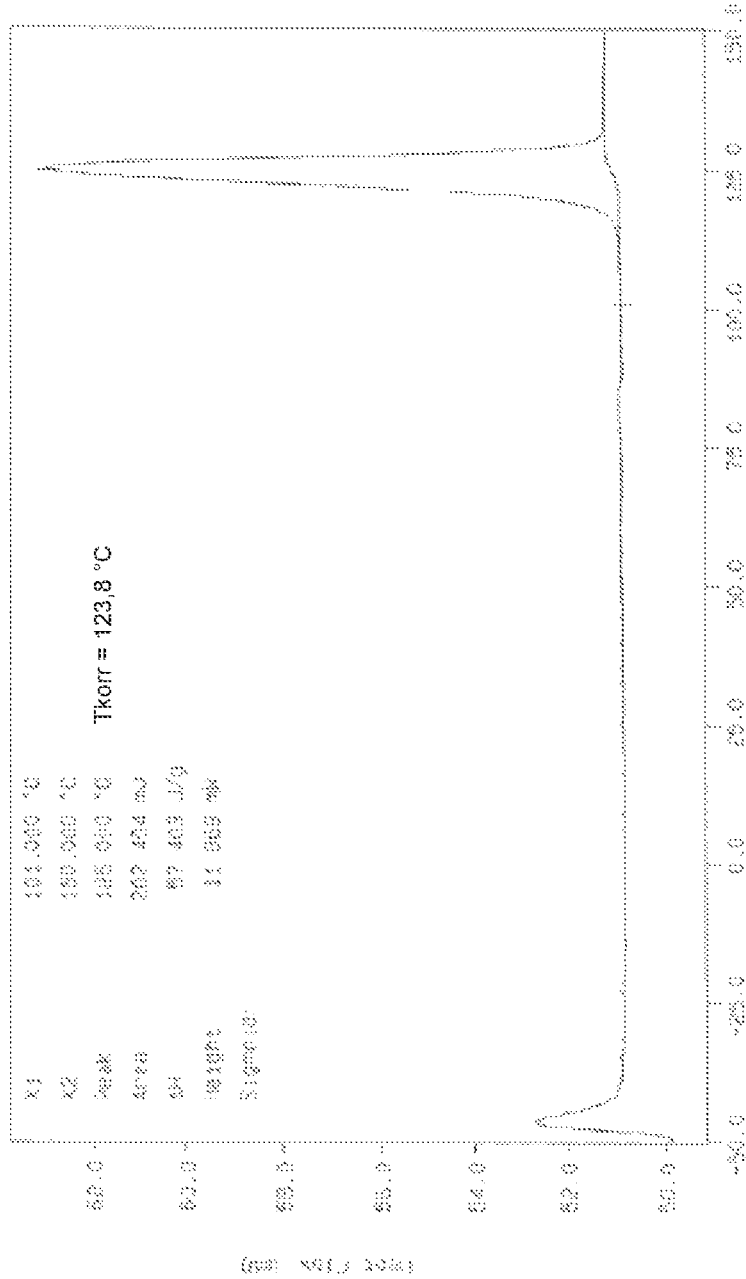
First heating Digital Scanning Calorimetry Results for crystalline Form C of compound of Formula (I) from Test 30.

Second heating Digital Scanning Calorimetry Results for now amorphous form of compound of Formula (I) from previously crystalline Form C of compound of Formula (I) from Test 30.

Dynamic vapor sorption analysis results for crystalline Form C of compound of Formula (I) from Test 49.

Phase equilibrium in water analysis results for crystalline Form C of compound of Formula (I) from Test 51.

X-ray powder diffraction pattern of crystalline Form C of compound of Formula I with observed peak values.

CRYSTALLINE FORMS AND METHODS OF PRODUCING CRYSTALLINE FORMS OF A COMPOUND

INCORPORATION BY REFERENCE TO ANY PRIORITY APPLICATIONS

Any and all applications for which a foreign or domestic priority claim is identified in the Application Data Sheet or PCT Request as filed with the present application are hereby incorporated by reference under 37 CFR 1.57, and Rules 4.18 and 20.6. The present application is a continuation of U.S. patent application Ser. No. 16/982,022, filed Sep. 17, 2020, which claims priority to PCT Application No. PCT/US2019/022824, filed Mar. 18, 2019, which claims priority to U.S. Provisional Application No. 62/646,540, filed Mar. 22, 2018, each of which are hereby incorporated by reference in their entirety.

BACKGROUND

Field

The present application relates to the fields of pharmaceutical chemistry, biochemistry, and medicine. In particular, it relates to crystalline forms of the compound of Formula I and methods of making and using the same.

Description

The thyroid hormones (THs) play a critical role in growth, development, metabolism, and homeostasis. They are produced by the thyroid gland as thyroxine (T4) and 3,5,3'-triiodo-L-thyronine (T3). T4 is the major secreted form in humans and is enzymatically deiodinated by deiodinases to the more active form, T3, in peripheral tissues. THs exert their action by interacting with thyroid hormone receptors (TRs), which belong to the nuclear hormone receptor superfamily, and regulate the transcription of target genes.

TRs are expressed in most tissues and exist as two isoforms (TRα and TRβ). Tissue distribution studies, mouse knockout studies, and evaluation of patients with resistance to thyroid hormone (RTH) syndrome have established that TRα is the predominant isoform in the heart and regulates most cardiac functions, while the TRβ isoform predominates in the liver and the pituitary and regulates cholesterol metabolism and thyroid stimulating hormone (TSH) production, respectively. In addition, TRβ agonists may be used for the treatment of adrenoleukodystrophy (ALD) and lipid disorders such as hypercholesterolemia and fatty liver diseases, for example non-alcoholic fatty liver disease (NAFLD), non-alcoholic steatohepatitis (NASH), and glycogen storage disease (GSD). Some promising phosphonate TRβ agonists have been discovered; however, there exists a need for improved forms of such compounds to facilitate pharmaceutical development

SUMMARY OF THE INVENTION

Some embodiments provide a composition comprising a crystalline form of a compound of Formula I:

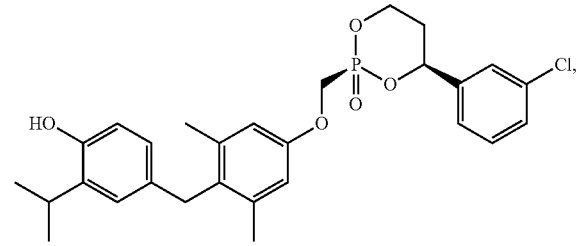

(I)

or a solvate thereof.

Other embodiments provide a process for making a crystalline form of a compound of Formula I, or a solvate thereof, comprising: dissolving an amorphous form of a compound of Formula I in a first solvent to create a first solution; adding a second solvent to the first solution to create a second mixture; and isolating a crystalline form of a compound of Formula I from the second mixture; wherein the compound of Formula I is:

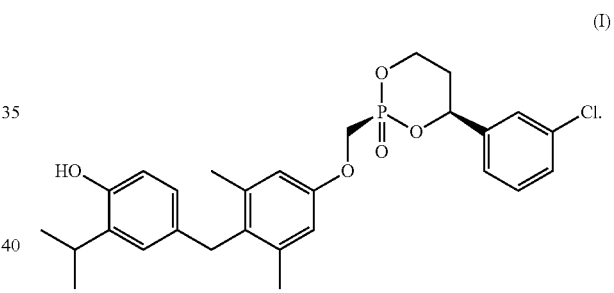

(I)

Still other embodiments provide a process for making a crystalline form of a compound of Formula I, or a solvate thereof, comprising: dissolving a compound of Formula I in a first solvent to create a first solution; adding a seeding crystalline form of the compound of Formula I, or a solvate thereof, to the first solution to create a seeded mixture; and isolating a produced crystalline form of the compound of Formula I, or a solvate thereof, from the seeded mixture; wherein the compound of Formula I is:

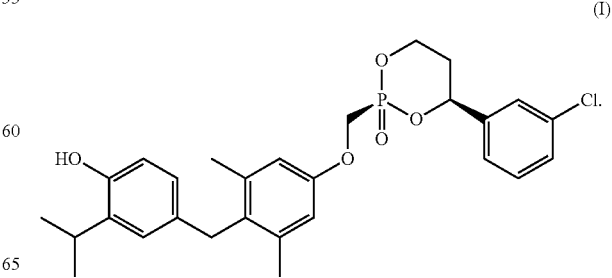

(I)

BRIEF DESCRIPTION OF THE DRAWINGS

FIG. 6a is an X-ray powder diffraction pattern of an EtOAc solvate crystalline form.

FIG. 6b is a zoomed X-ray powder diffraction pattern of the EtOAc solvate crystalline form in FIG. 6a.

FIG. 7b is a zoomed X-ray powder diffraction pattern of the acetone solvate crystalline form in FIG. 7a.

FIG. 8b is a zoomed X-ray powder diffraction pattern of the THF crystalline form in FIG. 8a.

FIG. 10b is a zoomed X-ray powder diffraction pattern of the THF crystalline form in FIG. 10a.

FIG. 19b shows the second heating differential scanning calorimetry results for crystalline Form C from FIG. 19a.

FIG. 20b is a zoomed X-ray powder diffraction pattern of the mixed crystalline form in FIG. 20a.

FIG. 28a shows the first heating differential scanning calorimetry results for crystalline Form C.

FIG. 28b shows the second heating differential scanning calorimetry results for crystalline Form C from FIG. 28a.

DETAILED DESCRIPTION

Figure 1:
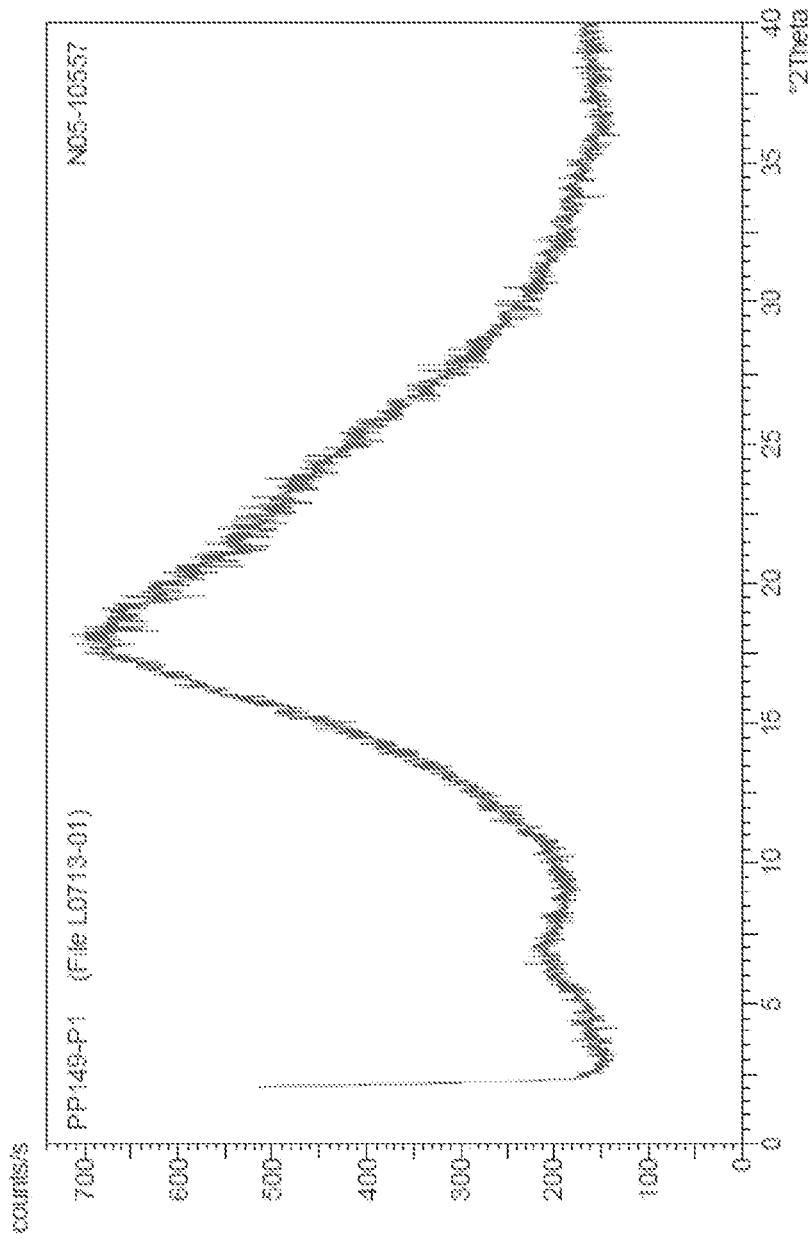
FIG. 1 is an X-ray powder diffraction pattern of an amorphous form.

Disclosed herein are crystalline forms of the compound of Formula (I), or solvates thereof, and methods of crystallizing the compound of Formula I. The compound of Formula I is show below:

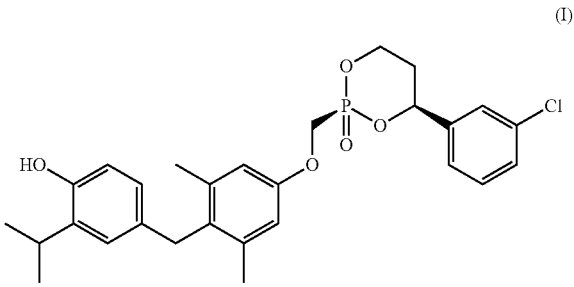 [SMILES: Cc1cc(OC[P@@]2(=O)OCC[C@@H](c3cccc(Cl)c3)O2)cc(C)c1Cc1ccc(O)c(C(C)C)c1]

(I)

Crystalline forms of Formula I, include tert-buty methyl ether (TBME) solvate crystalline form, toluene solvate crystalline form, ethanol solvate crystalline form, tetrahydrofuran (THF) solvate crystalline form, ethyl acetate (EtOAc) solvate crystalline form, acetone solvate crystalline form and crystalline Form C (described herein).

The present application relates to the first crystalline forms of the compounds of Formula I, as well as methods of crystallizing the various crystalline forms of the compounds of Formula I. The crystalline forms advantageously exhibit improved stability, processability and ease of manufacture. As a result, the crystalline forms of Formula I, particularly crystalline Form C, provide long-term stability and low adsorption and desorption of water vapor. Accordingly, the crystalline forms provide significant clinical improvements for the treatment of ALD and lipid disorders such as hypercholesterolemia and fatty liver diseases.

The present application also relates to various crystalline solvate forms and a nonsolvated form of the compound of Formula I, and methods of crystalizing the compound of Formula I.

Methods of Crystalizing the Compound of Formula I

Disclosed are methods of crystalizing the compound of Formula I, or a solvate thereof. Crystalline forms of the compound of Formula I may generally be obtained or produced by crystallizing the compound of Formula I under controlled conditions. In some embodiments, the method produces the TBME solvate crystalline form. In some embodiments, the method produces the toluene solvate crystalline form. In some embodiments, the method produces the ethanol solvate crystalline form. In some embodiments, the method produces the THF solvate crystalline form. In some embodiments, the method produces the EtOAc solvate crystalline form. In some embodiments, the method produces the acetone solvate crystalline form. In some embodiments, the method produces the crystalline Form C In some embodiments, the method comprises dissolving an amorphous form of the compound of Formula I in a first solvent to create a first solution. In some embodiments, the method comprises dissolving a crystalline form of the compound of Formula I, or a solvate thereof, in a first solvent to create a first solution. In some embodiments, the method comprises dissolving a mixture of amorphous and crystalline forms of the compound of Formula I in a first solvent to create a first solution. In some embodiments, the method comprises adding a second solvent to the first solution to create a second mixture. In some embodiments, the second solvent is heptane.

In some embodiments, the method comprises seeding a crystalline form of the compound of Formula I, or a solvate thereof, in a first solution to create a seeded mixture. In some embodiments, the method comprises seeding the TBME solvate crystalline form in a first solution to create a seeded mixture. In some embodiments, the method comprises seeding toluene solvate crystalline form in a first solution to create a seeded mixture. In some embodiments, the method comprises seeding the ethanol solvate crystalline form in a first solution to create a seeded mixture. In some embodiments, the method comprises seeding the THF solvate crystalline form in a first solution to create a seeded mixture. In some embodiments, the method comprises seeding the EtOAc solvate crystalline form in a first solution to create a seeded mixture. In some embodiments, the method comprises seeding the acetone solvate crystalline form in a first solution to create a seeded mixture. In some embodiments, the method comprises seeding crystalline Form C in a first solution to create a seeded mixture.

In some embodiments, the method comprises seeding a crystalline form of the compound of Formula I, or a solvate thereof, in a second solution to create a seeded mixture. In some embodiments, the method comprises seeding the TBME solvate crystalline form in a second solution to create a seeded mixture. In some embodiments, the method comprises seeding toluene solvate crystalline form in a second solution to create a seeded mixture. In some embodiments, the method comprises seeding the ethanol solvate crystalline form in a second solution to create a seeded mixture. In some embodiments, the method comprises seeding the THF solvate crystalline form in a second solution to create a seeded mixture. In some embodiments, the method comprises seeding the EtOAc solvate crystalline form in a second solution to create a seeded mixture. In some embodiments, the method comprises seeding the acetone solvate crystalline form in a second solution to create a seeded mixture. In some embodiments, the method comprises seeding crystalline Form C in a second solution to create a seeded mixture.

In some embodiments, the seeded mixture produces a crystalline form of the compound of Formula I, or a solvate thereof. In some embodiments, the seeded mixture produces the TBME solvate crystalline form. In some embodiments, the seeded mixture produces the toluene solvate crystalline form. In some embodiments, the seeded mixture produces the ethanol solvate crystalline form. In some embodiments, the seeded mixture produces the THF solvate crystalline form. In some embodiments, the seeded mixture produces the EtOAc solvate crystalline form. In some embodiments, the seeded mixture produces the acetone solvate crystalline form.

In some embodiments, the seeded mixture produces crystalline Form C. In some embodiments, the seeded mixture seeded with the TBME solvate crystalline form produces crystalline Form C. In some embodiments, the seeded mixture seeded with the toluene solvate crystalline form produces crystalline Form C. In some embodiments, the seeded mixture seeded with the ethanol solvate crystalline form produces crystalline Form C. In some embodiments, the seeded mixture seeded with the THF solvate crystalline form produces crystalline Form C. In some embodiments, the seeded mixture seeded with the EtOAc solvate crystalline form produces crystalline Form C. In some embodiments, the seeded mixture seeded with the acetone solvate crystalline form produces crystalline Form C. In some embodiments, the seeded mixture seeded with crystalline Form C produces crystalline Form C.

In some embodiments, the method comprises isolating the crystalline form of the compound of Formula I, or a solvate thereof. In some embodiments, isolation is performed by filtration, such as hot-filtration. In some embodiments, the isolated product may be dried, such as by air drying.

In some embodiments, the first solvent may be a single solvent. In some embodiments, the first solvent may be a mixture of two or more solvents. In some embodiments, the first solvent may comprise EtOAc. In some embodiments, the first solvent may comprise ethanol. In some embodiments, the first solvent may comprise acetic acid. In some embodiments, the first solvent may comprise octanol. In some embodiments, the first solvent may comprise N-Methyl-2-pyrrolidone (NMP). In some embodiments, the first solvent may comprise TBME. In some embodiments, the first solvent may comprise toluene. In some embodiments, the first solvent may comprise pyridine. In some embodiments, the first solvent may comprise nitrobenzene. In some embodiments, the first solvent may comprise water. In some embodiments, the first solvent may comprise heptane. In some embodiments, the first solvent may comprise THF. In some embodiments, the first solvent may comprise acetone. In some embodiments, the first solvent may comprise acetonitrile.

In some embodiments, the second solvent may be a single solvent. In some embodiments, the second solvent may be a mixture of two or more solvents. In some embodiments, the second solvent may comprise EtOAc. In some embodiments, the second solvent may comprise ethanol. In some embodiments, the second solvent may comprise acetic acid. In some embodiments, the second solvent may comprise octanol. In some embodiments, the second solvent may comprise NMP. In some embodiments, the second solvent may comprise TBME. In some embodiments, the second solvent may comprise toluene. In some embodiments, the second solvent may comprise pyridine. In some embodiments, the second solvent may comprise nitrobenzene. In some embodiments, the second solvent may comprise water. In some embodiments, the second solvent may comprise heptane. In some embodiments, the second solvent may comprise THF. In some embodiments, the second solvent may comprise acetone. In some embodiments, the second solvent may comprise acetonitrile.

In some embodiments, the method further comprises agitation. In some embodiments, agitation is performed by stirring. In some embodiments, agitation is performed by sonication.

In some embodiments, portions of the method are performed at the same temperature. In some embodiments, portions of the method are performed at various temperatures. In some embodiments, portions of the method are performed at room temperature. In some embodiments, portions of the method are performed at 0° C. to 100° C. In some embodiments, portions of the method are performed at 20° C. to 25° C. In some embodiments, portions of the method are performed at 50° C. to 80° C. In some embodiments, portions of the method are performed at 50° C. to 60° C. In some embodiments, portions of the method are performed at 65° C. to 75° C. In some embodiments, portions of the method are performed at 23° C. In some embodiments, portions of the method are performed at 55° C. In some embodiments, portions of the method are performed at 70° C. In some embodiments, portions of the method may include the first solution, second mixture, seeded mixture, isolation of the crystalline form, and agitation.

Crystalline Forms of the Compound of Formula I

Also disclosed herein are crystalline forms of the compound of Formula I, or solvates thereof, and in particular the TBME solvate crystalline form, toluene solvate crystalline form, ethanol solvate crystalline form, THF solvate crystalline form, EtOAc solvate crystalline form, acetone solvate crystalline form and crystalline Form C (described below).

TBME Solvate Crystalline Form

The precise conditions for forming the TBME solvate crystalline form may be empirically determined and it is only possible to give a number of methods which have been found to be suitable in practice.

Figure 2:
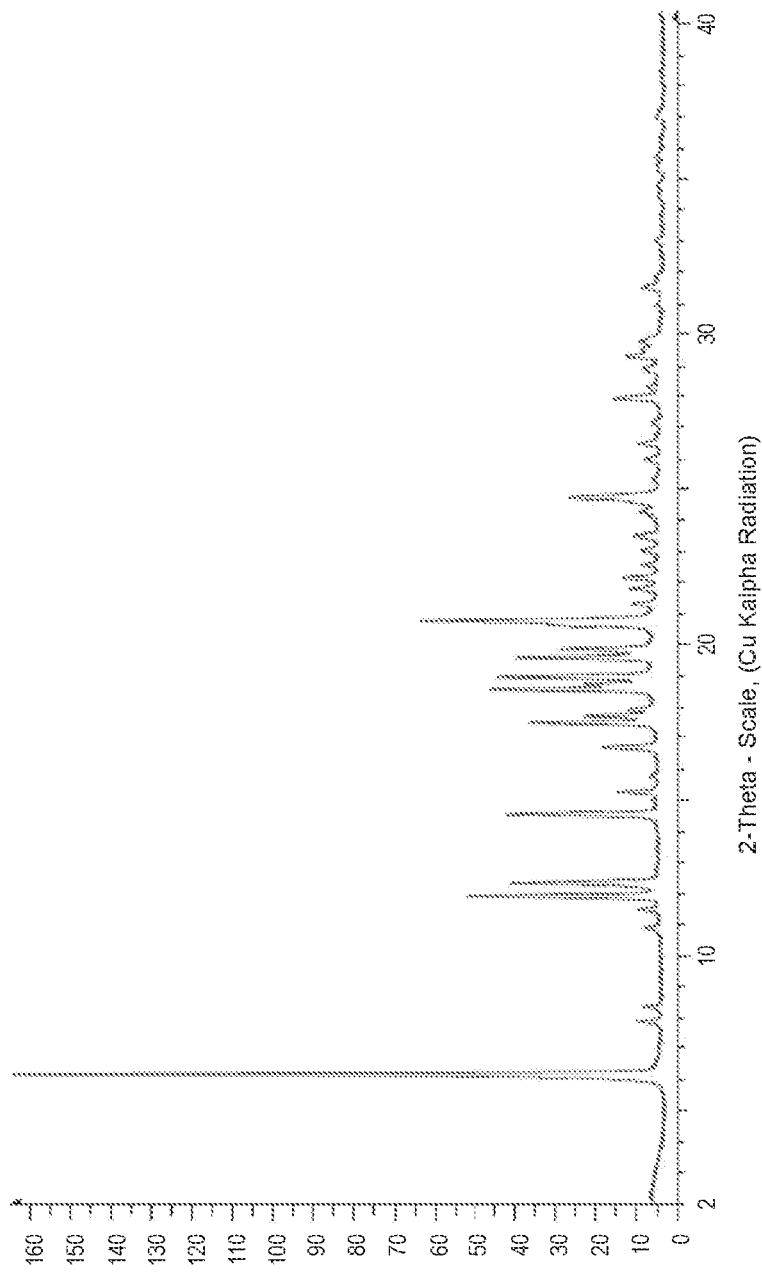
FIG. 2 is an X-ray powder diffraction pattern of a TBME solvate crystalline form.

The TBME solvate crystalline form was characterized using various techniques which are described in further detail in the experimental methods section. FIG. 2 shows the crystalline structure of the TBME solvate crystalline form as determined by X-ray powder diffraction (XRPD). The TBME solvate crystalline form, which may be obtained by the methods described below, exhibits characteristic peaks that may be determined from the XRPD pattern.

Figure 13:
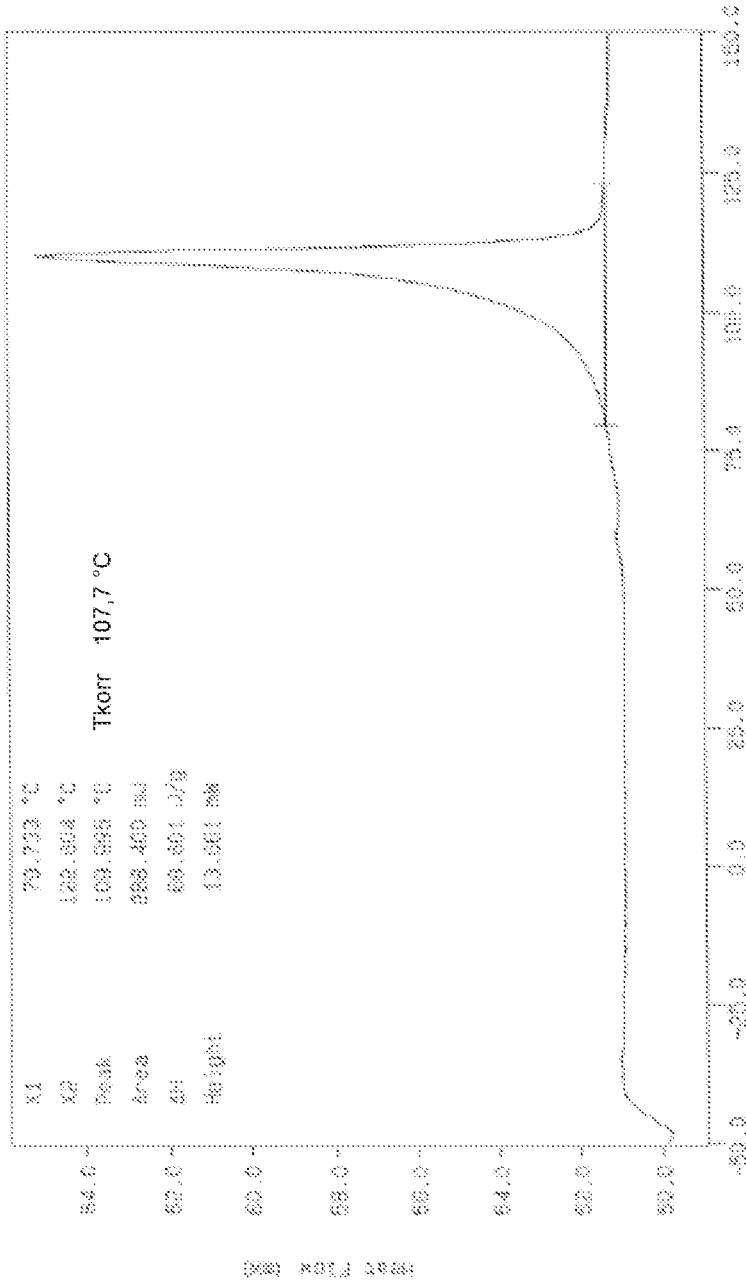
FIG. 13 shows differential scanning calorimetry results for a TBME solvate crystalline form.

FIG. 13 shows results obtained by differential scanning calorimetry (DSC) for the TBME solvate crystalline form. These results indicate a peak at a temperature of 108° C. for the TBME solvate crystalline form, which indicates the melting point for the crystal. Accordingly, in some embodiments, the TBME solvate crystalline form exhibits a melting point from about 103° C. to 113° C., from about 106° C. to about 110° C., or at about 108° C. The TBME solvate crystalline form was analysed by thermogravimetric analysis (TGA), and exhibits a 14.1% weight loss when carried out from 25° C. to 200° C.

Toluene Solvate Crystalline Form

The precise conditions for forming the toluene solvate crystalline form may be empirically determined and it is only possible to give a number of methods which have been found to be suitable in practice.

Figure 3:
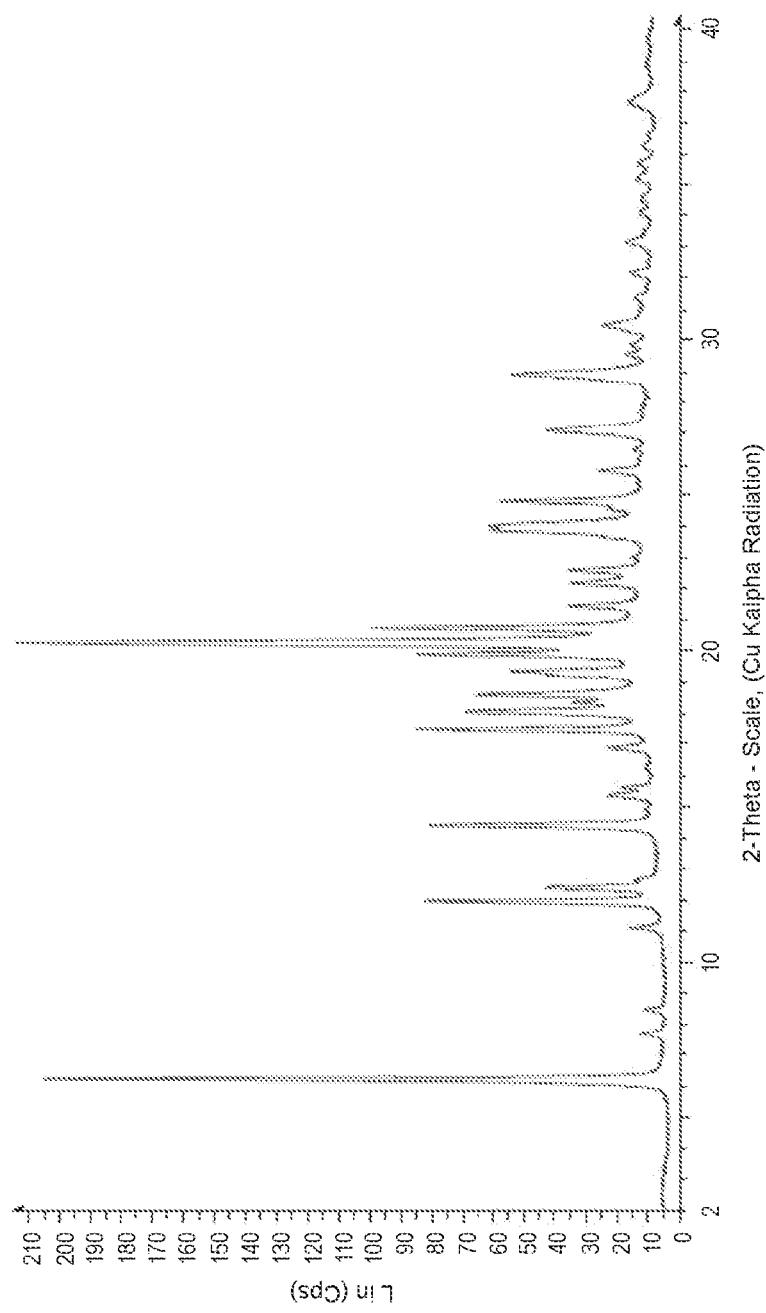
FIG. 3 is an X-ray powder diffraction pattern of a toluene solvate crystalline form.

The toluene solvate crystalline form was characterized using various techniques which are described in further detail in the experimental methods section. FIG. 3 shows the crystalline structure of the toluene solvate crystalline form as determined by X-ray powder diffraction (XRPD). The toluene solvate crystalline form, which may be obtained by the methods described below, exhibits characteristic peaks that may be determined from the XRPD pattern.

Figure 14:
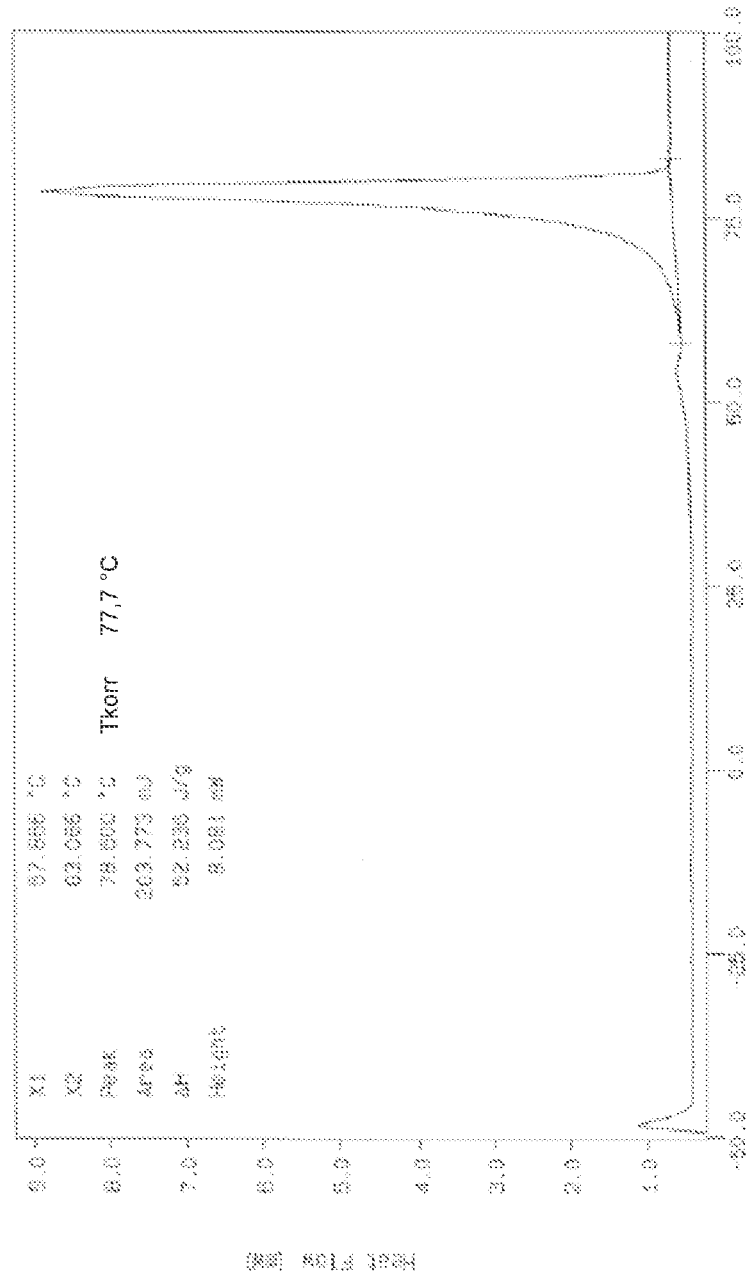
FIG. 14 shows differential scanning calorimetry results for a toluene solvate crystalline form.

FIG. 14 shows results obtained by DSC for the toluene solvate crystalline form. These results indicate a peak at a temperature of 78° C. for the toluene solvate crystalline form, which indicates the melting point for the crystal. Accordingly, in some embodiments, the toluene solvate crystalline form exhibits a melting point from about 73° C. to 83° C., from about 76° C. to about 80° C., or at about 78° C. The toluene solvate crystalline form was analysed by TGA, and exhibits a 13.9% weight loss when carried out from 25° C. to 200° C.

Ethanol Solvate Crystalline Form

The precise conditions for forming the ethanol solvate crystalline form may be empirically determined and it is only possible to give a number of methods which have been found to be suitable in practice.

Figure 4:
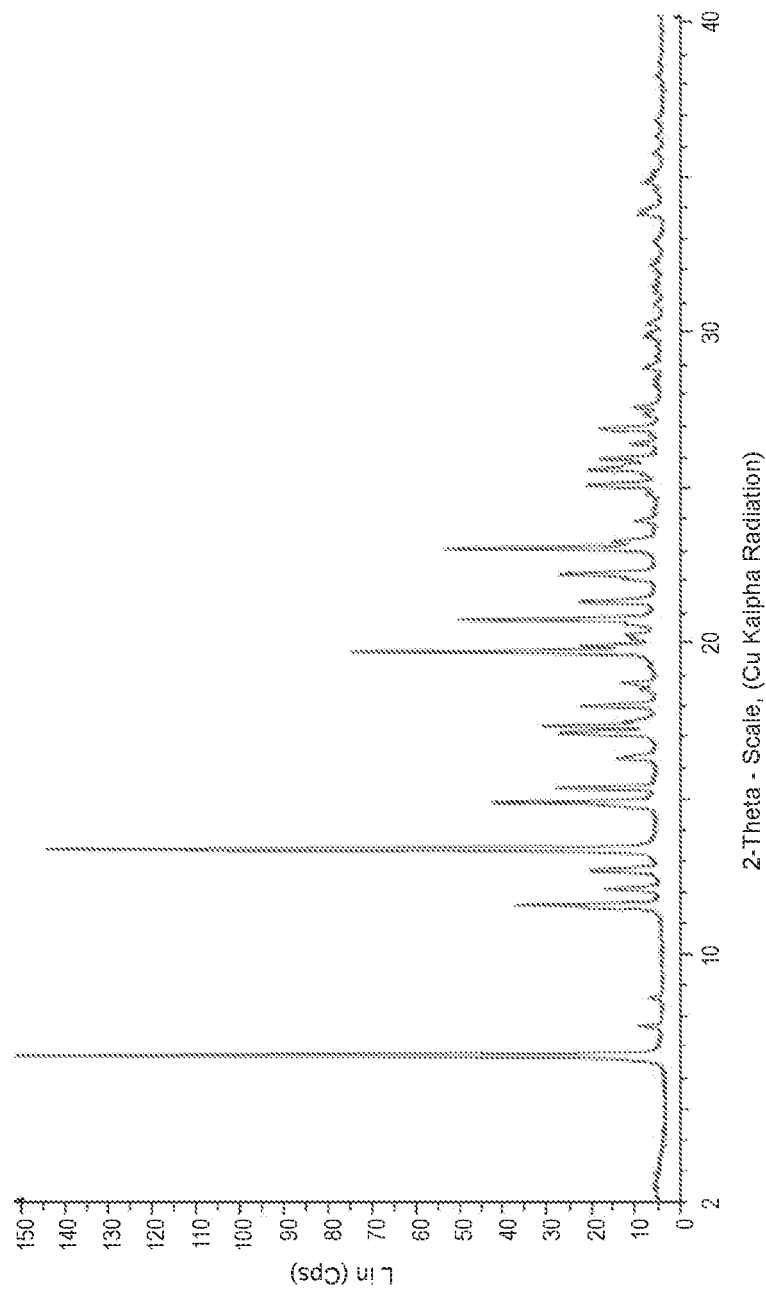
FIG. 4 is an X-ray powder diffraction pattern of an ethanol solvate crystalline form.
Figure 5:
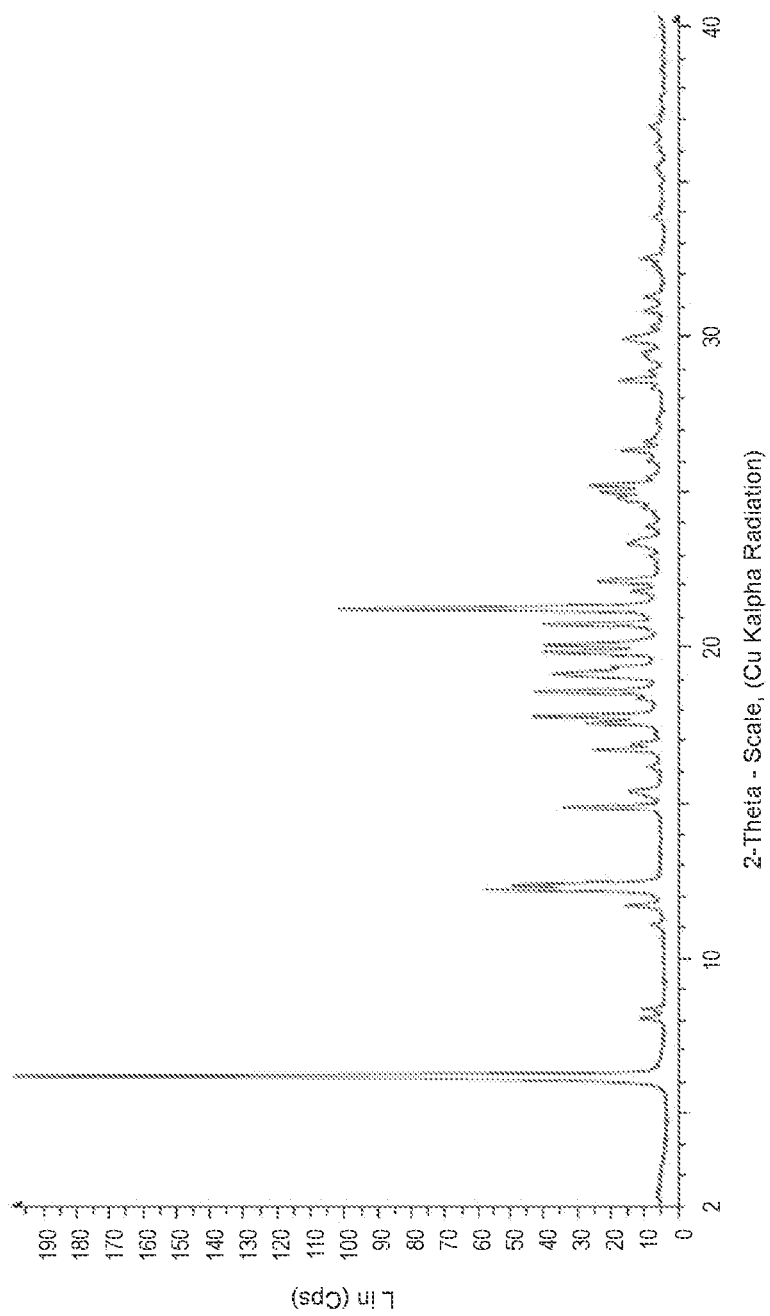
FIG. 5 is an X-ray powder diffraction pattern of a THF solvate crystalline form.

The ethanol solvate crystalline form was characterized using various techniques which are described in further detail in the experimental methods section. FIG. 4 shows the crystalline structure of the ethanol solvate crystalline form as determined by X-ray powder diffraction (XRPD). The ethanol solvate crystalline form, which may be obtained by the methods described below, exhibits characteristic peaks that may be determined from the XRPD pattern.

Figure 15:
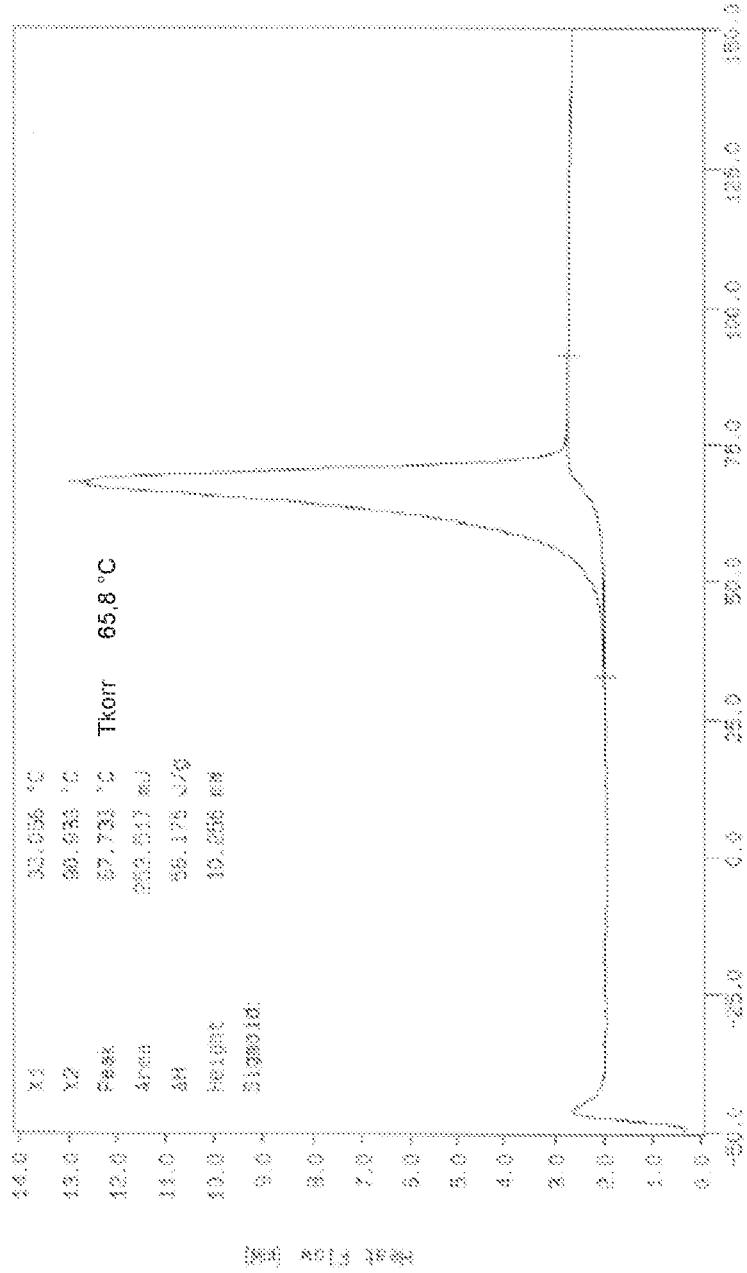
FIG. 15 shows differential scanning calorimetry results for an ethanol solvate crystalline form.

FIG. 15 shows results obtained by DSC for the ethanol solvate crystalline form. These results indicate a peak at a temperature of 66° C. for the ethanol solvate crystalline form, which indicates the melting point for the crystal. Accordingly, in some embodiments, the ethanol solvate crystalline form exhibits a melting point from about 61° C. to 71° C., from about 64° C. to about 68° C., or at about 66° C. The ethanol solvate crystalline form was analysed by TGA, and exhibits a 7.8% weight loss when carried out from 25° C. to 200° C.

THF Solvate Crystalline Form

The precise conditions for forming the THF solvate crystalline form may be empirically determined and it is only possible to give a number of methods which have been found to be suitable in practice.

The THF solvate crystalline form was characterized using various techniques which are described in further detail in the experimental methods section. FIG. 5, FIGS. 8a and 8b, and FIGS. 10a and 10b show the crystalline structure of the THF solvate crystalline form as determined by X-ray powder diffraction (XRPD). The THF solvate crystalline form, which may be obtained by the methods described below, exhibits characteristic peaks that may be determined from the XRPD pattern.

Figure 18:
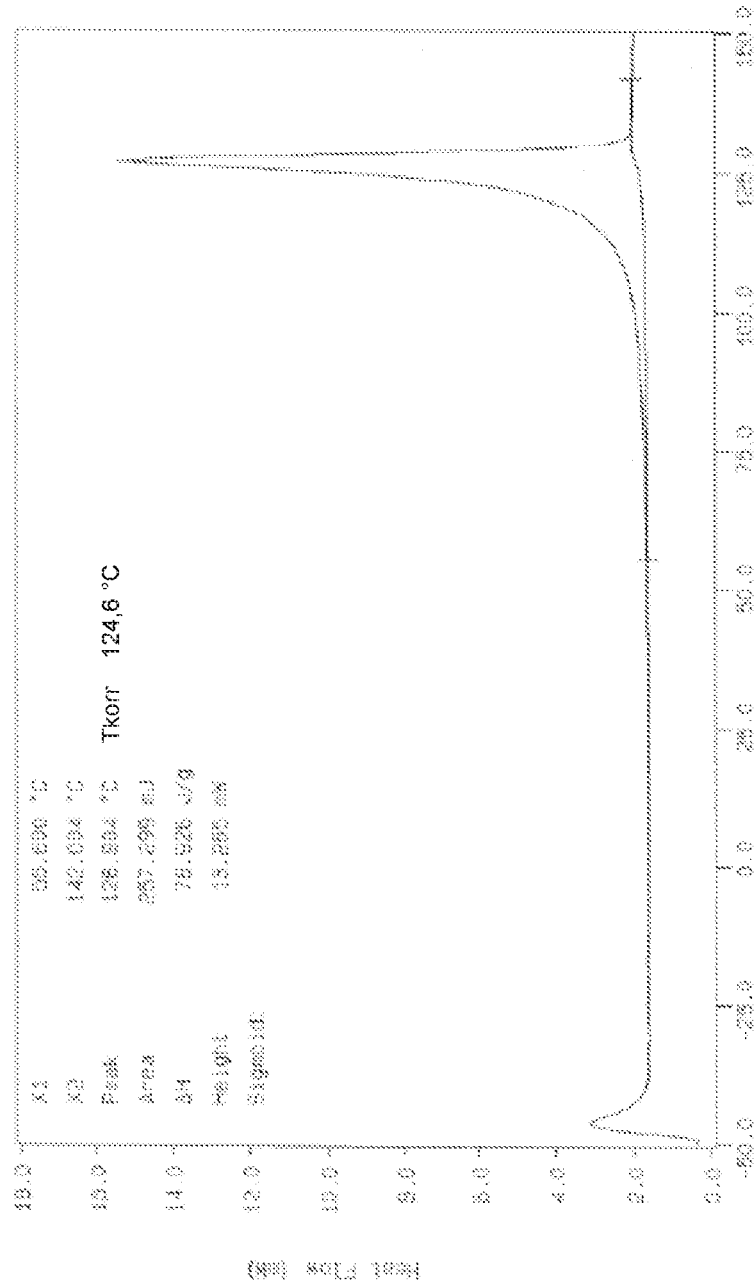
FIG. 18 shows differential scanning calorimetry results for a THF solvate crystalline form.
Figure 19A:
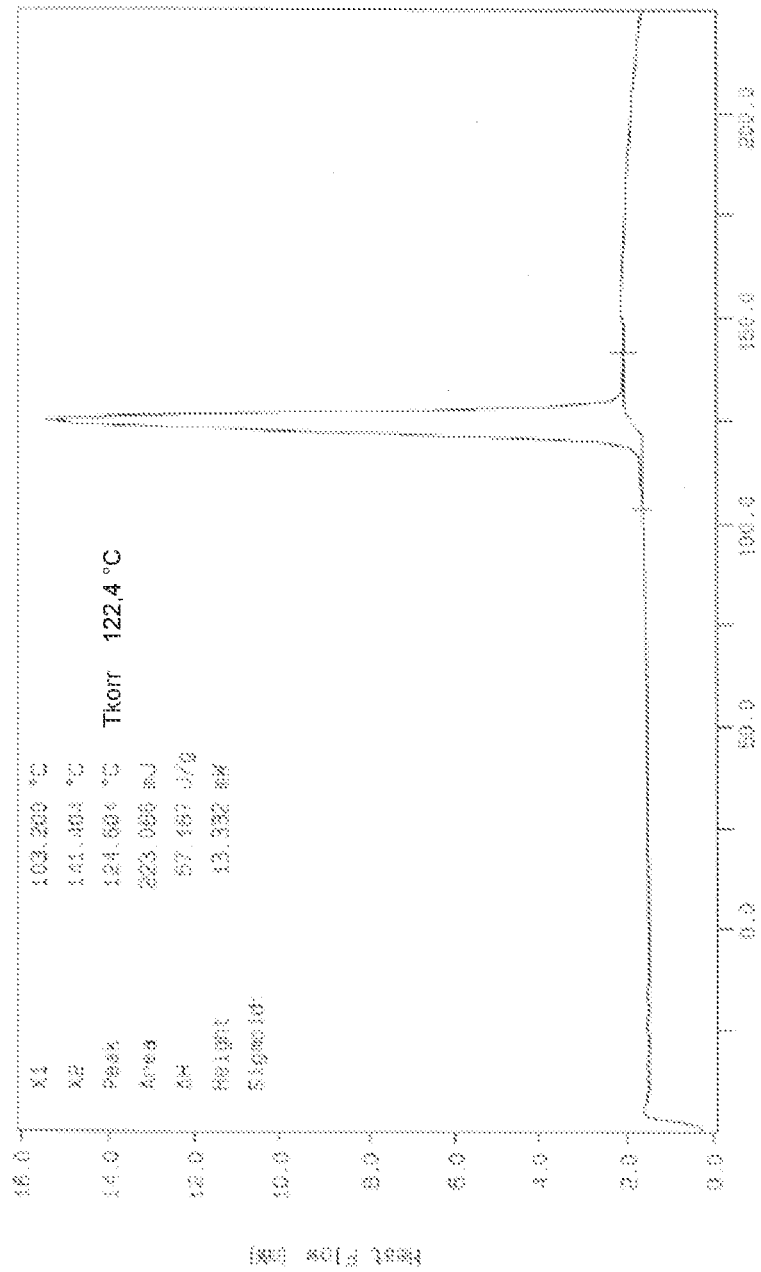
FIG. 19a shows the first heating differential scanning calorimetry results for crystalline Form C.
Figure 19B:
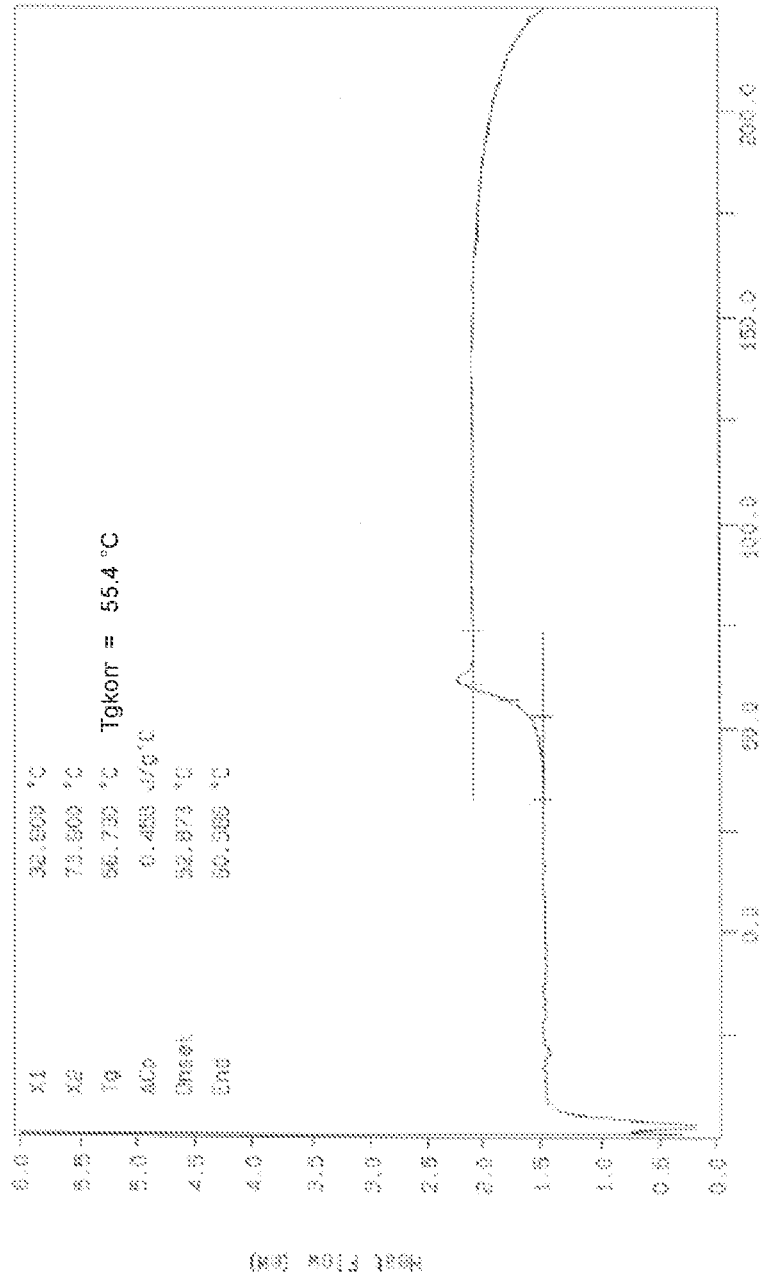

FIG. 18 shows results obtained by DSC for the THF solvate crystalline form. These results indicate a peak at a temperature of 125° C. for the THF solvate crystalline form, which indicates the melting point for the crystal. Accordingly, in some embodiments, the THF solvate crystalline form exhibits a melting point from about 120° C. to 130° C., from about 123° C. to about 127° C., or at about 125° C. The THF solvate crystalline form was analysed by TGA, and in one instance exhibited an 11.9% weight loss and in another instance, exhibited a 12.1% weight loss when carried out from 25° C. to 200° C.

EtOAc Solvate Crystalline Form

The precise conditions for forming the EtOAc solvate crystalline form may be empirically determined and it is only possible to give a number of methods which have been found to be suitable in practice.

Figure 6B:
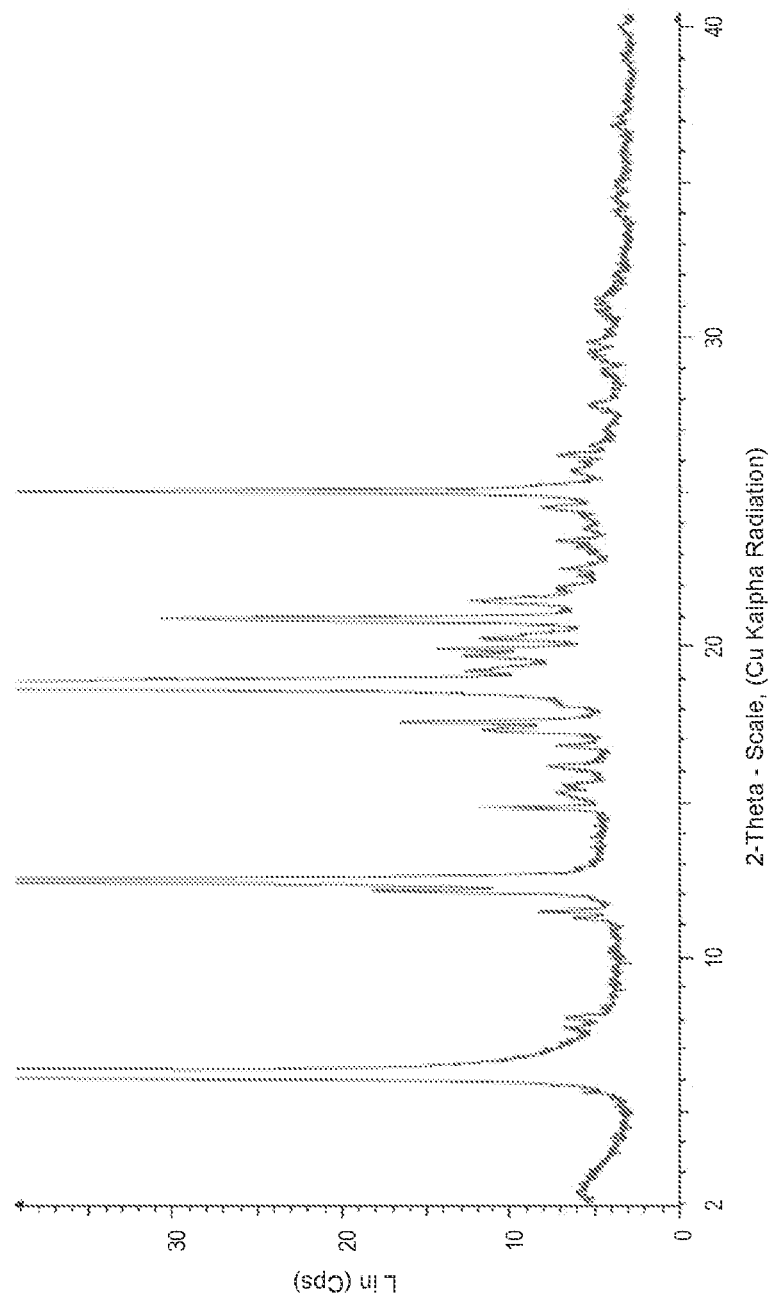

The EtOAc solvate crystalline form was characterized using various techniques which are described in further detail in the experimental methods section. FIGS. 6a and 6b show the crystalline structure of the EtOAc solvate crystalline form as determined by X-ray powder diffraction (XRPD). The EtOAc solvate crystalline form, which may be obtained by the methods described below, exhibits characteristic peaks that may be determined from the XRPD pattern.

Figure 16:
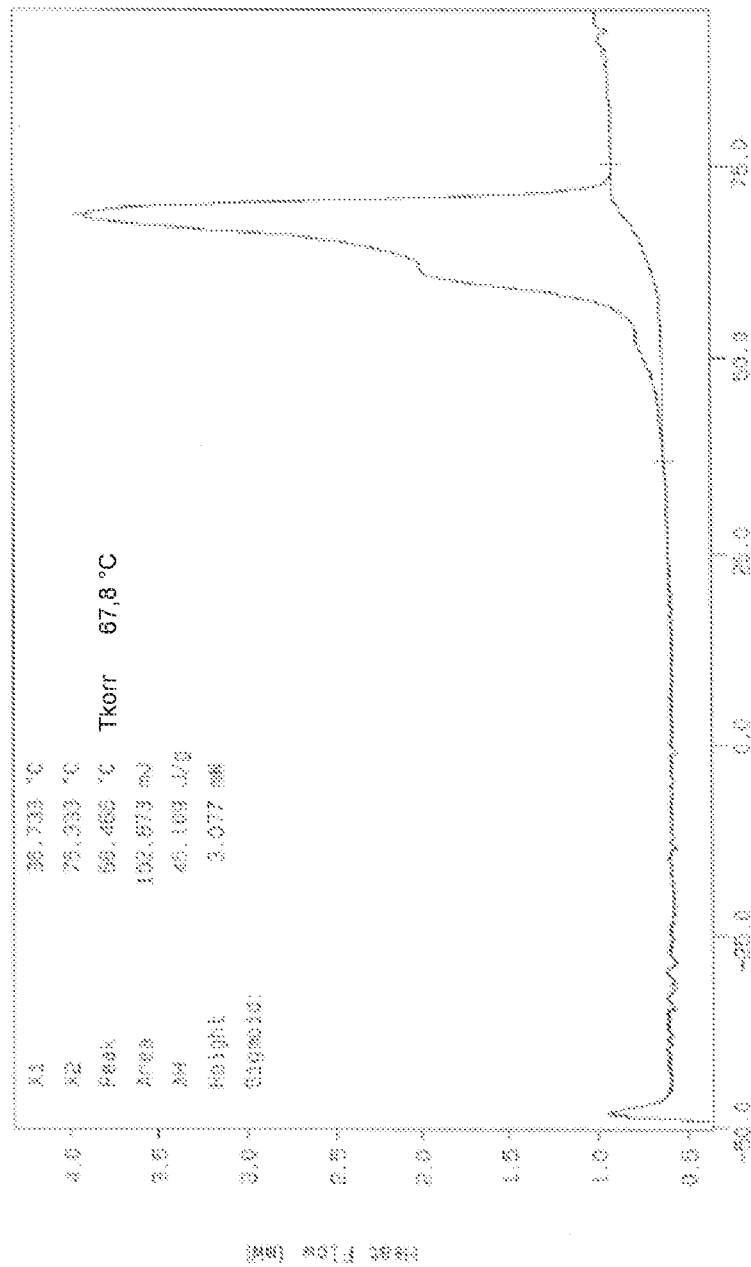
FIG. 16 shows differential scanning calorimetry results for an EtOAc solvate crystalline form.

FIG. 16 shows results obtained by DSC for the EtOAc solvate crystalline form. These results indicate a peak at a temperature of 68° C. for the EtOAc solvate crystalline form, which indicates the melting point for the crystal. Accordingly, in some embodiments, the EtOAc solvate crystalline form exhibits a melting point from about 63° C. to 73° C., from about 66° C. to about 70° C., or at about 68° C. The EtOAc solvate crystalline form was analysed by TGA, and exhibits a 10.8% weight loss when carried out from 25° C. to 200° C.

Acetone Solvate Crystalline Form

The precise conditions for forming the acetone solvate crystalline form may be empirically determined and it is only possible to give a number of methods which have been found to be suitable in practice.

Figure 7A:
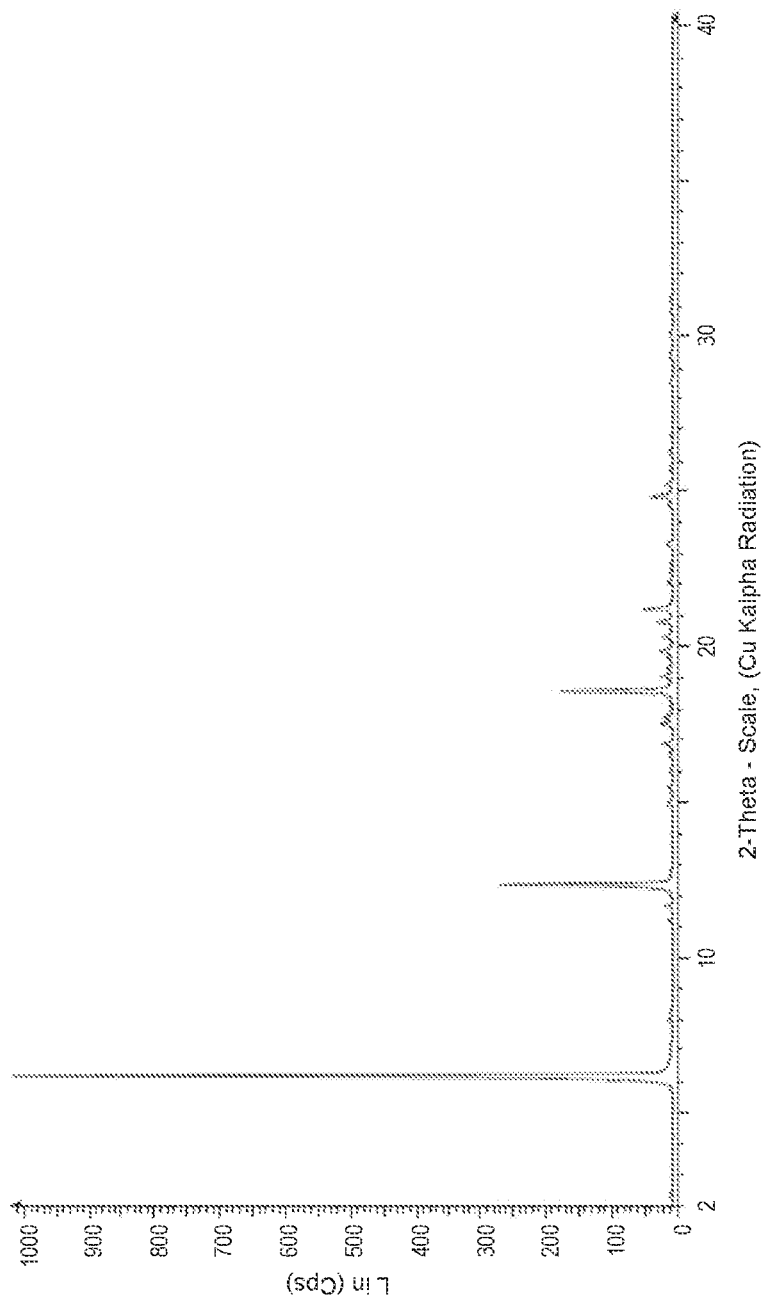
FIG. 7a is an X-ray powder diffraction pattern of an acetone solvate crystalline form.
Figure 7B:
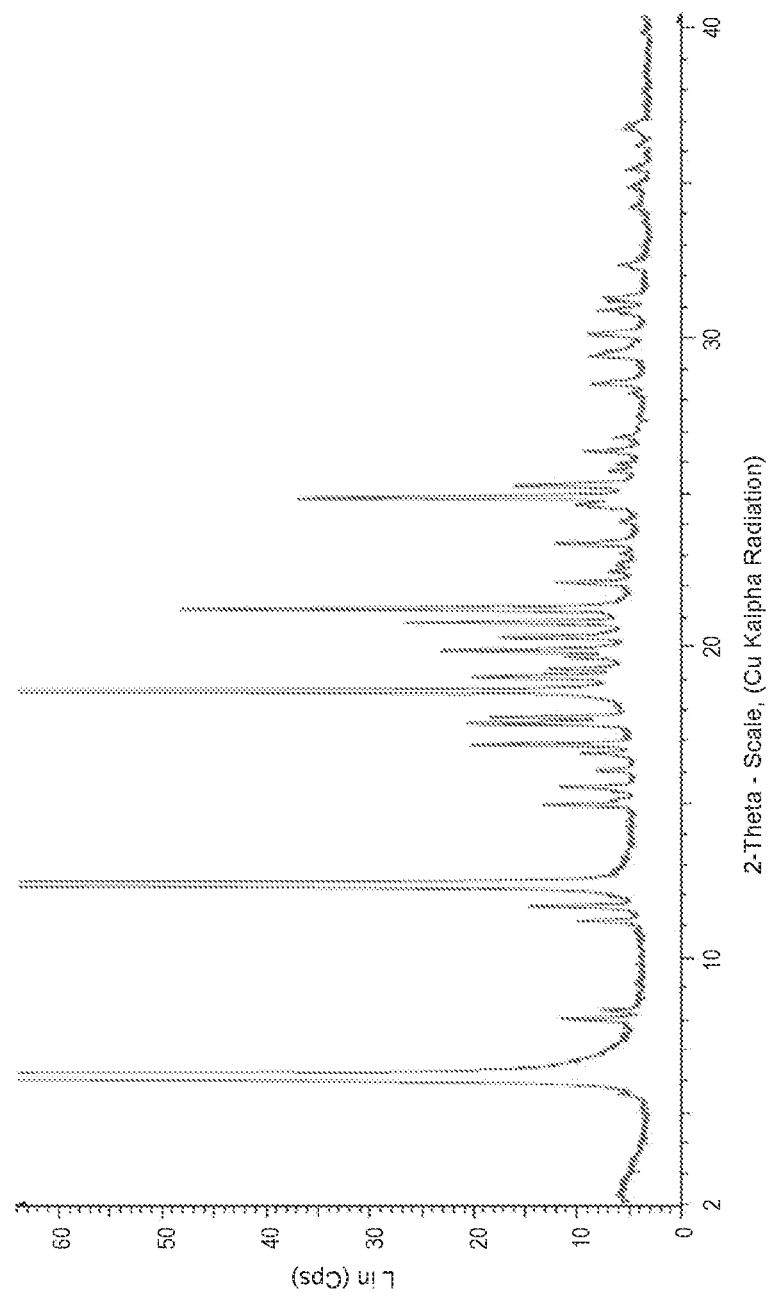
Figure 8A:
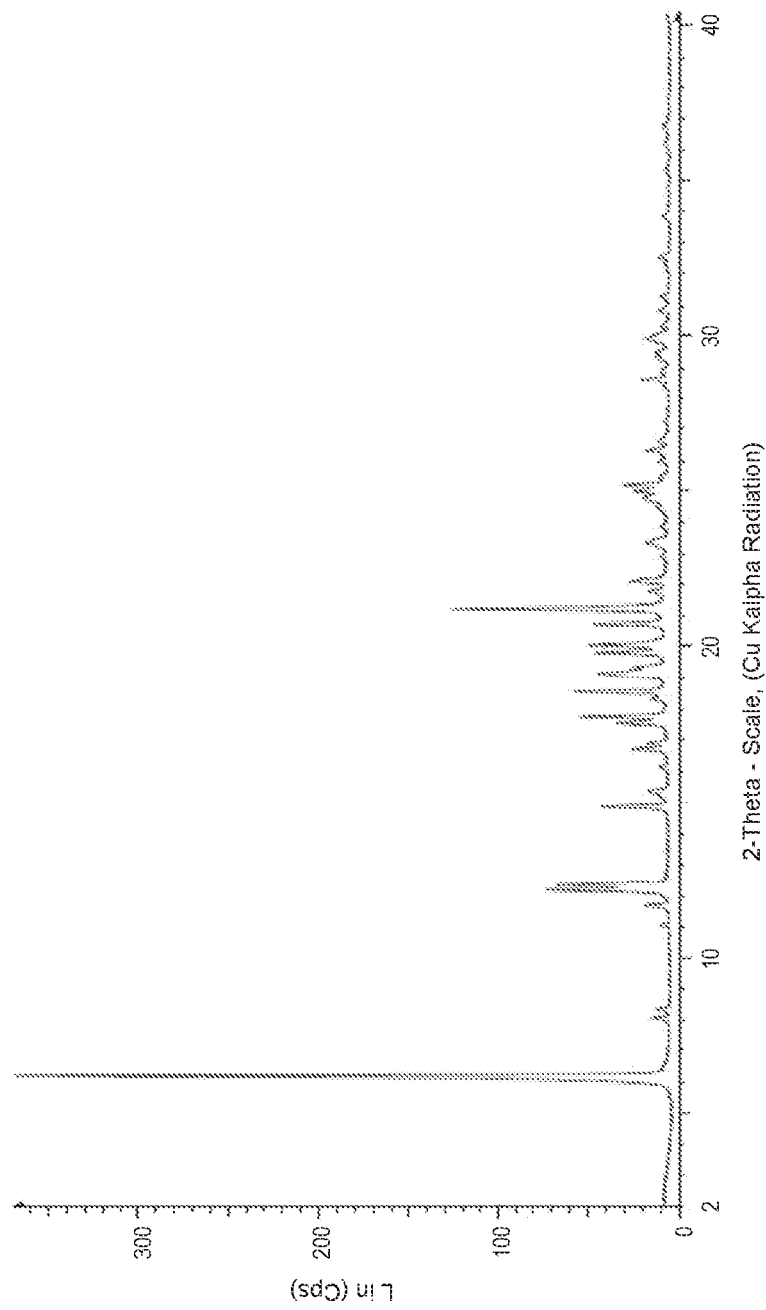
FIG. 8a is an X-ray powder diffraction pattern of a THF solvate crystalline form.
Figure 8B:
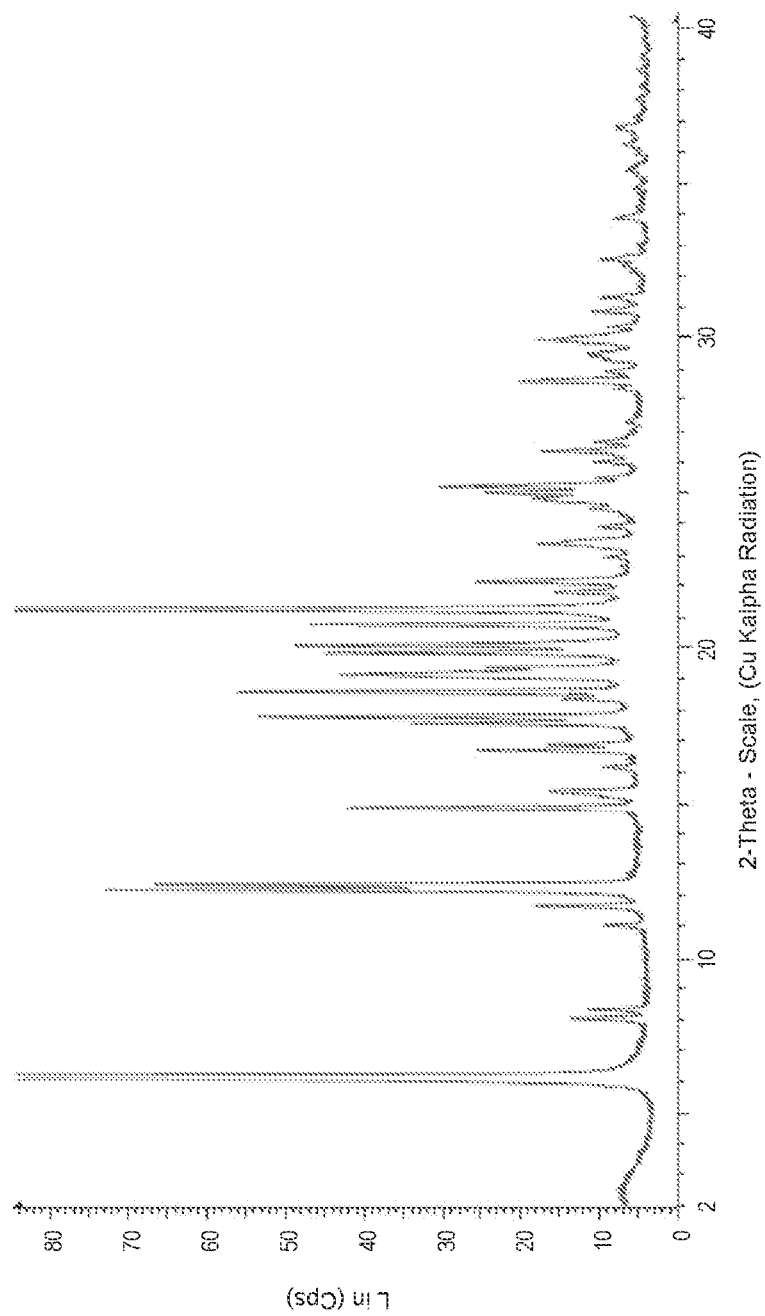

The acetone solvate crystalline form was characterized using various techniques which are described in further detail in the experimental methods section. FIGS. 7a and 7b show the crystalline structure of the acetone solvate crystalline form as determined by X-ray powder diffraction (XRPD). The acetone solvate crystalline form, which may be obtained by the methods described below, exhibits characteristic peaks that may be determined from the XRPD pattern.

Figure 17:
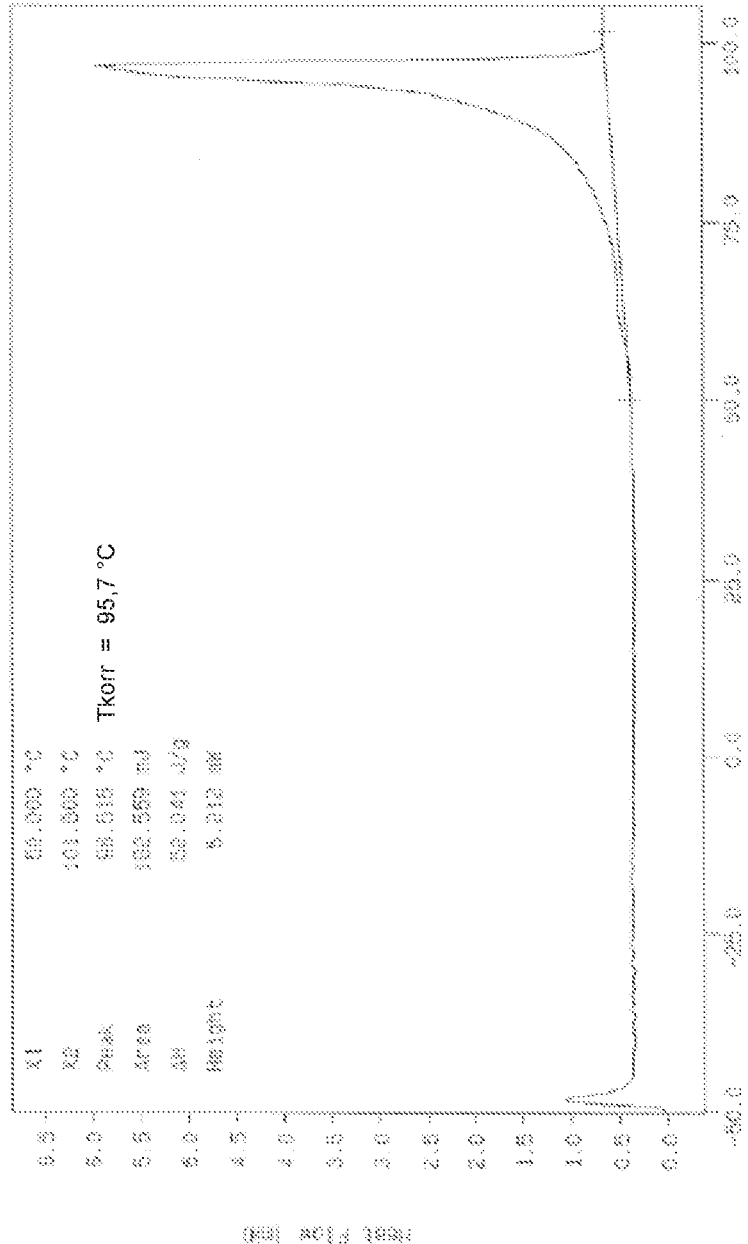
FIG. 17 shows differential scanning calorimetry results for an acetone solvate crystalline form.

FIG. 17 shows results obtained by DSC for the acetone solvate crystalline form. These results indicate a peak at a temperature of 96° C. for the acetone solvate crystalline form, which indicates the melting point for the crystal. Accordingly, in some embodiments, the acetone solvate crystalline form exhibits a melting point from about 91° C. to 101° C., from about 94° C. to about 98° C., or at about 96° C. The acetone solvate crystalline form was analysed by TGA, and exhibits a 9.0% weight loss when carried out from 25° C. to 200° C.

Crystalline Form C

Some embodiments include an unsolvated crystalline form of Formula (I), referred to herein as crystalline Form C. The precise conditions for forming crystalline Form C may be empirically determined and it is only possible to give a number of methods which have been found to be suitable in practice.

Crystalline Form C was characterized using various techniques which are described in further detail in the experimental methods section. FIGS. 11, 12, 21-27 and show the crystalline structure of Form C as determined by X-ray powder diffraction (XRPD). Crystalline Form C, which may be obtained by the methods disclosed above, exhibits prominent peaks at approximately 9.1°, 12.4°, 13.8°, 16.0°, 16.6°, 17.1°, 18.6°, 19.1°, 21.6°, 21.7°, and 23.7° two theta (2θ). Thus, in some embodiments, a crystalline form of the compounds of Formula I has at least one characteristic peak (e.g., one, two, three, four, five, six, seven, eight, nine, ten or eleven characteristic peaks) selected from approximately 9.1°, 12.4°, 13.8°, 16.0°, 16.6°, 17.1°, 18.6°, 19.1°, 21.6°, 21.7°, and 23.7° 2θ. In some embodiments, a crystalline form of the compounds of Formula I has at least three characteristic peaks selected from approximately 9.1°, 12.4°, 13.8°, 16.0°, 16.6°, 17.1°, 18.6°, 19.1°, 21.6°, 21.7°, and 23.7° 2θ.

As is well understood in the art, because of the experimental variability when X-ray diffraction patterns are measured on different instruments, the peak positions are assumed to be equal if the 2θ values agree to within a certain degree of variability. For example, the United States Pharmacopeia states that if the angular setting of the 10 strongest diffraction peaks agree to within ±0.2° with that of a reference material, and the relative intensities of the peaks do not vary by more than 20%, the identity is confirmed. Accordingly, in some embodiments, peak positions recited herein include variability within ±0.5° 2θ. In other embodiments, peak positions recited herein include variability within ±0.2° 2θ. As disclosed herein, the term "approximately" when referring to values of 2θ is defined as ±0.5° 2θ.

FIGS. 19a and 19b, and FIGS. 28a and 28b show results obtained by DSC for Crystalline Form C. These results indicate a peak at a temperature of about 122° C. for Crystalline Form C, which indicates the melting point for the crystal. Accordingly, in some embodiments, Crystalline Form C exhibits a melting point from about 117° C. to 127° C., from about 120° C. to about 124° C., or at about 122° C. Crystalline Form C was analysed by TGA, and in one instance exhibited a 1.3% weight loss and in another instance, exhibited <0.1% weight loss when carried out from 25° C. to 200° C.

Figure 29A:
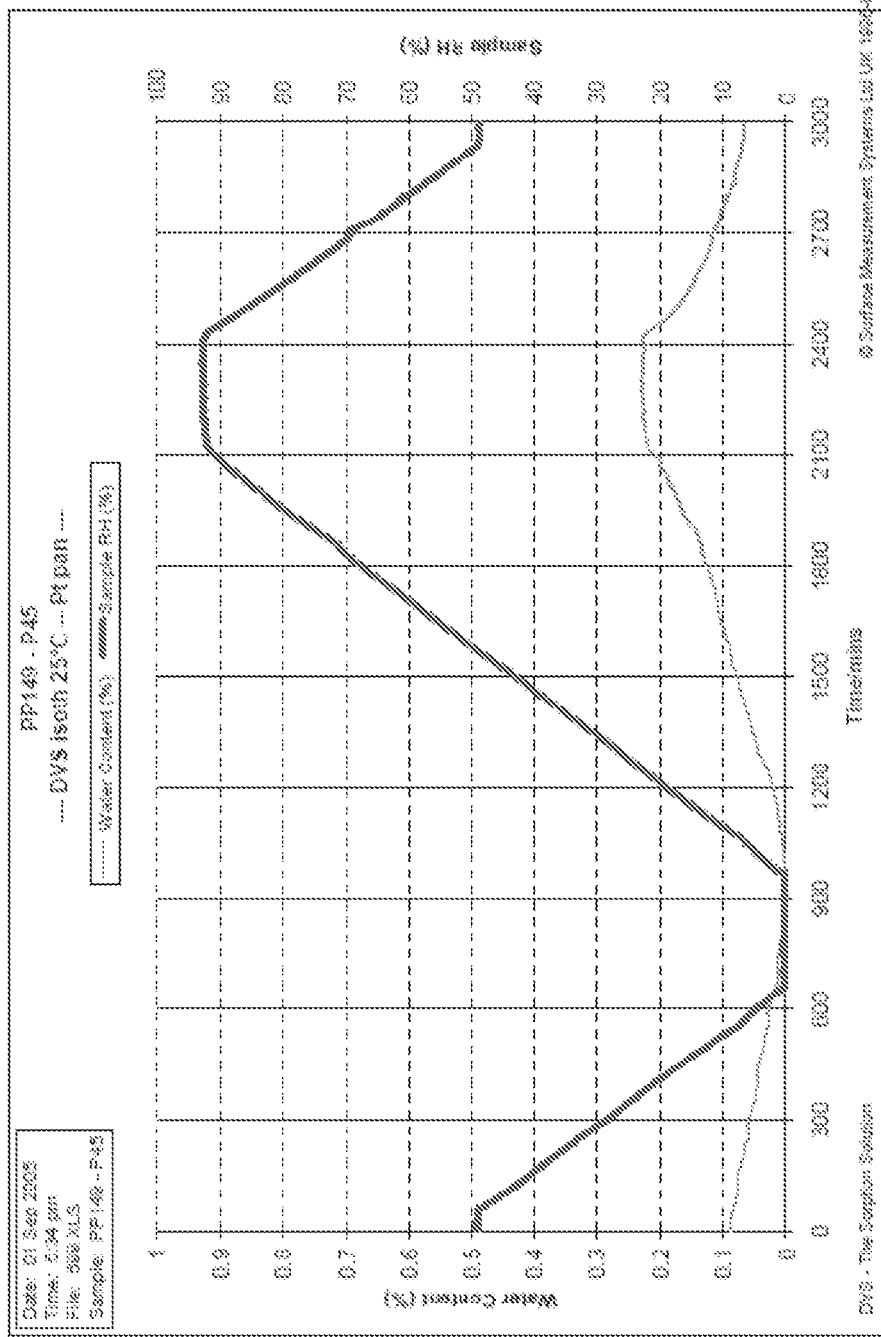
FIG. 29a shows the dynamic vapor sorption analysis results for crystalline Form C.
Figure 29B:
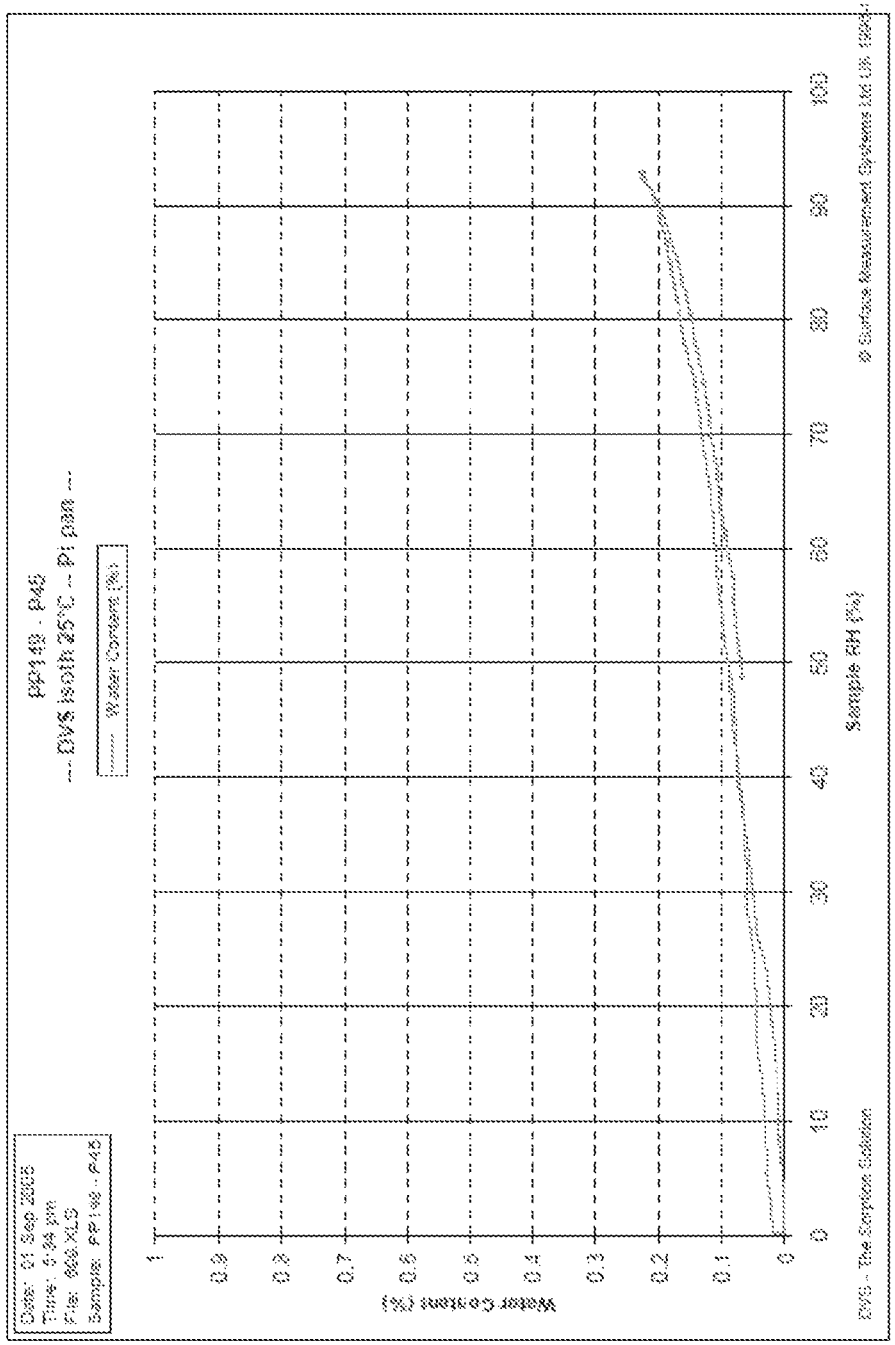
FIG. 29b shows the phase equilibrium in water analysis results for crystalline Form C.

Meanwhile, FIG. 29a shows dynamic vapor sorption (DVS) results for Crystalline Form C, and shows a water uptake of less than 0.2% by weight. XRPD results following DVA analysis, FIGS. 24 and 25, confirm that Form C did not transition to a different polymorph. FIG. 29b shows the phase equilibration experiment in water for 3 days, which showed no transformation of the crystalline Form C as seen by XRPD, FIG. 26.

Crystalline Form C can therefore be characterized as non-hygroscopic and stabile over a wide range of humidity. Crystal form C also shows good crystallinity, the content of residual solvents is very low (<0.1%), the melting point is relatively high (approx. 122° C.) and crystal form C does not show any evidence of hydrate formation. In contrast, the solvate forms tend to desolvate producing mixtures of the solvate and the amorphous form. Such advantageous and unexpected non-hygroscopicity and stability demonstrated by Crystalline Form C may be capitalized on. For example, methods of treatment and pharmaceutical compositions Crystalline Form C may provide long-term stability and low adsorption and desorption of water vapor, and may provide significant clinical improvements for the treatment of ALD and lipid disorders such as hypercholesterolemia and fatty liver diseases.

Methods of Treating Adrenoleukodystrophy (ALD) and Lipid Disorders

The compound of Formula I, and accordingly any of the compositions of the compound of Formula I disclosed herein, may be administered to a subject for treating or ameliorating ALD and lipid disorders such as hypercholesterolemia and fatty liver diseases, such as non-alcoholic fatty liver disease (NAFLD), non-alcoholic steatohepatitis (NASH), or glycogen storage disease (GSD). The compound of Formula I can thus be administered to improve the condition of a subject, for example a subject suffering from ALD. As another example, the compounds of Formula I may be administered to treat lipid disorders such as hypercholesterolemia and fatty liver diseases.

The compound of Formula I may be administered in combination to a subject for treatment of ALD and lipid disorders. The compounds of Formula I may be administered to improve the condition of a patient suffering from hepatic encephalopathy. The compounds of Formula I may be administered to alleviate the symptoms associated with ALD. The compounds of Formula I may be administered to improve the condition of a patient suffering from hypercholesterolemia. The compounds of Formula I may be administered to alleviate the symptoms associated with hypercholesterolemia. The compounds of Formula I may be administered to improve the condition of a patient suffering from fatty liver diseases. The compounds of Formula I may be administered to alleviate the symptoms associated with fatty liver disease.

A therapeutically effective amount of the compounds of Formula I is administered to the subject. As will be readily apparent to one skilled in the art, the useful in vivo dosage to be administered and the particular mode of administration will vary depending upon the age, weight, the severity of the affliction, and mammalian species treated, the particular compounds employed, and the specific use for which these compounds are employed. (See e.g., Fingl et al. 1975, in "The Pharmacological Basis of Therapeutics", which is hereby incorporated herein by reference in its entirety, with particular reference to Ch. 1, p. 1). The determination of effective dosage levels, that is the dosage levels necessary to achieve the desired result, can be accomplished by one skilled in the art using routine pharmacological methods. Typically, human clinical applications of products are commenced at lower do sage levels, with dosage level being increased until the desired effect is achieved. Alternatively, acceptable in vitro studies can be used to establish useful doses and routes of administration of the compositions identified by the present methods using established pharmacological methods.

A single daily dose may be administered. Alternatively, multiple doses, for example two, three, four or five doses may be administered. Such multiple doses may be administered over a period of one month or two weeks or one week. In some embodiments, a single dose or multiple doses such as two, three, four or five doses may be administered daily.

Compositions of the Compound of Formula I

Also disclosed herein are compositions of the compound of Formula I. The compositions of the present application advantageously are particularly suited for oral and/or intravenous administration to patients with ALD or lipid disorders. The compositions may, in some embodiments, be obtained by one of the processes disclosed in the present application. For example, the amorphous crystallization method and/or the seeding crystallization method may yield the compositions of the present application.

The compositions, in some embodiments, can include a crystalline form of the compound of Formula I (e.g., TBME solvate crystalline form, toluene solvate crystalline form, ethanol solvate crystalline form, THF solvate crystalline form, EtOAc solvate crystalline form, acetone solvate crystalline form, and/or Crystalline Form C disclosed herein). In some embodiments, the composition may include at least about 20% by weight of a crystalline form of the compound of Formula I. In some embodiments, the composition may include at least about 50% by weight of a crystalline form of the compound of Formula I. In some embodiments, the composition may include at least about 80% by weight of a crystalline form of the compound of Formula I. In some embodiments, the composition may include at least about 95% by weight of a crystalline form of the compound of Formula I. In some embodiments, the composition may include at least about 50% by weight of Crystalline Form C. In some embodiments, the composition may include at least about 80% by weight of Crystalline Form C. In some embodiments, the composition may include at least about 95% by weight of Crystalline Form C. In some embodiments, the composition may include at least about 99% by weight of Crystalline Form C. In some embodiments, the composition consists essentially of a crystalline form of the compound of Formula I. In some embodiments, the composition consists essentially of Crystalline Form C. In some embodiments, the composition includes a mixture of at least two (e.g., two, three or four forms) of the TBME solvate crystalline form, toluene solvate crystalline form, ethanol solvate crystalline form, THF solvate crystalline form, EtOAc solvate crystalline form, acetone solvate crystalline form, and Crystalline Form C.

The compositions, in some embodiments, include Crystalline Form C. For example, the compositions may include at least about 20%; at least about 50%; at least about 90%; at least about 95%; or at least about 99% of Crystalline Form C. Similarly, the compositions may also include, for example, the TBME solvate crystalline form, toluene solvate crystalline form, ethanol solvate crystalline form, THF solvate crystalline form, EtOAc solvate crystalline form or acetone solvate crystalline form. The compositions may optionally include at least about 20%; at least about 50%; at least about 90%; at least about 95%; or at least about 99% of the TBME solvate crystalline form, toluene solvate crystalline form, ethanol solvate crystalline form, THF solvate crystalline form, EtOAc solvate crystalline form, acetone solvate crystalline form, and/or Crystalline Form C.

Pharmaceutical Compositions

The compositions of the compound of Formula I of the present application may also be formulated for administration to a subject (e.g., a human). The compound of Formula I, and accordingly the compositions disclosed herein, may be formulated for administration with a pharmaceutically acceptable carrier or diluent. The compound of Formula I may thus be formulated as a medicament with a standard pharmaceutically acceptable carrier(s) and/or excipient(s) as is routine in the pharmaceutical art. The exact nature of the formulation will depend upon several factors including the desired route of administration. Typically, the compound of Formula I is formulated for oral, intravenous, intragastric, subcutaneous, intravascular or intraperitoneal administration.

The pharmaceutical carrier or diluent may be, for example, water or an isotonic solution, such as 5% dextrose in water or normal saline. Solid oral forms may contain, together with the active compound, diluents, e.g. lactose, dextrose, saccharose, cellulose, corn starch or potato starch; lubricants, e.g. silica, talc, stearic acid, magnesium or calcium stearate, sodium lauryl sulfate, and/or polyethylene glycols; binding agents, e.g. starches, gum arabic, gelatin, microcrystalline cellulose, methylcellulose, carboxymethylcellulose or polyvinyl pyrrolidone; disaggregating agents, e.g. starch, alginic acid, alginates or sodium starch glycolate; effervescing mixtures; dyestuffs; sweeteners; wetting agents, such as lecithin, polysorbates, lauryl sulfates; and, in general, non-toxic and pharmacologically inactive substances used in pharmaceutical formulations. Such pharmaceutical preparations may be manufactured in known manners, for example, by means of mixing, granulating, tabletting, sugar-coating, or film-coating processes.

Liquid dispersions for oral administration may be syrups, emulsions or suspensions. The syrups may contain as carriers, for example, saccharose or saccharose with glycerine and/or mannitol and/or sorbitol.

Suspensions and emulsions may contain a carrier, for example a natural gum, agar, sodium alginate, pectin, microcrystalline cellulose, methylcellulose, carboxymethylcellulose, or polyvinyl alcohol. The suspensions or solutions for intramuscular injections may contain, together with the compounds of Formula I, a pharmaceutically acceptable carrier, e.g. sterile water, olive oil, ethyl oleate, glycols, e.g. propylene glycol and sodium lauryl sulfate.

The medicament may consist essentially of the compound of Formula I and a pharmaceutically acceptable carrier.

Oral formulations may generally include dosages of the compound of Formula I in the range of about 1 mg to about 100 g. Accordingly, in some embodiments, the oral formulation includes the compound of Formula I compositions disclosed herein in the range of about 1 mg to about 50 g. In some embodiments, the oral formulation includes the compound of Formula I compositions disclosed herein in the range of about 1 mg to about 100 mg. In some embodiments, the oral formulation includes the compound of Formula I compositions disclosed herein in the range of about 1 mg to about 20 mg. In some embodiments, the oral formulation includes the compound of Formula I compositions disclosed herein in the range of about 5 mg to about 15 mg. In some embodiments, the oral formulation includes the compound of Formula I compositions disclosed herein at about 10 mg Intravenous formulations may also generally include dosages of the compound of Formula I in the range of about 1 mg to about 100 g (for example, about 10 mg). In some embodiments, the intravenous formulation has a concentration of about 5 to about 300 mg/mL of the compound of Formula I (preferably about 25 to about 200 mg/mL, and more preferably about 40 to about 60 mg/mL).

The composition, or medicament containing said composition, may optionally be placed is sealed packaging. The sealed packaging may reduce or prevent moisture and/or ambient air from contacting the composition or medicament. In some embodiments, the packaging includes a hermetic seal. In some embodiments, the packaging sealed under vacuum or with an inert gas (e.g., argon) within the sealed package. Accordingly, the packaging can inhibit or reduce the rate of degradation for the composition or medicament stored within the packaging. Various types of sealed packaging are known in the art. For example, U.S. Pat. No. 5,560,490, is hereby incorporate by reference in its entirety, discloses an exemplary sealed package for medicaments.

EXAMPLES AND EXPERIMENTAL METHODS

Additional embodiments are disclosed in further detail in the following examples, which are not in any way intended to limit the scope of the claims.

X-Ray Powder Diffraction (XRPD)

XRPD analysis was carried out on a Bruker D8 advance or a Philips PW 1710. In embodiments using the Bruker D8 device, samples were scanned using CuKa radiation, tube power of 35 kV/45 mA, a VANTEC1 detector, a step size of 0.017° 2θ, a time per step 105±5 sec time per step, and a scanning range of 2°-50° 2θ. Samples were also prepared as received or slightly crushed. Silicon single crystal sample holders were used, with sample diameters of 12 mm and depths of 0.1 mm.

In embodiments using the Philips PW device, samples were scanned using Copper Kα radiation, a step size of 0.02° 2θ, a 2.4 sec time per step, and a scanning range of 2°-50° 2θ. 0.1 mm sample holders were used. Samples were measured without any special treatment other than the application of slight pressure to get a flat surface. Measurements were performed at an ambient air atmosphere.

Thermogravimetric Analysis (TGA)

Thermogravimetric measurements were carried out with a Perkin-Elmer Thermobalance TGS-2 (aluminum sample pans, N2 atmosphere 50 ml/min., heating rate 10 K/min, range 25 to 200 or 350° C.).

Thermogravimetric Fourier-Transform Infrared Spectroscopy Analysis (TG-FTIR)

Thermogravimetric Fourier-Transform Infrared Spectroscopy measurements were carried out with a Netzsch Thermo-Microbalance TG 209 coupled to a Bruker FTIR Spectrometer Vector 22 (sample pans with a pinhole, N2 atmosphere, heating rate 10 K/min, range 25 to 250° C.).

Differential Scanning Calorimetry Analysis (DSC)

In some embodiments, DSC was carried out with a Perkin Elmer DSC7 with the following experimental conditions: 3.26 to 4.51 mg sample mass, closed gold sample pan, temperature range −50° C. to 100° C./150° C./225° C., heating rate 10 or 20 K/min. The samples were weighed in air.

In other embodiments, DSC was carried out with a Perkin Elmer DSC7 with the following experimental conditions: 3.53 mg sample mass, closed gold sample pan, temperature range −50° C. to 150° C., heating rate 20 K/min. The sample was weighed in air.

$^1$H Nuclear Magnetic Resonance (NMR)

The samples were dissolved in $CDCl_3$. The NMR spectra were recorded on a Bruker spectrometer (Ultrashield™, B ACS 60, 300 MHz).

Karl Fischer Moisture Analysis

Karl Fischer moisture analyses were carried out according to standard procedures.

Dynamic Vapor Sorption (DVS)

The sample (9.869 mg) was placed on a Pt pan, and the sample was allowed to equilibrate at 25° C. at 50% relative humidity (r.h.) before starting a pre-defined humidity program. The predefined humidity programs include 1.0 hours 50%, from 50% r.h. to 0% r.h.; 5% r.h. per hour, 5 hours at 0% r.h., from 0% r.h. to 93% r.h.; 5% r.h. per hour, 5 hours at 93% r.h., from 93% r.h. to 50% r.h.; and 5% r.h. per hour, 1 hours at 50% r.h.

Solvents

Fluka or Merck grade solvents were used. Fluka no. 95305 deionized water for relevant experiments.

Measurement of the Approximate Solubility

In some embodiments, to determine the approximate solubility at room temperature, solvent was added in steps to the solid material. After every addition, the sample was well stirred. The addition of solvent was continued until complete dissolution or until 20 ml of solvent was added.

In other embodiments, aliquots of the test solvent were added to an accurately weighed amount of the compound of Formula I in small increments (usually 100-1000 μL), with sonication until complete dissolution was obtained, if possible. Dissolution was determined visually. The actual solubilities may be higher than reported due to slow dissolution rates or the use of excess solvent. The approximate solubility was determined in mg/mL to the nearest whole number.

Crystallization Experiments

Crystallization experiments were carried out with 40 mg to 256 mg of the compound. The solutions or slurries were stirred with a magnetic stirrer. The samples obtained after filtration (glass filter porosity P4) were air dried at ambient temperature and only for a short time to prevent possible desolvation of labile hydrates or solvates.

Starting Material A

Starting material was obtained from Metabasis Therapeutics Inc. The material was characterized as amorphous as confirmed by XRPD, FIG. 1.

The approximate solubility at ambient temperature must be known in order to carry out systematic crystallization experiments. The approximate solubility of the amorphous starting material A, at 23° C. are given in Table 1 below.

TABLE 1

Approximate Solubility of Starting Material A

| Solvent | Solubility (mg/ml) |
|---|---|
| 2,2,2-trifluoroethanol | ~195 |
| acetonitrile | >480 |
| chloroform | >388 |
| dichloromethane | >480 |
| n-heptane | <38 |
| methy ethyl ketone | >480 |
| methyl nonafluorobutyl ether | <39 |
| methylcyclohexane | <40 |
| THF | >384 |
| EtOAc | ~772 |
| ethanol | >200 |
| acetic acid | >200 |
| 1-octanol | >200 |
| N-methyl-2-pyrrolidone (NMP) | >200 |
| tert-butyl methyl ether (TBME) | >200 |
| toluene | >200 |
| pyridine | >200 |
| nitrobenzene | >200 |
| ethanol/n-heptane 75:25 v/v | >200 |
| tetrahydrofuran (THF)/n-heptane 75:25 v/v | >200 |
| EtOAc/n-heptane 75:25 v/v | >200 |
| acetone/n-heptane 75:25 v/v | >200 |
| ethanol/water 75:25 v/v | >200 |
| THF/water 75:25 v/v | 190 |
| acetone/water 75:25 v/v | >200 |
| acetonitrile/water 75:25 v/v | >200 | v/v = volume to volume

Example 1: Solution Based Crystallization Attempts

In the following Example, all evaporations and slurries gave oils. Slurrying the elevated temperature samples having tiny amounts of birefringent and extinctive solids in various solvents and antisolvents did not result in increased yield or size of the crystals. Stressing oils and the starting material under antisolvent vapor at elevated temperatures did result in tiny amounts of birefringent and extinctive solids embedded in oils and gels. Temperature cycling experiments showed no indication of crystallization. These results demonstrate the difficulty of crystallizing the compound of Formula I.

The details of various solution based crystallization experiments and results are given in Table 2 below.

TABLE 2

Solvent Based Crystallization Attempts

| Attempt No. | Solvent System | Method | Results |
|---|---|---|---|
| 1 | tetrafluoroethylene/TBME | slow evaporation → fast evaporation | oil |
| 2 | chloroform/heptane | slow cool | oil |
| 3 | EtOAc/cyclohexane | slow cool | oil |
| 4 | dioxane/methylcyclohexane | slow cool | oil |

TABLE 2-continued

Solvent Based Crystallization Attempts

| Attempt No. | Solvent System | Method | Results |
|---|---|---|---|
| 5 | methyl ethyl ketone/methylcyclohexane | slow evaporation → fast evaporation | oil |
| 6 | dichloromethane/diisopropyl ether | slow evaporation → fast evaporation | oil |
| 7 | TBME/perfluorohexanes | slurry | oil |
| 8 | methyl nonafluorobutyl ether | vapor diffusion on oil (1981-14-01) @ 40 → 70° C. | oil, tiny plates (+B/+E) |
| 9 | perfluorohexanes | vapor diffusion on oil (1981-12-01) @ 40 → 70° C. | oil |
| 10 | heptane | vapor diffusion on oil (1981-11-02) @ 40 → 70° C. | oil, few flakes (+B/+E) |
| 11 | cyclohexane | vapor diffusion on oil (1981-10-04) @ 40 → 70° C. | oil, few tablets (+B/+E) |
| 12 | heptane | slurry @ ~70° C. | oil residue |
| 13 | methylcyclohexane | slurry @ ~70° C. | oil residue |
| 14 | methyl nonafluorobutyl ether | slurry @ ~70° C. | gel residue |
| 15 | methyl nonafluorobutyl ether | vapor diffusion @ ~70° C. | tiny particles (+B/+E), oil |
| 16 | cyclohexane | vapor diffusion @ ~70° C. | particles (+B/+E), oil/gel |
| 17 | anisole | temperature cycling 10-60-10° C. | oil, no solids |
| 18 | cumene | temperature cycling 10-60-10° C. | oil, no solids |
| 19 | o-xylene | temperature cycling 10-60-10° C. | oil, no solids |
| 20 | methyl benzoate | temperature cycling 10-60-10° C. | oil, no solids |
| 21 | acetonitrile | slurry @ ~70° C. | oil, no solids |
| 22 | dioxane | slurry @ ~70° C. | oil, no solids |
| 23 | methyl nonafluorobutyl ether | slurry oil (1981-10-01) | oil, no solids |
| 24 | methyl nonafluorobutyl ether | slurry oil (1981-10-02) | oil, no solids |
| 25 | methyl nonafluorobutyl ether | slurry oil (1981-24-01) | oil, no solids |
| 26 | methyl nonafluorobutyl ether | slurry oil (1984-24-02) @ ~60° C. | oil, no solids |
| 27 | methyl nonafluorobutyl ether | slurry oil (1984-24-03) @ ~60° C. | oil, no solids |
| 28 | methyl nonafluorobutyl ether | slurry oil (1984-26-01) @ ~60° C. | oil, no solids |
| 29 | ethanol/water | antisolvent precipitation | sticky, gel solids |

Example 2: Non-Solvent Based Crystallization Attempts

The elevated temperature and humidity stress experiments resulted in oils containing small amounts of solids exhibiting birefringence and extinction. Sonication does not appear to offer any advantages over more common techniques. These results further confirm the difficulty of crystallizing the compound of Formula I. Heteroseeding using the diisopropyl ester analogue was also ineffective.

The details of various non-solvent based crystallization experiments and results are given in Table 3 below.

TABLE 3

Non-Solvent Based Crystallization Attempts

| Attempt No. | Method | Morphology |
|---|---|---|
| 30 | Sonication (acetonitrile) | oil, no crystallization |
| 31 | Sonication (dichloromethane) | oil, no crystallization |
| 32 | Sonication (ethanol) | oil, no crystallization |
| 33 | Sonication (ethyl ether) | oil, no crystallization |
| 34 | Sonication (heptane) | oil, no crystallization |
| 35 | Sonication (isopropyl alcohol) | oil, no crystallization |
| 36 | Sonication (methanol) | oil, no crystallization |
| 37 | Sonication (methyl ethyl ketone) | oil, no crystallization |
| 38 | Sonication (methyl nonafluorobutyl ether) | oil, no crystallization |
| 39 | Sonication (TBME) | oil, no crystallization |
| 40 | Sonication (THF) | oil, no crystallization |
| 41 | Sonication (toluene) | oil, no crystallization |
| 42 | Stressed at ~100° C. | clear oil, 2 tiny irregular crystalline (+B/+E) fragments |
| 43 | Stressed at ~58% RH at 40° C. | gel solids (−B/−E) |
| 44 | Stressed at ~75% RH at 40° C. | oil, no solids |
| 45 | Stressed at ~75% RH at 60° C. | clear oil, no solids |
| 46 | Stressed at ~80° C. | oil |

Example 3: Crystallization Experiments

Spontaneous crystallization of the compound of Formula (I) was observed when the amorphous form was dissolved at room temperature in a mixture of THF and heptane (ratio 75:25 v/v). Additional heptane was added until a turbid "solution" was obtained. This turbid "solution" was stirred with a magnetic stirrer at room temperature for 16 hours, yielding a white paste. The XRPD measurement confirmed crystalline material, FIG. 5 (Test 9 below). This first crystalline material was used to seed solutions or slurries of the amorphous form in a number of other solvent systems. In most cases crystalline material was produced within a short time at room temperature. Solvates were always produced using these crystallization conditions. The ethanol solvate (Test 8) and the THF solvate (Test 14) were checked by solution NMR (not shown).

Figure 9:
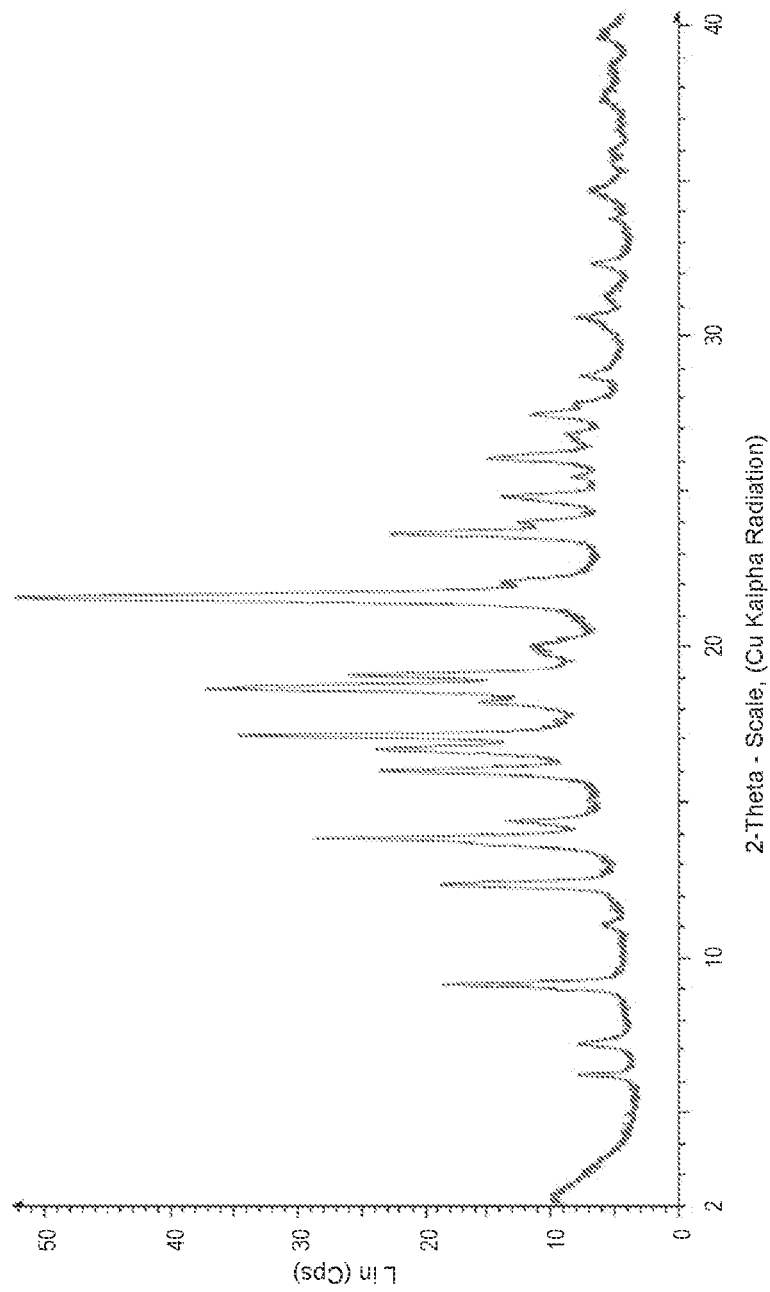
FIG. 9 is an X-ray powder diffraction pattern of a crystalline form.
Figure 10A:
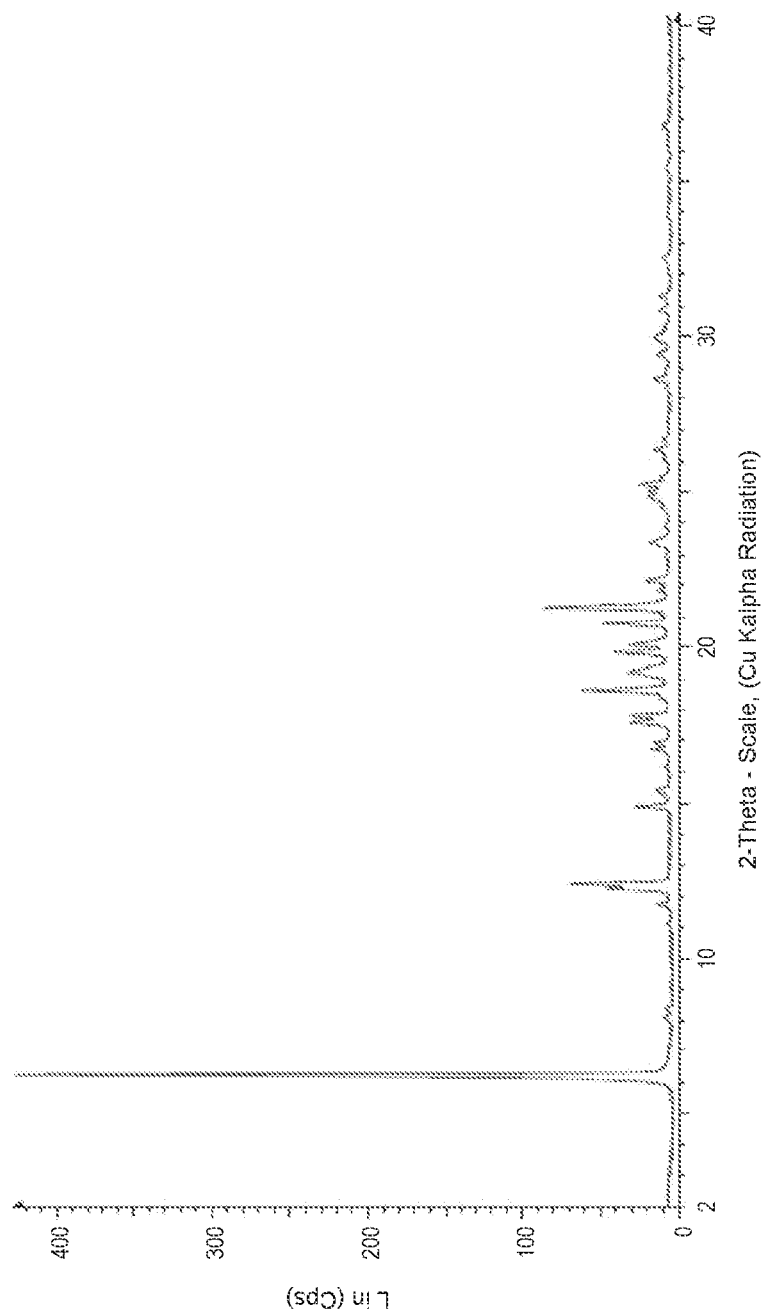
FIG. 10a is an X-ray powder diffraction pattern of a THF solvate crystalline form.
Figure 10B:
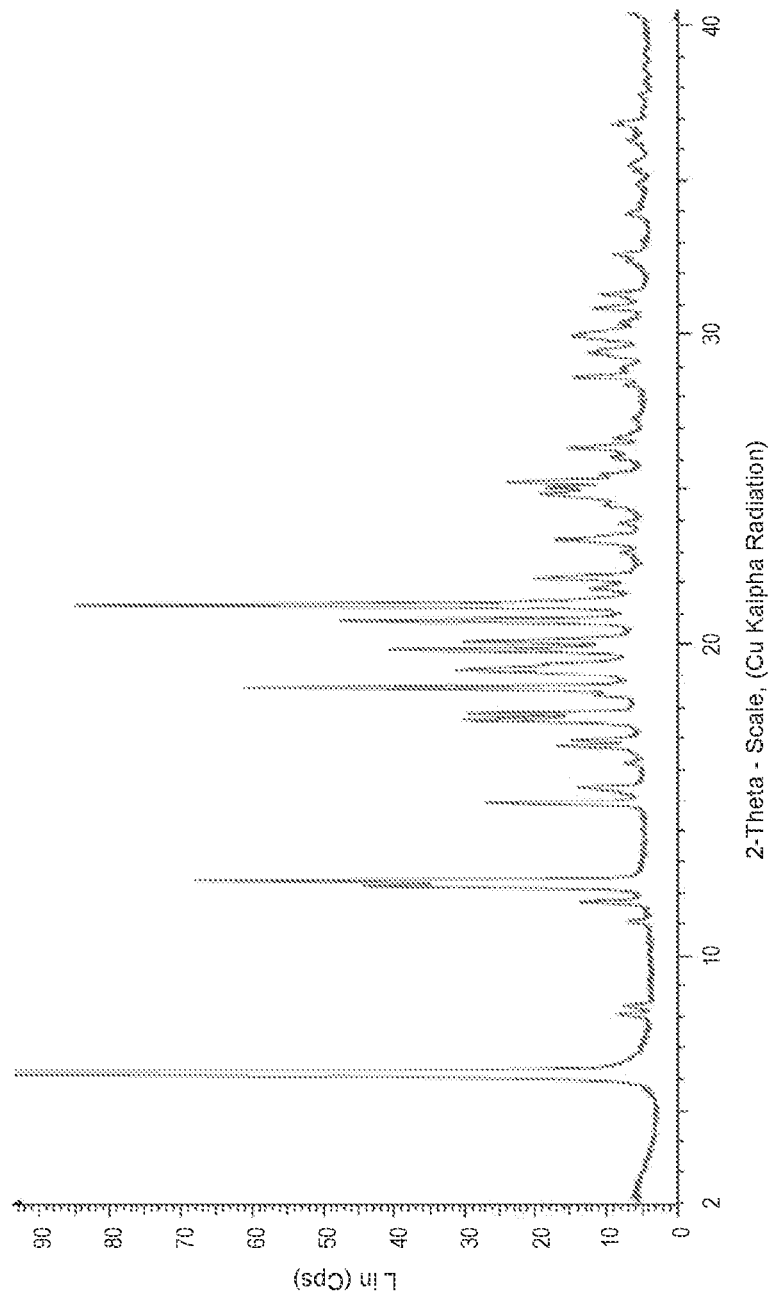
Figure 11:
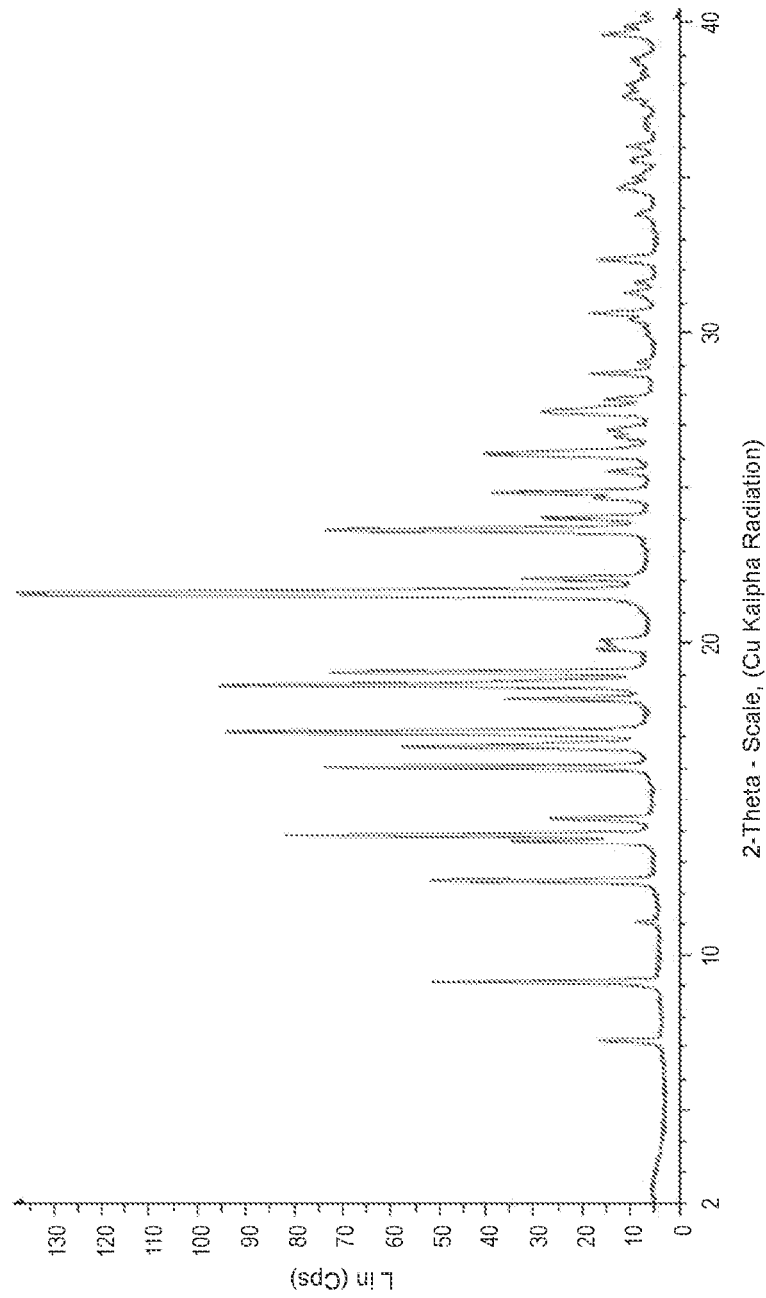
FIG. 11 is an X-ray powder diffraction pattern of crystalline Form C.
Figure 12:
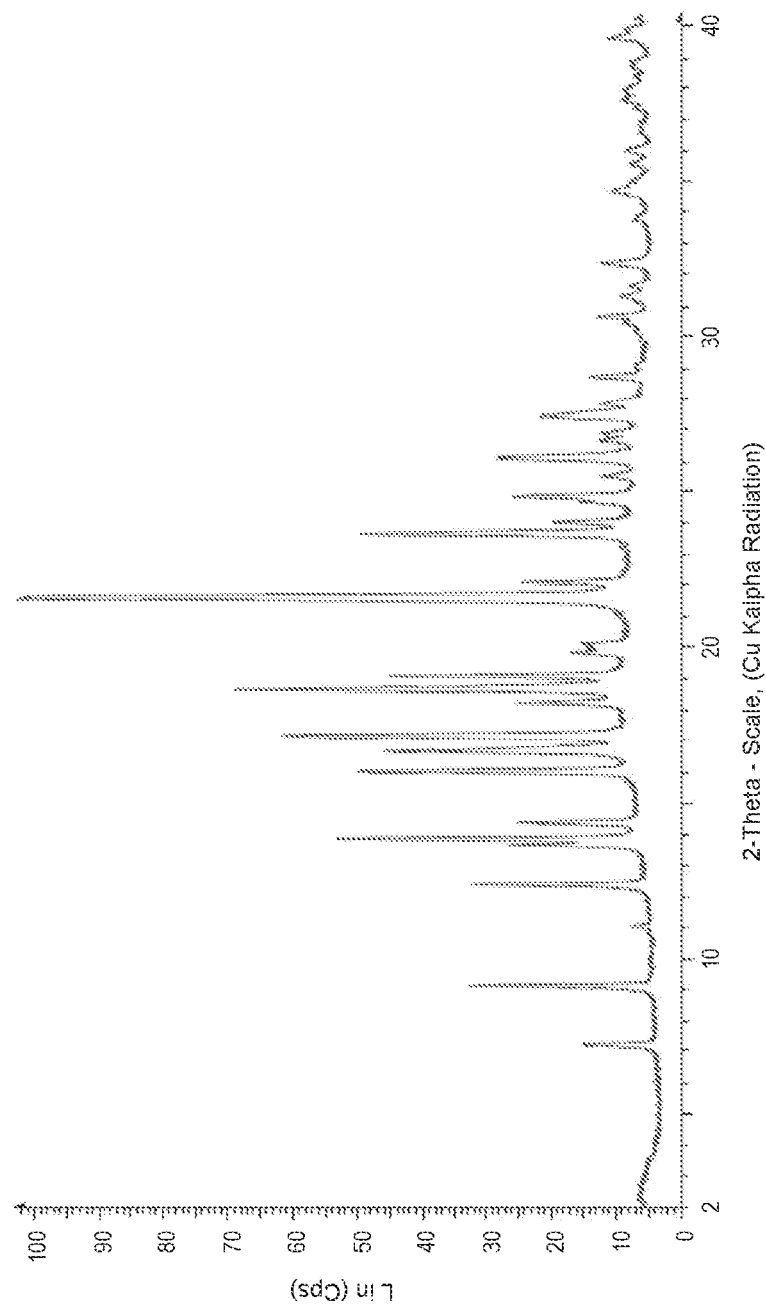
FIG. 12 is an X-ray powder diffraction pattern of crystalline Form C.

The first attempt to desolvate the THF solvate at 80° C. in heptane (Test 15) resulted in a viscous sticky mass. After cooling to room temperature, the slurry was seeded with the ethanol solvate and stirred for 20 hours at room temperature. After filtration and air-drying at room temperature the sample contained only a very small amount of residual solvent and XRPD confirmed the production of a new crystal form (i.e., crystal form C), FIG. 9. Solution NMR spectrum (not shown) shows the same spectrum as for the starting material. This unsolvated crystal form C was used to seed further crystallization experiments.

Various crystallization experiments produced larger scale amounts of crystalline or solvate forms of the compound of Formula I. For example, the THF solvate (Test Result 20) and the unsolvated crystal form C (Test Results 21 and 23) were produced at a 200 mg scale.

The details of various crystallization experiments and results are given in Table 4 below.

TABLE 4

Crystallization Experiments

| Test | Starting Material | Solvent | Concentration (mg/ml) | Conditions | Results |
|---|---|---|---|---|---|
| 1 | amorphous | EtOAc | 103/0.3 | 23° C. addition of 0.4 ml n-heptane/23° C./stirring (magnetic stirrer)/23° C. addition of approx. 5 mg amorphous/RT stirring totally 135 min/70° C. cooling to RT/ addition of Test Result 9 | Crystals |
| 2 | amorphous | ethanol | 62/0.2 | 23° C. addition of 0.1 ml water/23° C./stirring (magnetic stirrer)/ 23° C. addition of approx. 5 mg amorphous/RT | emulsion |
| 3 | amorphous | acetic acid | 65/0.2 | 23° C. addition of 0.1 ml water/23° C./stirring (magnetic stirrer)/ 23° C. addition of approx. 5 mg amorphous/RT | emulsion |
| 4 | amorphous | 1-octanol | 63/0.3 | 23° C. addition of 1.1 ml n-heptane/23° C./ stirring (magnetic stirrer)/23° C. addition of approx. 5 mg amorphous/RT | emulsion |
| 5 | amorphous | NMP | 68/0.1 | 23° C. addition of 0.1 ml water/23° C./stirring (magnetic stirrer)/ 23° C. addition of approx. 5 mg amorphous/RT | emulsion |
| 6 | amorphous | TBME | 54/0.2 | 23° C. addition of 0.2 ml n-heptane/23° C./ stirring (magnetic stirrer)/23° C. addition of Test Result 9/RT | TBME solvate |
| 7 | amorphous | toluene | 60/0.2 | 23° C. addition of 0.1 ml n-heptane/23° C./ stirring (magnetic stirrer)/23° C. addition of Test Result 9/RT | toluene solvate |
| 8 | amorphous | ethanol/n-heptane 75:25 v/v | 66/0.1 | 23° C. addition of 0.09 ml n-heptane/23° C./ stirring (magnetic stirrer)/23° C. addition of Test Result 9/RT | ethanol solvate |
| 9 | amorphous | THF/n-heptane 75:25 v/v | 63/0.1 | 23° C. addition of 0.06 ml n-heptane/23° C./ stirring (magnetic stirrer)/23° C. stirring RT/16 hours | THF solvate |

TABLE 4-continued

Crystallization Experiments

| Test | Starting Material | Solvent | Concentration (mg/ml) | Conditions | Results |
|---|---|---|---|---|---|
| 10 | amorphous | EtOAc/n-heptane 75:25 v/v | 70/0.1 | 23° C. addition of 0.06 ml n-heptane/23° C./stirring (magnetic stirrer)/23° C. addition of Test Result 9/RT | EtOAc solvate |
| 11 | amorphous | acetone/n-heptane 75:25 v/v | 68/0.1 | 23° C. addition of 0.14 ml n-heptane/23° C./stirring (magnetic stirrer)/23° C. addition of Test Result 9/RT | acetone solvate |
| 12 | amorphous | acetone/water 75:25 v/v | 60/0.2 | 23° C. addition of 0.02 ml water/23° C./stirring (magnetic stirrer)/23° C. addition of Test Result 9/RT | acetone solvate |
| 13 | amorphous | acetonitrile/water 75:25 v/v | 67/0.1 | 23° C. addition of 0.02 ml water/23° C./stirring (magnetic stirrer)/23° C. addition of Test Result 9/RT | emulsion |
| 14 | amorphous | THF/n-heptane 75:25 v/v | 126/0.2 | 23° C. addition of 0.1 ml n-heptane/23° C./stirring (magnetic stirrer)/23° C. addition of Test Result 9/RT addition of 2.0 ml n-heptane/23° C./stirring (magnetic stirrer)/23° C. filtration/air-drying 5 min RT | THF solvate |
| 15 | Test 19 | n-heptane | 40/2.0 | 23° C. stirring 80° C. (magnetic stirrer) cooling to RT/ addition of Test Result 8/RT stirring RT (magnetic stirrer)/20 hours/23° C. filtration/air-drying 5 min RT | Crystal form C + small amount THF solvate |
| 16 | amorphous | n-heptane | 59/2.0 | 23° C. addition of Test Result 14/RT stirring RT (magnetic stirrer)/18 hours/23° C. filtration/air-drying 5 min RT | Amorphous + small amount THF solvate |
| 17 | amorphous | water | 51/2.0 | 23° C. addition of Test Result 14/RT stirring RT (magnetic stirrer)/18 hours/23° C. filtration/air-drying 5 min RT | Amorphous |
| 18 | amorphous | n-heptane | 54/2.0 | 23° C. addition of Test Result 8/RT stirring RT (magnetic stirrer)/18 hours/23° C. filtration/air-drying 5 min RT | Amorphous |
| 19 | amorphous | Water | 53/2.0 | 23° C. addition of Test Result 8/RT stirring RT (magnetic stirrer)/18 hours/23° C. filtration/air-drying 5 min RT | Amorphous |
| 20 | amorphous | THF | 253/0.3 | 23° C. addition of 30 ml n-heptane/23° C./stirring (magnetic stirrer) totally 30 min/23° C. sonication/RT/3 min stirring totally 30 min/55° C. hot filtration/air-drying 5 min RT | THF solvate (238 mg) |
| 21 | amorphous | ethanol absolute | 252/0.3 | 23° C. addition of 30 ml n-heptane/23° C./stirring (magnetic stirrer) totally 55 min/23° C. sonication/RT/3 min stirring totally 38 min/23° C. stirring totally 47 min/55° C. stirring totally 70 min/23° C. addition of approx. 5 mg crystal form C (Test 23)/stirring at 23° C./totally 10 min sonication/RT/3 min stirring totally 50 min/55° C. hot filtration/air-drying 5 min RT | crystal form C (198 mg) |
| 22 | amorphous | TBME | 256/0.3 | 23° C. addition of 30 ml n-heptane/23° C./stirring (magnetic stirrer) totally 45 min/23° C. sonication/RT/3 min stirring totally 45 min/23° C. stirring totally 47 min/55° C. stirring totally 78 min/23° C. addition of approx. 5 mg crystal form C (Test Result 23)/ stirring at 23° C. stirring totally 4 min/23° C. | crystal form C + small amount TBME solvate (191 mg) |

TABLE 4-continued

Crystallization Experiments

| Test | Starting Material | Solvent | Concentration (mg/ml) | Conditions | Results |
|---|---|---|---|---|---|
| | | | | stirring totally 8 min/55° C. | |
| | | | | sonication/RT/3 min | |
| | | | | stirring totally 80 min/55° C. | |
| | | | | sonication/RT/3 min | |
| | | | | stirring totally 22 min/55° C. | |
| | | | | sonication/RT/3 min | |
| | | | | stirring totally 10 min/55° C. | |
| | | | | hot filtration/air-drying 5 min RT 23° C. | |
| 23 | amorphous | n-heptane + 0.5% THF | 199/10 | stirring (magnetic stirrer) totally 25 min/55° C. addition of approx. 5 mg crystal form C (Test Result 15)/ stirring at 55° C./ totally 25 min sonication/RT/3 min stirring totally 24 min/55° C. hot filtration/air-drying 5 min RT | crystal form C (144 mg) | v/v = volume to volume

Example 4: Characterization of Crystalline Samples

The crystalline solid forms were characterized by XRPD, TGA, DSC and selected samples by solution NMR.

The XRPD results of the unsolvated crystal form C, FIGS. 11, 12, 21-27 and 30, show good crystallinity, the content of residual solvents is very low (<0.1%) and the melting temperature is 122° C. (hermetically closed sample pans; DSC peak temperature) FIGS. 19a and 19b. Solution NMR shows the spectrum of the starting material (not shown).

The characterization of the solvates by DSC, FIGS. 13-18, provided an overview of the stability of the solvates as estimated by the temperature of peaks measured in hermetically closed sample pans. The temperature of the peaks of the solvates vary widely. The highest temperature observed was for the THF solvate (125° C.), FIG. 18, which reflects its high stability. For the ethanol solvate (66° C.), FIG. 15, and the EtOAc solvate (68° C.), FIG. 16, the temperature of the peaks are much lower and well below the boiling temperatures of the corresponding solvents. The ethanol solvate (Test Result 8) and the THF solvate (Test Result 14) were checked by solution NMR (not shown), and showed the spectra of the starting material and the solvent of the corresponding solvate.

The results of the TG mass loss and DSC Peak Temperatures of Example 4 are given in Table 5 below.

TABLE 5

| Solid Form Measurements | | | |
|---|---|---|---|
| Compound or Test | Solid Form | TG mass loss 25° C. to 200° C. (%) | DSC Peak Temperature (° C.) |
| A | Amorphous | n.a. | n.a. |
| 6 | TBME solvate | 14.1 | 108 |
| 7 | toluene solvate | 13.9 | 78 |
| 8 | ethanol solvate | 7.8 | 66 |
| 10 | EtOAc solvate | 10.8 | 68 |
| 11 | acetone solvate | 9.0 | 96 |
| 14 | THF solvate | 12.1 | 125 |
| 15 | crystal form C + small amount THF solvate | 0.7 | 117 |
| 20 | THF solvate | 11.9 | 125 |
| 21 | crystal form C | <0.1 | 122 |
| 23 | crystal form C | 1.3 | n.a. |

Example 5: Additional Seeding Crystallization Experiments

Phase equilibration experiments in solvent mixtures at different temperatures and seeding experiments were used to search for other unsolvated crystal forms of the compound of Formula I. A number of typical crystallization techniques (e.g., recrystallization from the melt or crystallization by cooling solutions) were not applicable because under these conditions nucleation of the compound is hindered. In turn desolvation of the solvates tends to produce the amorphous form.

Seeding concentrated solutions of the amorphous form in ethanol and THF using the unsolvated crystal form C at room temperature produced the ethanol solvate (Test Result 26) and the THF solvate (Test Result 29), respectively. The characterization of different solvates by DSC provided an overview of the stability of the solvates as estimated by the peak temperatures measured in hermetically closed sample pans.

Crystal form C was directly produced under the conditions in Test 30: The amorphous form was dissolved in EtOAc and heated to 75° C. Heptane was added slowly until a ratio of 1:7 v/v EtOAc/heptane was reached. The system was seeded with crystal form C and stirred for an additional time at 77° C. The solid was isolated by hot filtration of the suspension. XRPD showed that unsolvated crystal form C was produced, FIG. 21.

For the crystallization of the unsolvated crystal form C, a solvent/antisolvent mixture which did not produce the corresponding solvate or an oil but still showed an acceptable solubility is desirable. In EtOAc/heptane mixtures at ratios below 1:7 v/v at 76° C. an oil was produced, even when seeding with crystal form C (Test Result 34).

The unsolvated crystal form C shows a high physical and chemical stability in EtOAc/heptane 1:7 v/v. Phase equilibration experiments for 3 days at room temperature and at 78° C. showed no transformation of the crystal form C from Test 37. Solution NMR showed the same spectrum as for the starting material (not shown).

Stirring a slurry of the amorphous form with seeds of crystal form C in EtOAc/heptane 1:7 v/v at room temperature for 18 hours also produced crystal form C (Test 42). However, at 2° C. the EtOAc solvate was formed (Test 43).

The stability regions of the EtOAc solvate in solvent/antisolvent mixtures at different temperatures need to be tested. Crystal form C seems physically more stabile over a broader range of solvent/antisolvent ratios when using the EtOAc/heptane process than when using the ethanol/heptane process (Tests 33 and 34).

Figure 23:
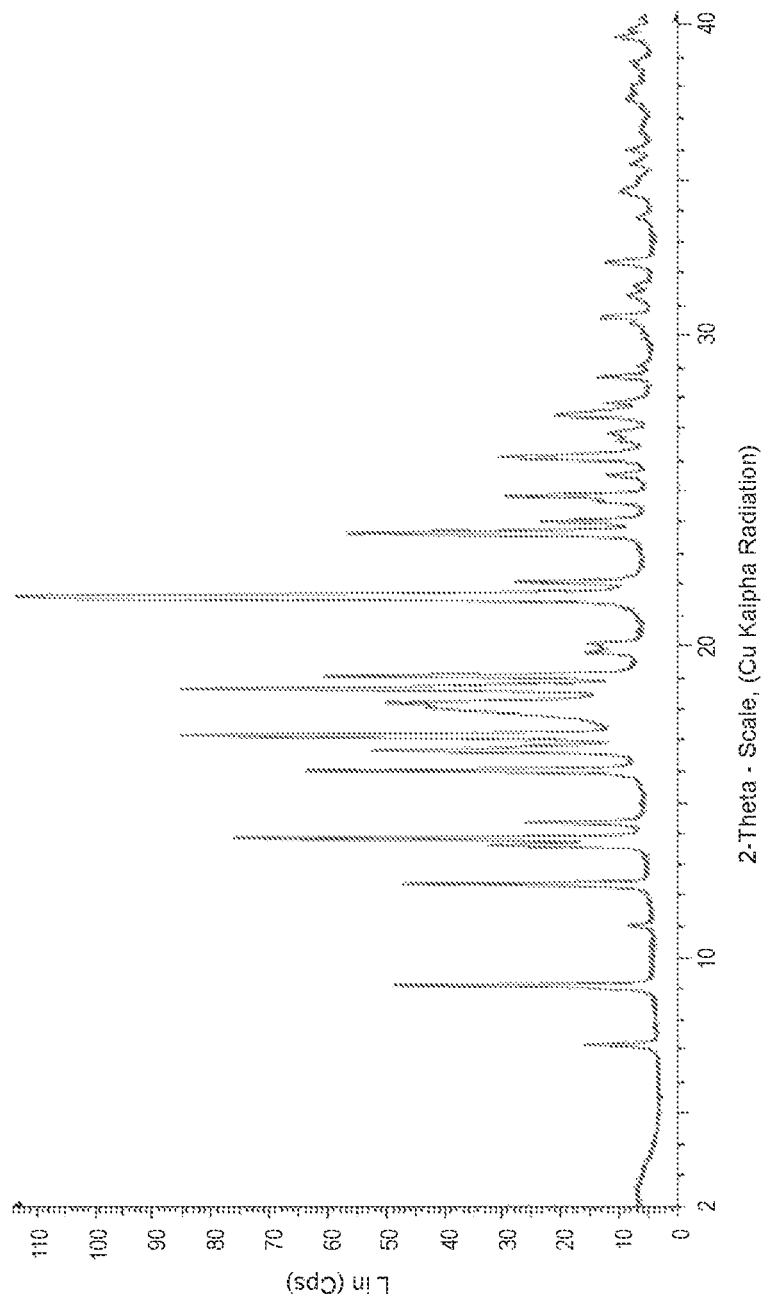
FIG. 23 is an X-ray powder diffraction pattern of crystalline Form C.
Figure 24:
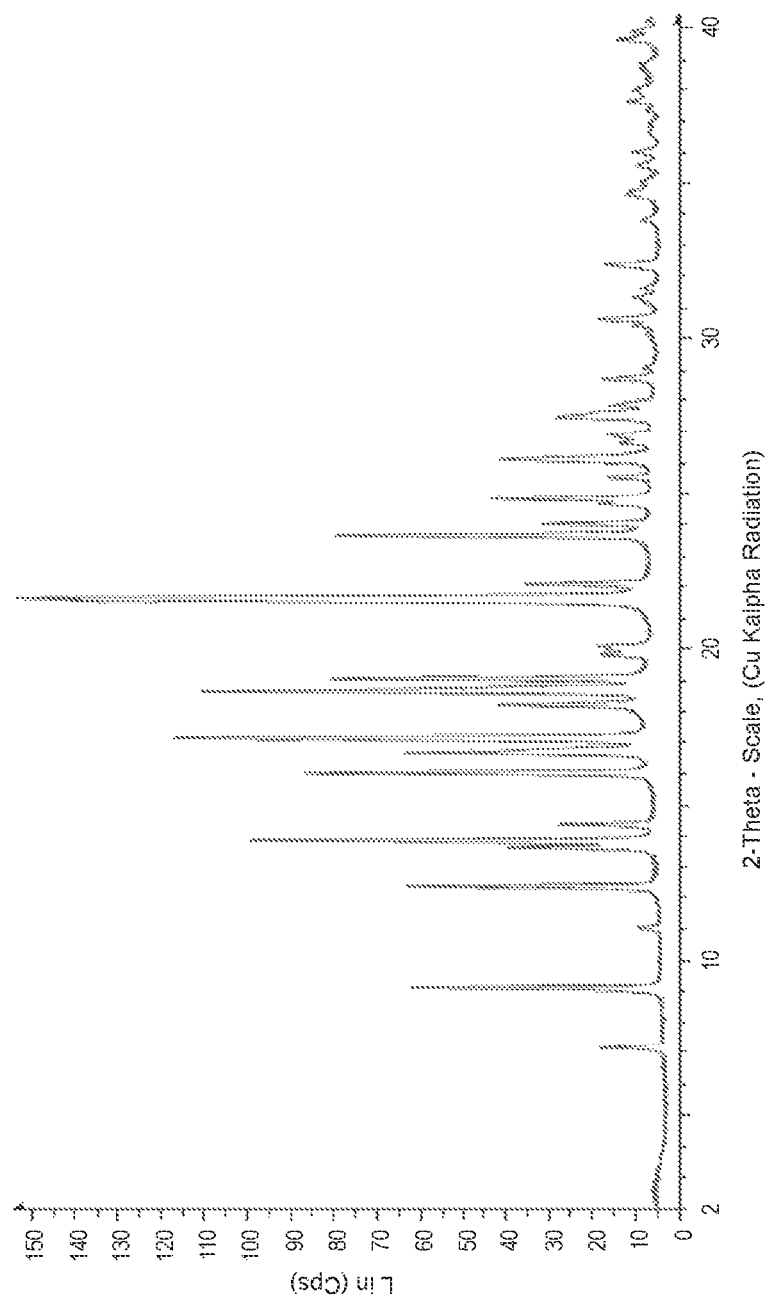
FIG. 24 is an X-ray powder diffraction pattern of crystalline Form C.
Figure 25:
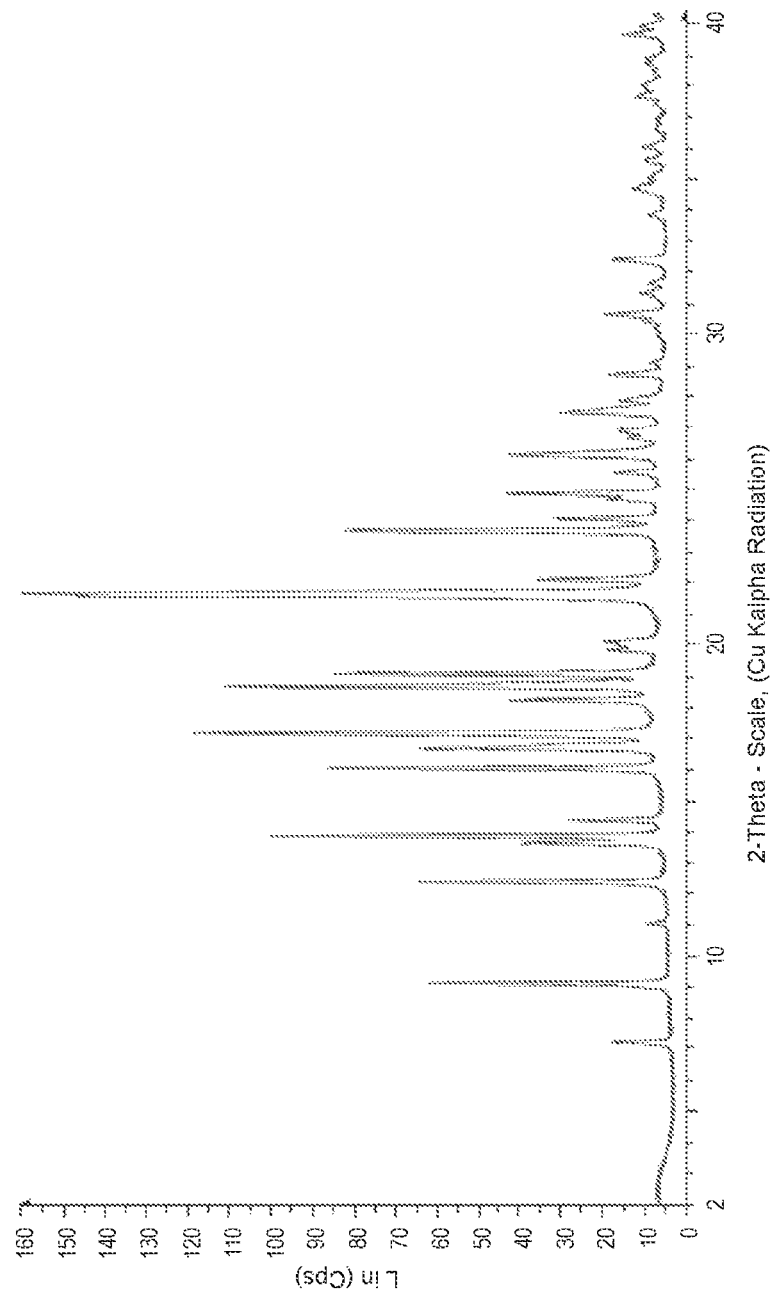
FIG. 25 is an X-ray powder diffraction pattern of crystalline Form C.

For a few samples the peak around 18° 2θ in XRPD was broader, as seen in Test 44 and Test 45, FIG. 23. Therefore a supersaturated solution was seeded (Test 47) with a sample which showed a relatively broad peak around 18° 2θ, FIG. 27. The solid produced in this stability experiment revealed that this broader peak does not indicate a physically more stabile form.

The details of the additional seeding crystallization experiments and results of the solid state of the samples of Example 5 are given in Table 6 below.

TABLE 6

Additional Seeding Crystallization Experiments

| Test | Starting Material | Solvent | Concentration (mg/ml) | Conditions | Results |
|---|---|---|---|---|---|
| 24 | amorphous | THF | 119/0.15 | Shaken/23° C. addition of approx. 5 mg of THE Solvate (Test Result 20)/ shaken/23° C. | THF Solvate |
| 25 | amorphous | Ethanol | 125/0.15 | Shaken/23° C. addition of approx. 5 mg of THE Solvate (Test Result 20)/ shaken/23° C. | Ethanol Solvate |
| 26 | amorphous | Ethanol | 125/0.15 | 23° C. addition of approx. 5 mg crystal form C (Test Result 21)/ shaken 23° C. | ethanol solvate |
| 27 | amorphous | ethanol + n-heptane 75:25 v/v | 67/0.19 | 23° C. addition of approx. 5 mg THF solvate (Test Result 20)/shaken 23° C. storing at 23° C./17 days | ethanol solvate |
| 28 | amorphous | ethanol + n-heptane 75:25 v/v | 66/0.19 | 23° C. addition of approx. 5 mg crystal form C (Test Result 21)/ shaken 23° C. storing at 23° C./17 days | ethanol solvate |
| 29 | amorphous | THF | 124/0.15 | 23° C. addition of approx. 5 mg crystal form C (Test Result 21)/ shaken 23° C. storing at 23° C./17 days | THF solvate |
| 30 | amorphous | EtOAc EtOAc + n-heptane 1:1.75 v/v EtOAc + n-heptane | 251/2.0 251/5.5 251/16 | 23° C. stirring 75° C. addition of 3.5 ml n-heptane addition of approx. 12 mg crystal form C (Test Result 21) addition of 10.5 ml n-heptane and addition of approx. 5 mg crystal form C (Test Result 21) stirring/77° C./20 min. scraping the solid from the glass wall stirring/77° C./5 min. hot filtration/ airdrying 3 min. RT | crystal form C |
| 31 | amorphous | EtOAc EtOAc + n-heptane 1:7 v/v | 251/2.0 251/16 | 23° C. stirring 75° C. n-heptane and addition of approx. 5 mg crystal form C (Test Result 30) scraping the solid from the glass wall stirring/76° C./5 min scraping the solid from the glass wall stirring/76° C./75 min. scraping the solid from the glass wall stirring/76° C./35 min. hot filtration/ airdrying 3 min. RT | crystal form C |
| 32 | amorphous | ethanol Ethanol + n-heptane 1:7 v/v Ethanol + n-heptane 1:10 v/v | 248/2.0 248/16 248/22 | 23° C. stirring 76° C. addition of 14 ml n-heptane and addition of approx. 5 mg crystal form C (Test Result 30) addition of 6 ml n-heptane and addition of approx. 5 mg crystal form C (Test Result 30) cooling to RT/ overnight addition of approx. 5 mg crystal form C (Test Result 30)/ stirring RT/50 min. scraping the solid from the glass wall stirring/23° C./3 days filtration/air-drying 3 min. RT | crystal form C |
| 33 | amorphous | ethanol Ethanol + n-heptane 1:10 v/v Ethanol + n-heptane 1:20 v/v Ethanol + n-heptane 1:30 v/v | 250/0.5 250/5.5 250/10.5 250/15.5 | 23° C. stirring 76° C. addition of 5.0 ml n-heptane and addition of approx. 5 mg crystal form C (Test Result 31) addition of 5.0 ml n-heptane and addition of approx. 5 mg crystal form C (Test Result 31) addition of 5.0 ml n-heptane and addition of approx. 5 mg crystal form C (Test Result 31) cooling to RT/ overnight addition of approx. 5 mg crystal form C (Test Result 31)/ stirring RT/43 min. scraping the solid from the glass wall | crystal form C |

TABLE 6-continued

Additional Seeding Crystallization Experiments

| Test | Starting Material | Solvent | Concentration (mg/ml) | Conditions | Results |
|---|---|---|---|---|---|
| 34 | amorphous | EtOAc | 251/2.0 | stirring/23° C./3 days filtration/air-drying 3 min. RT 23° C. stirring 76° C. addition of 2.0 ml n-heptane and addition of approx. 5 mg crystal form C (Test Result 31) | crystal form C |
|  |  | EtOAc + n-heptane 1:1 v/v | 251/4.0 | addition of 2.0 ml n-heptane and addition of approx. 5 mg crystal form C (Test Result 31) |  |
|  |  | EtOAc + n-heptane 1:2 v/v | 251/6.0 | addition of 2.0 ml n-heptane and addition of approx. 5 mg (Test Result 31) |  |
|  |  | EtOAc + n-heptane 1:3 v/v | 251/8.0 | addition of 2.0 ml n-heptane and addition of approx. 5 mg (Test Result 31) |  |
|  |  | EtOAc + n-heptane 1:4 v/v | 251/10 | addition of 2.0 ml n-heptane and addition of approx. 5 mg (Test Result 31) |  |
|  |  | EtOAc + n-heptane 1:5 v/v | 251/12 | addition of 2.0 ml n-heptane and addition of approx. 5 mg crystal form C (Test Result 31) |  |
|  |  | EtOAc + n-heptane 1:6 v/v | 251/14 | addition of 2.0 ml n-heptane and addition of approx. 5 mg (Test Result 31) |  |
|  |  | EtOAc + n-heptane 1:7 v/v | 251/16 | addition of 2.0 ml n-heptane and addition of approx. 5 mg (Test Result 31) stirring/78° C./20 min. scraping the solid from the glass wall stirring/78° C./20 min hot filtration/ airdrying 3 min. RT |  |
| 35 | amorphous | EtOAc | 253/2.0 | 23° C. addition of the solution to 14 ml n-heptane + approx. 5 mg crystal form C (Test Result 34)/ stirring/78° C./20 min. scraping the solid from the glass wall stirring/78° C./25 min. hot filtration/ airdrying 3 min. RT | crystal form C |
| 36 | amorphous | EtOAc | 250/1.0 | 23° C. addition of the solution to 15 ml EtOAc + n-heptane 1:14 v/v + 57 mg Starting Material B + approx.5 mg crystal form C (Test Result 34)/stirring/78° C./ 15 min. scraping the solid from the glass wall cooling to RT/ stirring RT/3 days filtration/air-drying 3 min. RT | crystal form C |
| 37 | 34 | EtOAc + n-heptane 1:7 v/v | 110/7.0 | 23° C. stirring 78° C./totally 3.5 hours scraping the solid from the glass wall stirring/78° C./ totally 5.5 hours scraping the solid from the glass wall stirring/78° C./ totally 3 days scraping the solid from the glass wall hot filtration/ airdrying 3 min. RT | crystal form C |
| 38 | amorphous | EtOAc | 127/0.15 | 23° C. addition of approx. 5 mg crystal form C (Test Result 30)/ shaken 23° C. storing at 23° C./17 hours | EtOAc solvate |
| 39 | amorphous | EtOAc | 124/0.15 | 23° C. addition of approx. 5 mg crystal form C (Test Result 30)/ shaken 23° C. addition of 3.0 ml n-heptane 50° C./2 min 23° C./addition of approx. 5 mg TBME solvate (Test Result 6)/stirring/23° C./ 10 min. scraping the solid from the glass wall 50° C./2 min filtration/air-drying 3 min. RT | crystal form C |
| 40 | amorphous | ethanol | 125/0.15 | 23° C. addition of approx. 5 mg crystal form C (Test Result 30)/ shaken 23° C. 50° C./2 min. addition of 3.0 ml n-heptane 23° C./addition of approx. 5 mg TBME solvate (Test Result 6)/stirring/23° C./ 10 min. scraping the solid from the glass wall stirring 11 hours/ 23° C. filtration/air-drying 3 min. RT | ethanol solvate |
| 41 | amorphous | butyl acetate | 127/0.15 | 23° C. addition of approx. 5 mg crystal form C (Test Result 30)/ shaken 23° C. addition of 3.0 ml n-heptane 50° C./2 min scraping the solid from the glass wall | crystal form C |

TABLE 6-continued

Additional Seeding Crystallization Experiments

| Test | Starting Material | Solvent | Concentration (mg/ml) | Conditions | Results |
|---|---|---|---|---|---|
| 42 | amorphous | EtOAc + n-heptane 1:7 v/v | 252/16 | stirring 15 min./23° C. 50° C./2 min stirring 23 hours/23° C. filtration/air-drying 3 min. RT | crystal form C |
| 43 | amorphous | EtOAc + n-heptane 1:7 v/v | 252/16 | 23° C. addition of approx. 5 mg crystal form C (Test Result 31) stirring 18 hours/23° C. filtration/air-drying 3 min. RT | EtOAc solvate |
| 44 | amorphous | EtOAc | 112/0.15 | 23° C. addition of approx. 5 mg crystal form C (Test Result 31) stirring 18 hours/2° C. filtration/air-drying 3 min. RT | crystal form C |
| 45 | amorphous | EtOAc | 117/0.15 | 23° C. addition of 3.0 ml n-heptane addition of approx. 5 mg toluene solvate (Test Result 7) stirring 6 days/23° C. scraping the solid from the glass wall filtration/air-drying 3 min. RT | crystal form C |
| 46 | amorphous | Ethanol | 120/0.15 | 23° C. addition of 3.0 ml n-heptane addition of approx. 5 mg ethanol solvate (Test Result 40) stirring 6 days/23° C. scraping the solid from the glass wall filtration/air-drying 3 min. RT | ethanol solvate |
| 47 | 14 | EtOAc | 129/1.0 | 23° C. addition of 3.0 ml n-heptane addition of approx. 5 mg toluene solvate (Test Result 7) stirring 55 min./23° C. scraping the solid from the glass wall stirring 6 days/23° C. scraping the solid from the glass wall filtration/air-drying 3 min. RT | crystal form C |
| | | | | 23° C. addition of 7.0 ml n-heptane addition of approx. 15 mg form C (Test Result 45) stirring 7 min./23° C. scraping the solid from the glass wall stirring 3 days/23° C. filtration/air-drying 3 min. RT | | v/v = volume to volume

Example 6: THF Solvate Stability

Figure 20A:
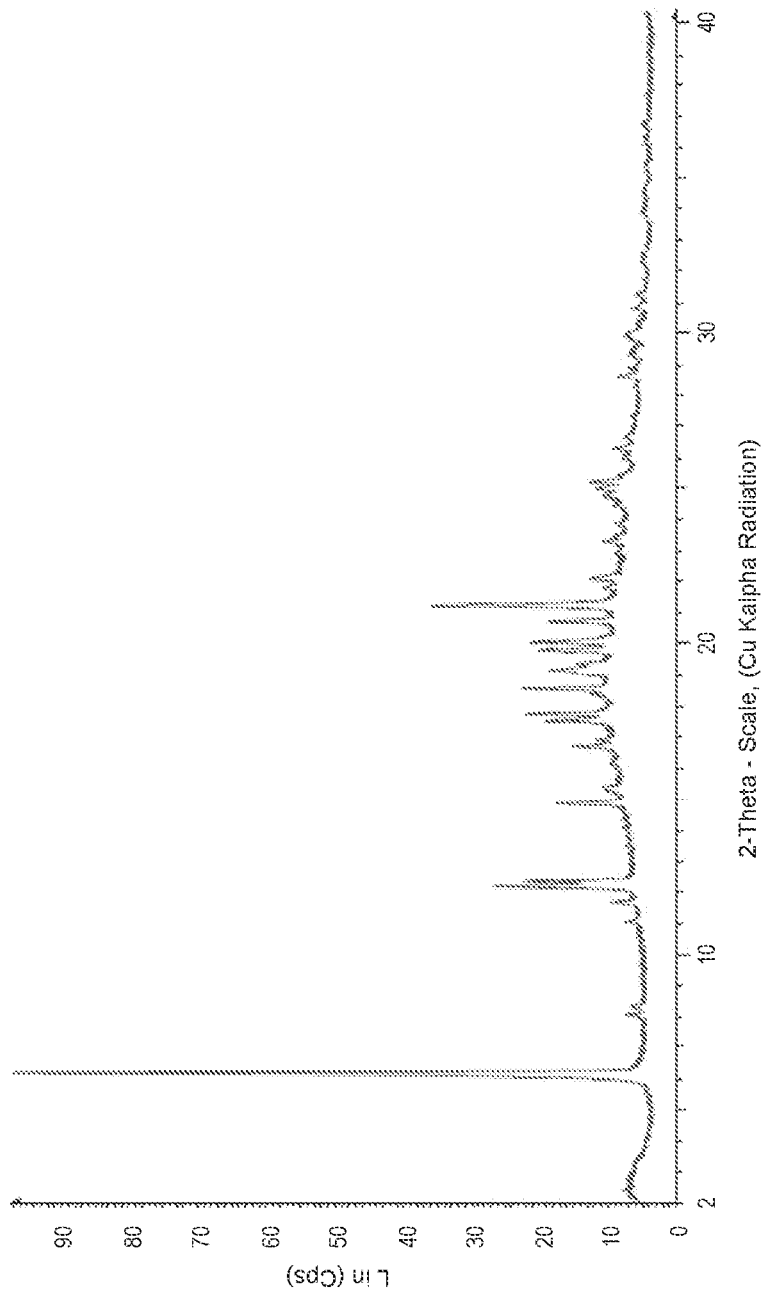
FIG. 20a is an X-ray powder diffraction pattern of a mixed crystalline form.
Figure 20B:
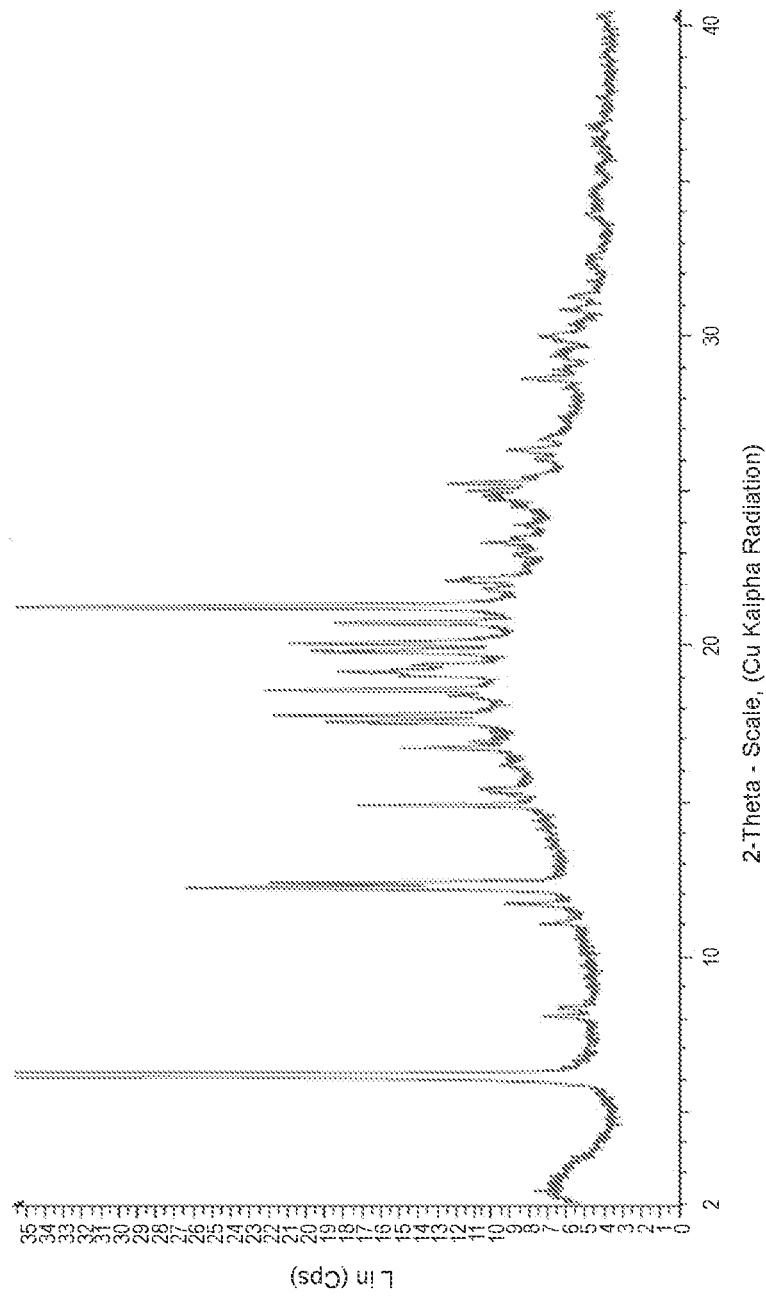
Figure 21:
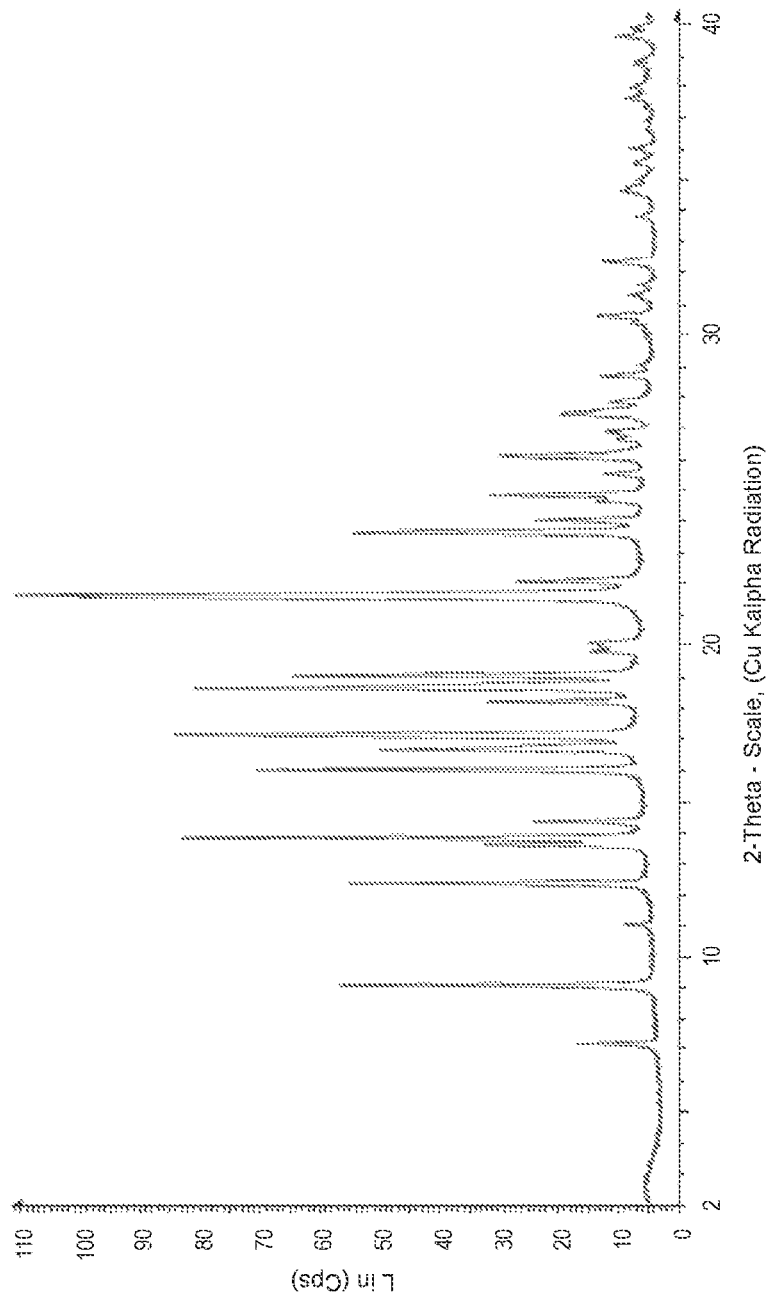
FIG. 21 is an X-ray powder diffraction pattern of crystalline Form C.
Figure 22:
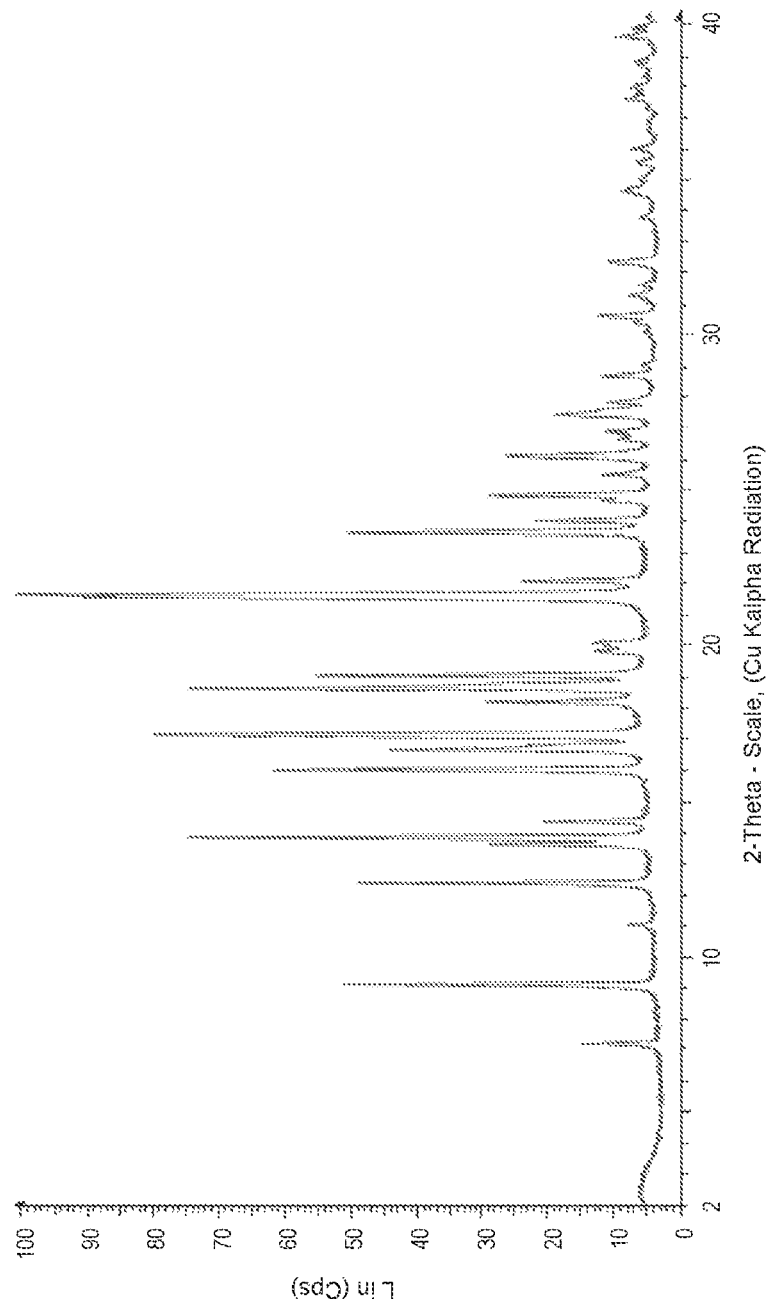
FIG. 22 is an X-ray powder diffraction pattern of crystalline Form C.

Desolvation of the solvates tends to produce the amorphous form. Storing the THF solvate at 96% r.h. at room temperature for 8 weeks (Test 48) produced a mixture of the solvate and the amorphous form, as confirmed by XRPD, FIGS. 20a and 20b.

The results of the THF solvate stability test of Example 6 are given in Table 7 below.

TABLE 7

THF Solvate Stability

| Test | Starting Material | Solvent | Concentration (mg/ml) | Conditions | Results |
|---|---|---|---|---|---|
| 48 | 14 | — | approx. 13 mg | storing in humidity chamber 96% r.h./23° C. storing in humidity chamber 96% r.h./23° C. totally 8 weeks | Mixture THE solvate + amorphous form |

Example 7: Hydrate Formation

Figure 26:
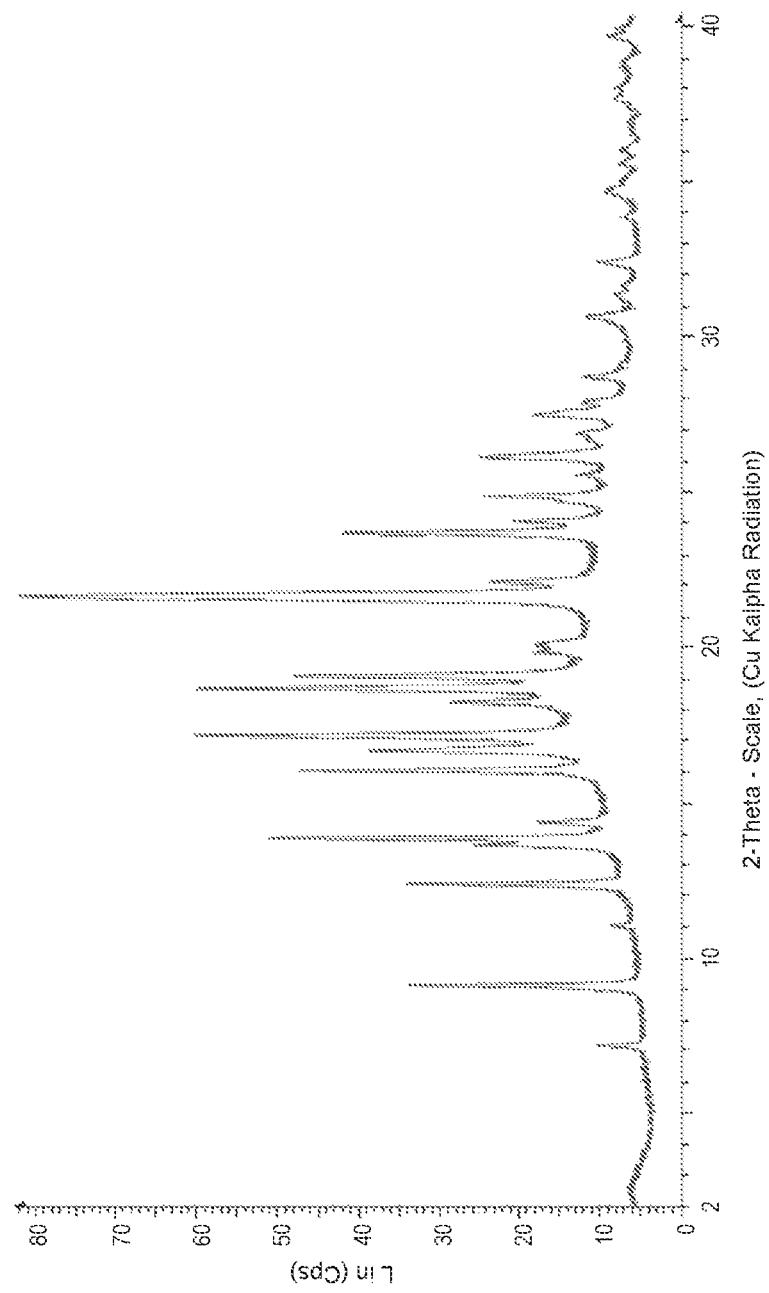
FIG. 26 is an X-ray powder diffraction pattern of crystalline Form C.
Figure 27:
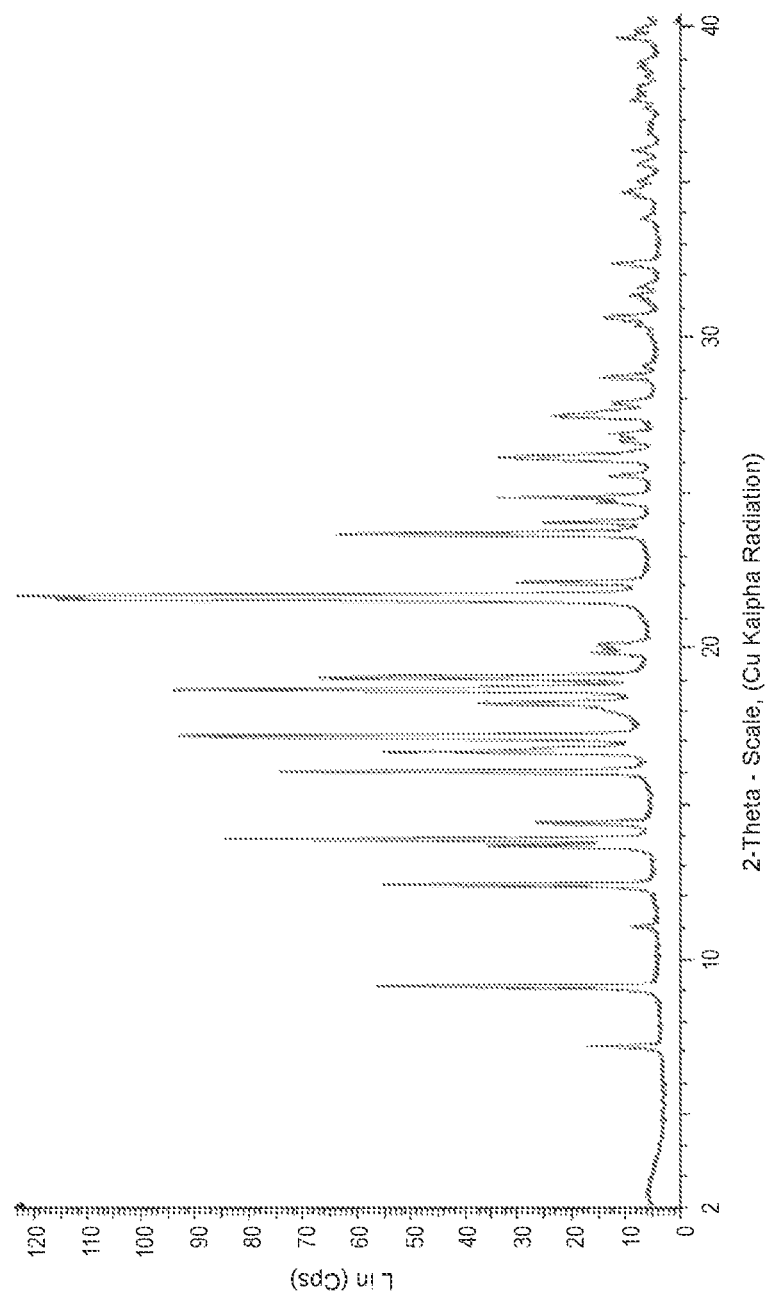
FIG. 27 is an X-ray powder diffraction pattern of crystalline Form C.
Figure 28B:
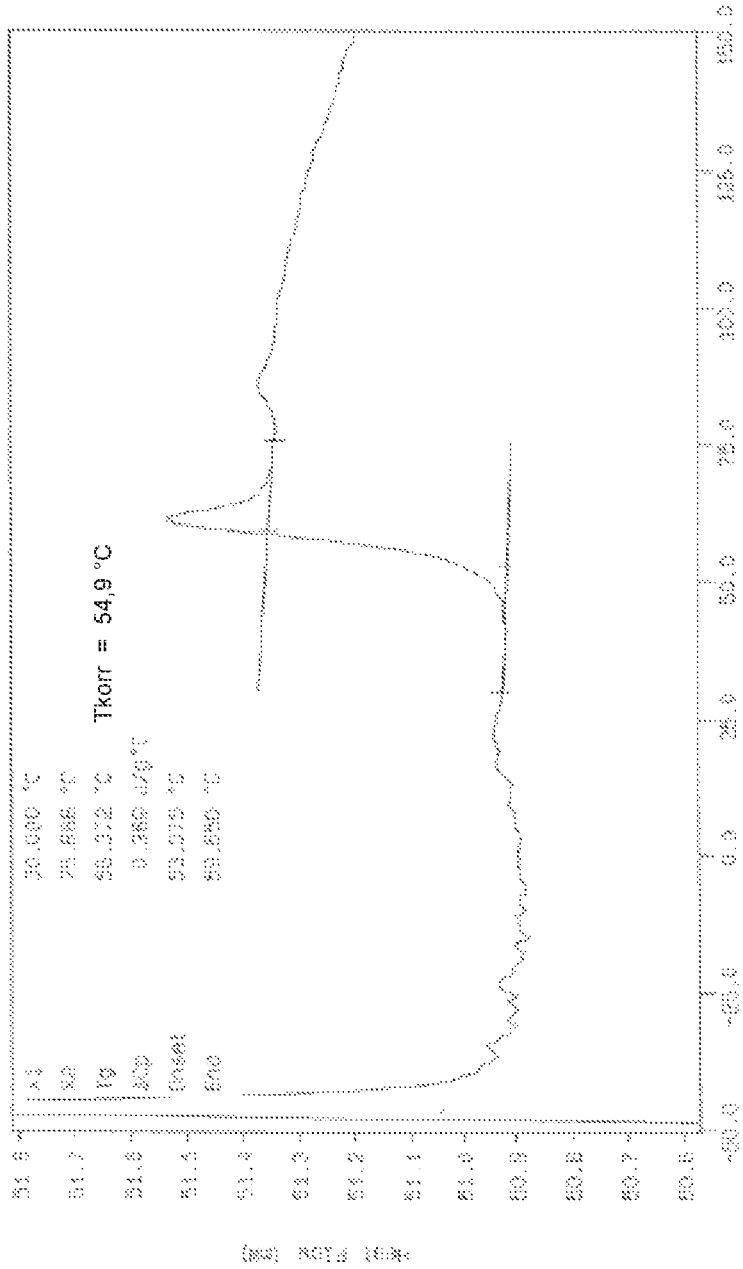

Crystal form C does not show any evidence of hydrate formation. DVS analysis at 25° C. showed a very low adsorption/desorption of water vapor when humidity was increased from 50 to 93% r.h. or reduced from 50% r.h. to 0% r.h. (approx. ±0.1%). After storing for 3 days at 96% r.h. at room temperature (Test 49), FIG. 29a, and at 40° C. (Test 50), XRPD showed no transformation of the crystal form. The water uptake measured by the Karl Fischer method was very low (<0.2%). In addition, a phase equilibration experiment in water for 3 days at room temperature showed no transformation of the crystal form (Test 51), FIG. 29b. The broad background in the XRPD diagram, FIG. 26, is due to water remaining in the sample after careful drying at room temperature following filtration of the suspension. The Karl Fischer result indicates 45% water content.

The results of the hydrate formation test of Example 7 are given in Table 8 below.

TABLE 8

Hydrate Form Tests

| Test | Starting Material | Solvent | Concentration (mg/ml) | Conditions | Results |
|---|---|---|---|---|---|
| 49 | 33 | — | approx. 50 mg | storing in humidity chamber 96% r.h./23° C. storing in humidity chamber 96% r.h./23° C. totally 3 day | Form C |
| 50 | 33 | — | approx. 50 mg | storing in humidity chamber 96% r.h./40° C. storing in humidity chamber 96% r.h./40° C. totally 3 days | Form C |
| 51 | 33 | water | 71/2.0 | 23° C. Stirring totally 3 days/23° C. filtration and airdrying | Form C |

Example 8: X-Ray Powder Diffraction (XRPD) Measurements of Formula I

Figure 30:
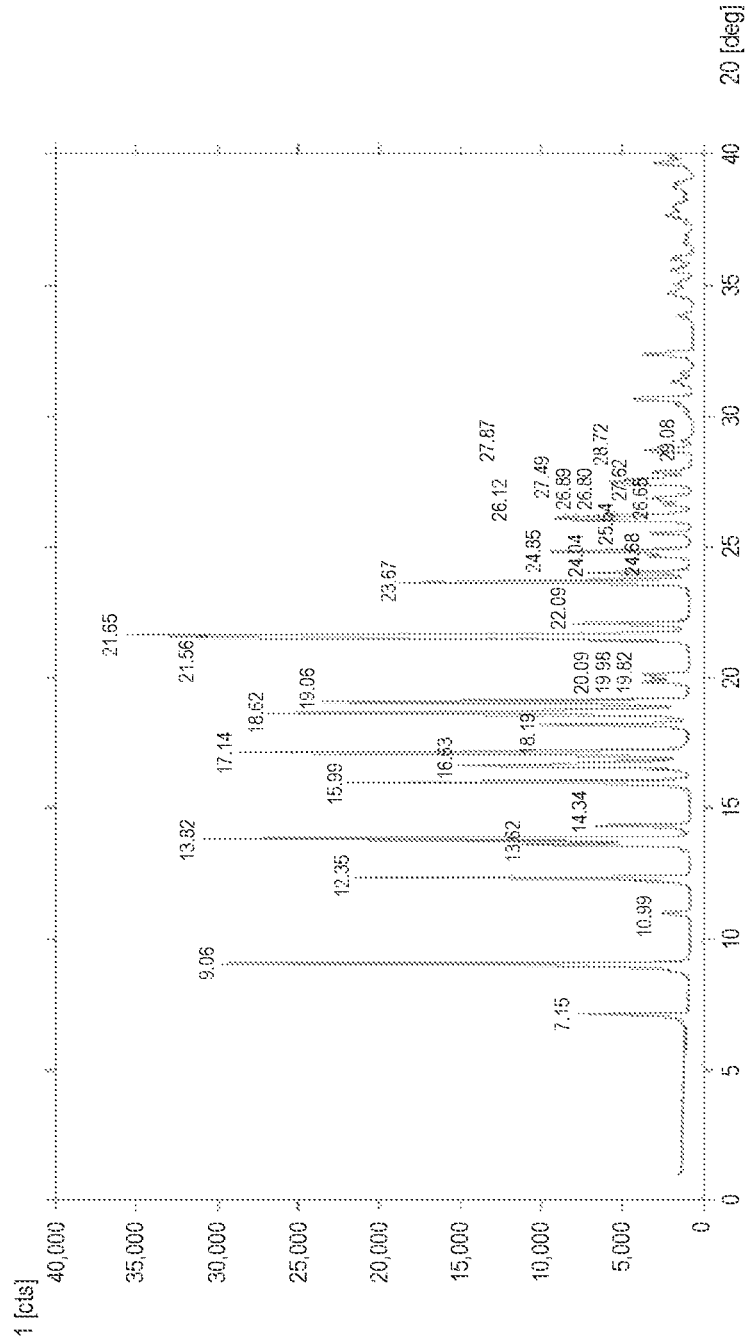
FIG. 30 is an X-ray powder diffraction pattern of crystalline Form C with observed peak values.

XRPD measurements of crystalline Form C of compound of Formula I were measured. Observed peaks are shown in FIG. 30 and Table 9. Prominent peaks are listed in Table 10. Note that none of the peaks are known to be representative or characteristic of this material since the state of preferred orientation in this sample is not known.

The range of data collected may be instrument dependent. Under most circumstances, peaks within the range of up to about 30° 2θ were selected. Rounding algorithms were used to round each peak to the nearest 0.01° 2θ, based on the instrument used to collect the data and/or the inherent peak resolution. The location of the peaks along the x-axis (° 2θ) in both the figures and the tables were determined using proprietary software and rounded to one or two significant figures after the decimal point based upon the above criteria. Peak position variabilities are given to within ±0.2° 2θ. For d-space listings, the wavelength used to calculate d-spacings was 1.5405929 Å, the Cu-Kα1 wavelength.

TABLE 9

Observed Peaks

| °2θ | d space (Å) | Intensity (%) |
|---|---|---|
| 7.15 ± 0.20 | 12.347 ± 0.345 | 22 |
| 9.06 ± 0.20 | 9.753 ± 0.215 | 85 |
| 10.99 ± 0.20 | 8.042 ± 0.146 | 8 |
| 12.35 ± 0.20 | 7.164 ± 0.116 | 60 |
| 13.62 ± 0.20 | 6.498 ± 0.095 | 31 |
| 13.82 ± 0.20 | 6.401 ± 0.092 | 88 |
| 14.34 ± 0.20 | 6.172 ± 0.086 | 19 |
| 15.99 ± 0.20 | 5.537 ± 0.069 | 62 |
| 16.63 ± 0.20 | 5.326 ± 0.064 | 43 |
| 17.14 ± 0.20 | 5.168 ± 0.060 | 80 |
| 18.19 ± 0.20 | 4.872 ± 0.053 | 28 |
| 18.62 ± 0.20 | 4.760 ± 0.051 | 75 |
| 19.06 ± 0.20 | 4.652 ± 0.048 | 65 |
| 19.82 ± 0.20 | 4.475 ± 0.045 | 10 |
| 19.98 ± 0.20 | 4.440 ± 0.044 | 9 |
| 20.09 ± 0.20 | 4.416 ± 0.044 | 11 |
| 21.56 ± 0.20 | 4.119 ± 0.038 | 89 |
| 21.65 ± 0.20 | 4.102 ± 0.037 | 100 |
| 22.09 ± 0.20 | 4.021 ± 0.036 | 22 |
| 23.67 ± 0.20 | 3.756 ± 0.031 | 53 |
| 24.04 ± 0.20 | 3.699 ± 0.030 | 20 |
| 24.68 ± 0.20 | 3.605 ± 0.029 | 9 |
| 24.85 ± 0.20 | 3.580 ± 0.028 | 27 |
| 25.54 ± 0.20 | 3.484 ± 0.027 | 9 |
| 26.12 ± 0.20 | 3.409 ± 0.026 | 26 |
| 26.65 ± 0.20 | 3.343 ± 0.025 | 7 |
| 26.80 ± 0.20 | 3.324 ± 0.024 | 7 |
| 26.89 ± 0.20 | 3.313 ± 0.024 | 9 |
| 27.49 ± 0.20 | 3.242 ± 0.023 | 16 |
| 27.62 ± 0.20 | 3.227 ± 0.023 | 11 |
| 27.87 ± 0.20 | 3.199 ± 0.022 | 9 |
| 28.72 ± 0.20 | 3.106 ± 0.021 | 10 |
| 29.08 ± 0.20 | 3.068 ± 0.021 | 4 |

Table 10 provides XRPD data identified as "Prominent Peaks". Prominent peaks are a subset of the entire observed peak list. Prominent peaks are selected from observed peaks by identifying preferably non-overlapping, low-angle peaks, with strong intensity.

TABLE 10

Prominent Peaks

| °2θ | d space (Å) | Intensity (%) |
|---|---|---|
| 9.06 ± 0.20 | 9.753 ± 0.215 | 85 |
| 12.35 ± 0.20 | 7.164 ± 0.116 | 60 |
| 13.82 ± 0.20 | 6.401 ± 0.092 | 88 |
| 15.99 ± 0.20 | 5.537 ± 0.069 | 62 |
| 16.63 ± 0.20 | 5.326 ± 0.064 | 43 |
| 17.14 ± 0.20 | 5.168 ± 0.060 | 80 |
| 18.62 ± 0.20 | 4.760 ± 0.051 | 75 |
| 19.06 ± 0.20 | 4.652 ± 0.048 | 65 |
| 21.56 ± 0.20 | 4.119 ± 0.038 | 89 |
| 21.65 ± 0.20 | 4.102 ± 0.037 | 100 |
| 23.67 ± 0.20 | 3.756 ± 0.031 | 53 |

What is claimed is:

1. A process for making a crystalline form of a compound of Formula I, or a solvate thereof, comprising:
   dissolving an amorphous form of a compound of Formula I in a first solvent to create a first solution;
   adding a second solvent to the first solution to create a second mixture; and
   isolating a crystalline form of a compound of Formula I from the second mixture;
   wherein the compound of Formula I is:

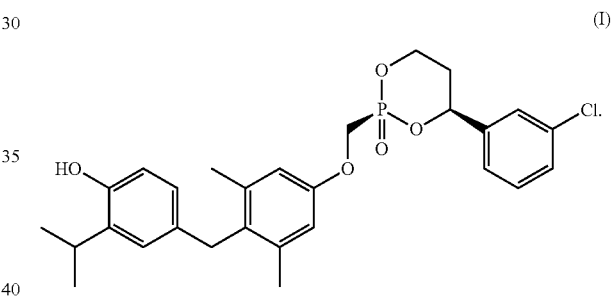

(I)

2. The process of claim 1, wherein the first solvent is selected from the group consisting of EtOAc, ethanol, acetic acid, octanol, NMP, TBME, toluene, pyridine, nitrobenzene, water, heptane, THF, acetone, acetonitrile and mixtures thereof.

3. The process of claim 2, wherein the first solvent comprises THF.

4. The process of claim 3, wherein the first solvent further comprises heptane.

5. The process of claim 4, wherein the first solvent comprises THF and heptane in a ratio of 75:25 v/v.

6. The process of claim 1, wherein the second solvent is selected from the group consisting of EtOAc, ethanol, acetic acid, octanol, NMP, TBME, toluene, pyridine, nitrobenzene, water, heptane, THF, acetone, acetonitrile and mixtures thereof.

7. The process of claim 6, wherein the second solvent is heptane.

8. The process of claim 1, wherein the process further comprises agitation of the second mixture.

9. The process of claim 1, wherein isolation of the crystalline form comprises filtration of the second mixture.

10. A process for making a crystalline form of a compound of Formula I, or a solvate thereof, comprising:
    dissolving a compound of Formula I in a first solvent to create a first solution;

adding a seeding crystalline form of the compound of Formula I, or a solvate thereof, to the first solution to create a seeded mixture; and isolating a produced crystalline form of the compound of Formula I, or a solvate thereof, from the seeded mixture;

wherein the compound of Formula I is:

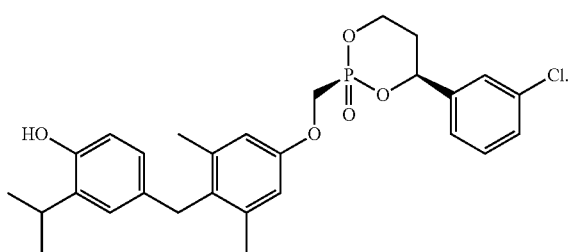

(I)

11. The process of claim 10, wherein the seeding crystalline form is selected from the group consisting of a TBME solvate crystalline form, toluene solvate crystalline form, ethanol solvate crystalline form, THF solvate crystalline form, EtOAc solvate crystalline form, acetone solvate crystalline form, crystalline Form C and mixtures thereof.

12. The process of claim 11, wherein the seeding crystalline form is crystalline Form C.

13. The process of claim 11, wherein the seeding crystalline form is the THF solvate crystalline form.

14. The process of claim 2, wherein the crystalline form exhibits an X-ray powder diffraction pattern comprising at least one characteristic peak, wherein said characteristic peak is selected from the group consisting of 9.1°, 12.4°, 13.8°, 16.0°, 16.6°, 17.1°, 18.6°, 19.1°, 21.6°, 21.7°, and 23.7° 2θ, ±0.5° 2θ.

15. The process of claim 2, wherein the crystalline form exhibits an X-ray powder diffraction pattern comprising at least three characteristic peaks, wherein said characteristic peaks are selected from the group consisting of approximately 9.1°, 12.4°, 13.8°, 16.0°, 16.6°, 17.1°, 18.6°, 19.1°, 21.6°, 21.7°, and 23.7° 2θ.

16. The process of claim 1, wherein the crystalline form has a melting point of about 122° C.

17. The process of claim 11, wherein the produced crystalline form exhibits an X-ray powder diffraction pattern comprising at least one characteristic peak, wherein said characteristic peak is selected from the group consisting of approximately 9.1°, 12.4°, 13.8°, 16.0°, 16.6°, 17.1°, 18.6°, 19.1°, 21.6°, 21.7°, and 23.7° 2θ, ±0.5° 2θ.

18. The process of claim 11, wherein the produced crystalline form exhibits an X-ray powder diffraction pattern comprising at least three characteristic peaks, wherein said characteristic peaks are selected from the group consisting of approximately 9.1°, 12.4°, 13.8°, 16.0°, 16.6°, 17.1°, 18.6°, 19.1°, 21.6°, 21.7°, and 23.7° 2θ.

19. The process of claim 10, wherein the produced crystalline form has a melting point of about 122° C.

20. The process of claim 10, wherein the process further comprises agitation of the seeded mixture.

21. The process of claim 20, wherein the agitation is performed at or above about 23° C.

22. The process of claim 10, wherein isolation of the produced crystalline form comprises filtration of the seeded mixture.

* * * * *